US012795069B2

(12) United States Patent
Wang et al.

(10) Patent No.: US 12,795,069 B2
(45) Date of Patent: Nov. 10, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Yang Wang, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/438,004

(22) Filed: Feb. 9, 2024

(65) Prior Publication Data

US 2024/0187569 A1 Jun. 6, 2024

Related U.S. Application Data

(63) Continuation of application No. PCT/CN2022/110929, filed on Aug. 8, 2022.

(30) Foreign Application Priority Data

Aug. 11, 2021 (WO) ................ PCT/CN2021/112154

(51) Int. Cl.
*H04N 19/11* (2014.01)
*H04N 19/105* (2014.01)
(Continued)

(52) U.S. Cl.
CPC ........... *H04N 19/105* (2014.11); *H04N 19/11* (2014.11); *H04N 19/159* (2014.11); *H04N 19/176* (2014.11); *H04N 19/70* (2014.11)

(58) Field of Classification Search
CPC .... H04N 19/105; H04N 19/11; H04N 19/159; H04N 19/176; H04N 19/70
(Continued)

(56) References Cited

U.S. PATENT DOCUMENTS 11,405,642 B2 8/2022 Heo et al.
2014/0341286 A1 11/2014 Sasai et al.
(Continued)

FOREIGN PATENT DOCUMENTS

CN 103096055 A 5/2013
CN 106254886 A 12/2016
(Continued)

OTHER PUBLICATIONS

International Search Report and Written Opinion for International Application No. PCT/CN2022/121754, mailed Nov. 29, 2022, 9 Pages.
(Continued)

*Primary Examiner* — Albert Kir

(57) ABSTRACT

Embodiments of the present disclosure provide a method for video processing. The method comprises: determining, during a conversion between a current chroma block of a video and a bitstream of the video, a set of candidate intra prediction modes (IPMs) for the current chroma block based on a decoder-side derivation of intra prediction mode (DDIPM); constructing an IPM candidate list for the current chroma block based on the set of candidate IPMs; and performing the conversion based on the IPM candidate list. Thereby, the proposed method can advantageously improve coding efficiency and reduce the coding bits while maintaining the coding quality.

17 Claims, 41 Drawing Sheets

(51) Int. Cl.
*H04N 19/159* (2014.01)
*H04N 19/176* (2014.01)
*H04N 19/70* (2014.01)

(58) Field of Classification Search
USPC ..................................................... 375/240.12
See application file for complete search history.

(56) References Cited

U.S. PATENT DOCUMENTS

| | | | | |
|---|---|---|---|---|
| 2015/0016537 | A1 | 1/2015 | Karczewicz et al. | |
| 2016/0323600 | A1* | 11/2016 | Ma | H04N 19/11 |
| 2017/0353719 | A1* | 12/2017 | Liu | H04N 19/156 |
| 2017/0359595 | A1 | 12/2017 | Zhang et al. | |
| 2018/0205946 | A1 | 7/2018 | Zhang et al. | |
| 2019/0166370 | A1 | 5/2019 | Xiu et al. | |
| 2020/0014919 | A1 | 1/2020 | Zhao et al. | |
| 2020/0036985 | A1 | 1/2020 | Jang et al. | |
| 2020/0045322 | A1* | 2/2020 | Ye | H04N 19/11 |
| 2020/0195930 | A1 | 6/2020 | Choi et al. | |
| 2020/0195976 | A1 | 6/2020 | Zhao et al. | |
| 2021/0084309 | A1 | 3/2021 | Zhao et al. | |
| 2021/0250597 | A1 | 8/2021 | Du et al. | |
| 2021/0297672 | A1 | 9/2021 | Deng et al. | |
| 2022/0070451 | A1 | 3/2022 | Abdoli | |
| 2022/0086472 | A1 | 3/2022 | Zhao et al. | |
| 2022/0103816 | A1 | 3/2022 | Karczewicz et al. | |
| 2022/0295056 | A1 | 9/2022 | Lim | |
| 2022/0312006 | A1 | 9/2022 | Taquet et al. | |
| 2022/0394269 | A1* | 12/2022 | Cao | H04N 19/159 |
| 2022/0417517 | A1 | 12/2022 | Choi et al. | |
| 2023/0217026 | A1* | 7/2023 | Li | H04N 19/105 375/240.02 |
| 2023/0336716 | A1* | 10/2023 | Chang | H04N 19/11 |
| 2024/0187575 | A1* | 6/2024 | Wang | H04N 19/176 |
| 2024/0223776 | A1* | 7/2024 | Li | H04N 19/117 |
| 2024/0244195 | A1 | 7/2024 | Wang et al. | |
| 2024/0340408 | A1* | 10/2024 | Kim | H04N 19/159 |
| 2024/0373036 | A1 | 11/2024 | Kim et al. | |
| 2026/0059103 | A1* | 2/2026 | Wang | H04N 19/11 |

FOREIGN PATENT DOCUMENTS

| | | | | |
|---|---|---|---|---|
| CN | 110100436 | A | 8/2019 | |
| CN | 111294602 | A | 6/2020 | |
| CN | 111567045 | A | 8/2020 | |
| CN | 111742554 | A | 10/2020 | |
| CN | 112135128 | A | 12/2020 | |
| CN | 112740685 | A | 4/2021 | |
| CN | 113170122 | A | 7/2021 | |
| CN | 114258683 | A | 3/2022 | |
| WO | WO-2017192995 | A1 * | 11/2017 | H04N 19/11 |
| WO | 2019137732 | A1 | 7/2019 | |
| WO | 2019162117 | A1 | 8/2019 | |
| WO | 2020185047 | A | 9/2020 | |
| WO | 2021086061 | A1 | 5/2021 | |

OTHER PUBLICATIONS

International Search Report and Written Opinion for International Application No. PCT/CN2022/111080, mailed on Nov. 2, 2022, 7 Pages.
Written Opinion for International Application No. PCT/CN2022/110929, mailed Nov. 16, 2022, 4 Pages.
Zhao L. et al., "CE3: Simplifications for Chroma Intra Coding (Test 2.3.1 and 2.3.2)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0277, 2 Pages.
Chen et al., "Algorithm description for Versatile Video Coding and Test Model 12 (VTM 12)," Joint Video Experts Team (JVET) of ITU-T SG 16 WP 3 and ISO/IEC JTC 1/SC 29, 21st Meeting: by teleconference, Jan. 6-15, 2021, Document: JVET-U2002-v1, 101 pages.
International Search Report and Written Opinion in PCT/CN2022/110869, mailed Dec. 15, 2022, 8 pages.
International Search Report in PCT/CN2022/110929, mailed Nov. 16, 2022, 3 pages.
Notice of Allowance for U.S. Appl. No. 18/622,831, mailed on May 30, 2025, 12 pages.
Non-Final Office Action for U.S. Appl. No. 18/438,013, mailed on Aug. 1, 2025, 8 pages.
Astola et al., "AHG12: Convolutional cross-component model (CCCM) for intra prediction", Joint Video Experts Team (JVET) of ITU-T SG 16 WP 3 and ISO/IEC JTC 1/SC 29, 26th Meeting, by teleconference, Apr. 20-29, 2022, Document: JVET-Z0064-v1, 5 pages.
Extended European Search Report for European Patent Application No. 22938155.3, mailed on Feb. 19, 2026, 11 pages.
Li et al., "Adaptive Cross Component Linear Model for Chroma Intra-Prediction in Vvc", ICCBN, Feb. 2022, pp. 52-59.
Non-Final Office Action for U.S. Appl. No. 18/920,824, mailed on Dec. 23, 2025, 14 pages.

* cited by examiner

600

1300

Log2(nTbH)

1 ↔ 6

Mode index: 51 ↕ 80

| | | | | | |
|---|---|---|---|---|---|
| -6 | -5 | -4 | -3 | -2 | -1 |
| -5 | -4 | -3 | -2 | -1 | 0 |
| -4 | -3 | -2 | -1 | 0 | 1 |
| -4 | -3 | -2 | -1 | 0 | 1 |
| -3 | -2 | -1 | 0 | 1 | 2 |
| -3 | -2 | -1 | 0 | 1 | 2 |
| -3 | -2 | -1 | 0 | 1 | 2 |
| -2 | -1 | 0 | 1 | 2 | 2 |
| -2 | -1 | 0 | 1 | 2 | 2 |
| -2 | -1 | 0 | 1 | 2 | 2 |
| -2 | -1 | 0 | 1 | 2 | 2 |
| -2 | -1 | 0 | 1 | 2 | 2 |
| -2 | -1 | 0 | 1 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| -1 | 0 | 1 | 2 | 2 | 2 |
| 0 | 1 | 2 | 2 | 2 | 2 |
| 0 | 1 | 2 | 2 | 2 | 2 |
| 0 | 1 | 2 | 2 | 2 | 2 |
| 0 | 1 | 2 | 2 | 2 | 2 |
| 0 | 1 | 2 | 2 | 2 | 2 |
| 1 | 2 | 2 | 2 | 2 | 2 |
| 1 | 2 | 2 | 2 | 2 | 2 |
| 1 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |

Fig. 13

METHOD, APPARATUS, AND MEDIUM FOR VIDEO PROCESSING

CROSS REFERENCE

This application is a continuation of International Application No. PCT/CN2022/110929, filed on Aug. 8, 2022, which claims the benefit of International Application No. PCT/CN2021/112154 filed on Aug. 11, 2021. The entire contents of these applications are hereby incorporated by reference in their entireties.

FIELD

Embodiments of the present disclosure relates generally to video coding techniques, and more particularly, to intra prediction mode derivation for chroma.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally expected to be further improved.

SUMMARY

In a first aspect, a method for video processing is proposed. The method comprises: determining, during a conversion between a current chroma block of a video and a bitstream of the video, a set of candidate intra prediction modes (IPMs) for the current chroma block based on a decoder-side derivation of intra prediction mode (DDIPM); constructing an IPM candidate list for the current chroma block based on the set of candidate IPMs; and performing the conversion based on the IPM candidate list.

According to the method in accordance with the first aspect of the present disclosure, an IPM candidate list for a chroma block is determined based on DDIPM which derives IPM by using previously decoded blocks or samples. Thereby, the proposed method can advantageously improve coding efficiency and reduce the coding bits while maintaining the coding quality.

In a second aspect, another method for video processing is proposed. The method comprises: determining, during a conversion between a current chroma block of a video and a bitstream of the video, a target chroma IPM for the current chroma block based on whether a collocated luma block of the current chroma block is code with a DDIPM; and performing the conversion based on the target chroma IPM.

According to the method in accordance with the second aspect of the present disclosure, the determination of an IPM for a chroma block is dependent on a collocated luma block of the chroma block. Thereby, the proposed method can advantageously improve coding efficiency and the coding quality.

In a third aspect, an apparatus for processing video data is proposed. The apparatus for processing video data comprises a processor and a non-transitory memory with instructions thereon. The instructions upon execution by the processor, cause the processor to perform a method in accordance with the first or second aspect of the present disclosure.

In a fourth aspect, a non-transitory computer-readable storage medium is proposed. The non-transitory computer-readable storage medium stores instructions that cause a processor to perform a method in accordance with the first or second aspect of the present disclosure.

In a fifth aspect, a non-transitory computer-readable recording medium is proposed. The non-transitory computer-readable recording medium stores a bitstream of a video which is generated by a method performed by a video processing apparatus. The method comprises: determining a set of candidate IPMs for a current chroma block of the video based on a DDIPM; constructing an IPM candidate list for the current chroma block based on the set of candidate IPMs; and generating the bitstream based on the IPM candidate list.

In a sixth aspect, a method for storing a bitstream of a video is proposed. The method comprises: determining a set of candidate IPMs for a current chroma block of the video based on a DDIPM; constructing an IPM candidate list for the current chroma block based on the set of candidate IPMs; generating the bitstream based on the IPM candidate list; and storing the bitstream in a non-transitory computer-readable recording medium.

In a seventh aspect, another non-transitory computer-readable recording medium is proposed. The non-transitory computer-readable recording medium stores a bitstream of a video which is generated by a method performed by a video processing apparatus. The method comprises: determining a target chroma IPM for a current chroma block of the video based on whether a collocated luma block of the current chroma block is code with a DDIPM; and generating the bitstream based on the target chroma IPM.

In an eighth aspect, another method for storing a bitstream of a video is proposed. The method comprises: determining a target chroma IPM for a current chroma block of the video based on whether a collocated luma block of the current chroma block is code with a DDIPM; generating the bitstream based on the target chroma IPM; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 13 is a schematic diagram illustrating nScale values with respect to nTbH and mode number; for all nScale<0 cases gradient approach is used;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
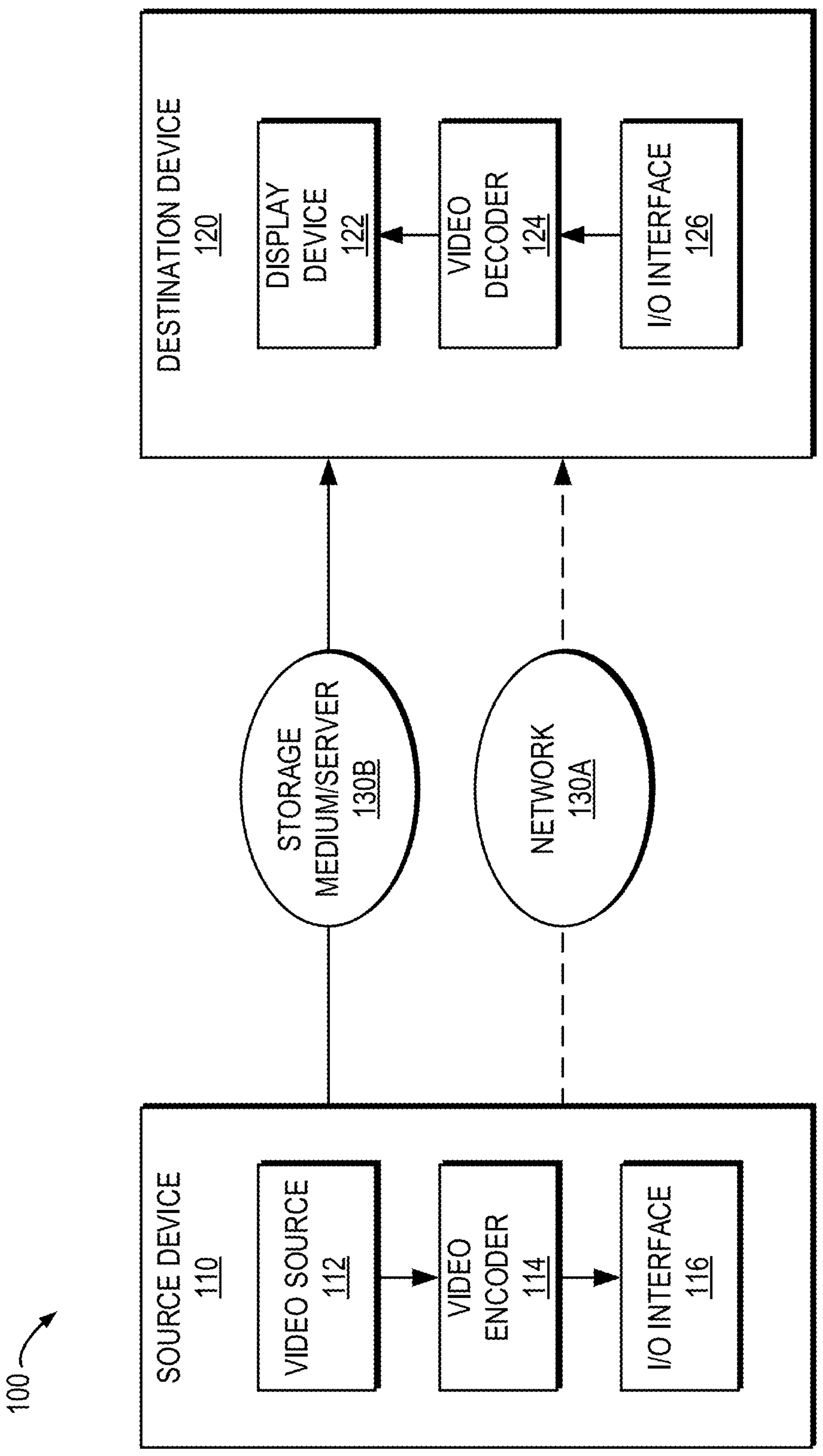
FIG. 1 illustrates a block diagram of an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
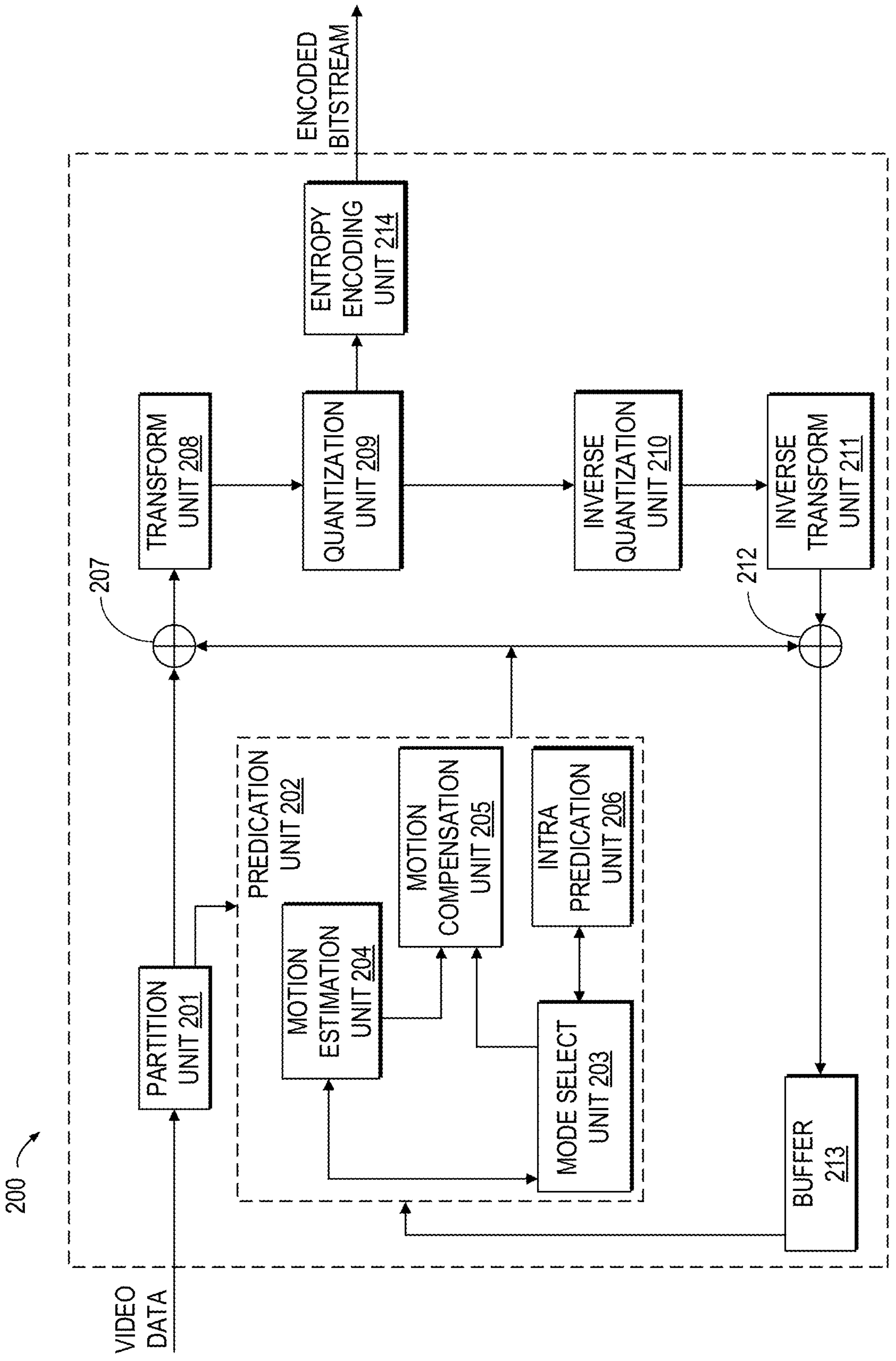
FIG. 2 illustrates a block diagram of an example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the other video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
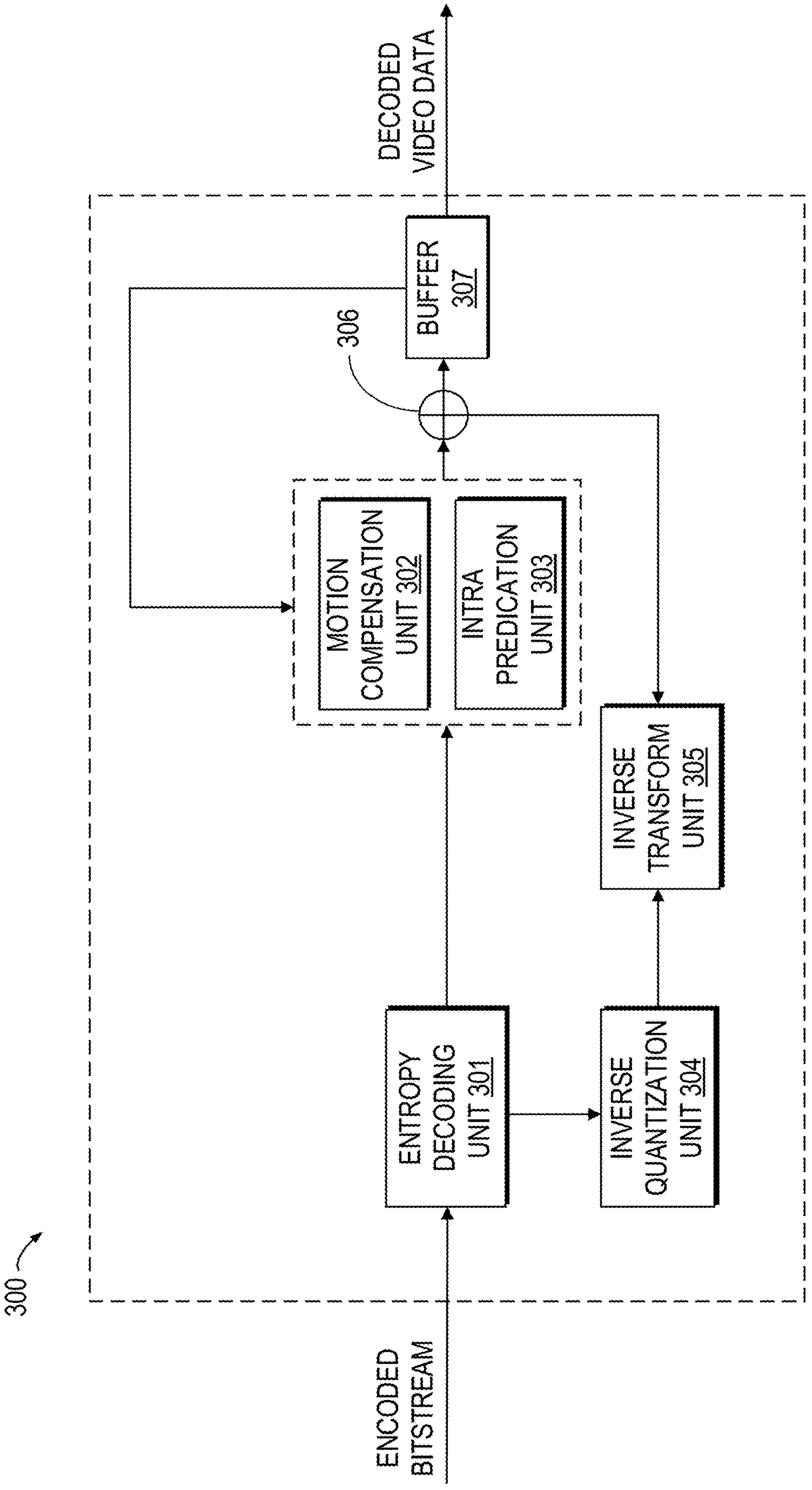
FIG. 3 illustrates a block diagram of an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate case of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to video coding technologies. Specifically, it is related a coding tool that derives intra prediction mode of chroma components using previously decoded blocks, how to signal the derived intra prediction mode, and coding of intra prediction mode for chroma components and other coding tools in image/video coding. It may be applied to the existing video coding standard like HEVC, or Versatile Video Coding (VVC). It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 4:4:4

Each of the three Y'CbCr components have the same sample rate, thus there is no chroma subsampling. This scheme is sometimes used in high-end film scanners and cinematic post production.

2.1.2 4:2:2

Figure 4:
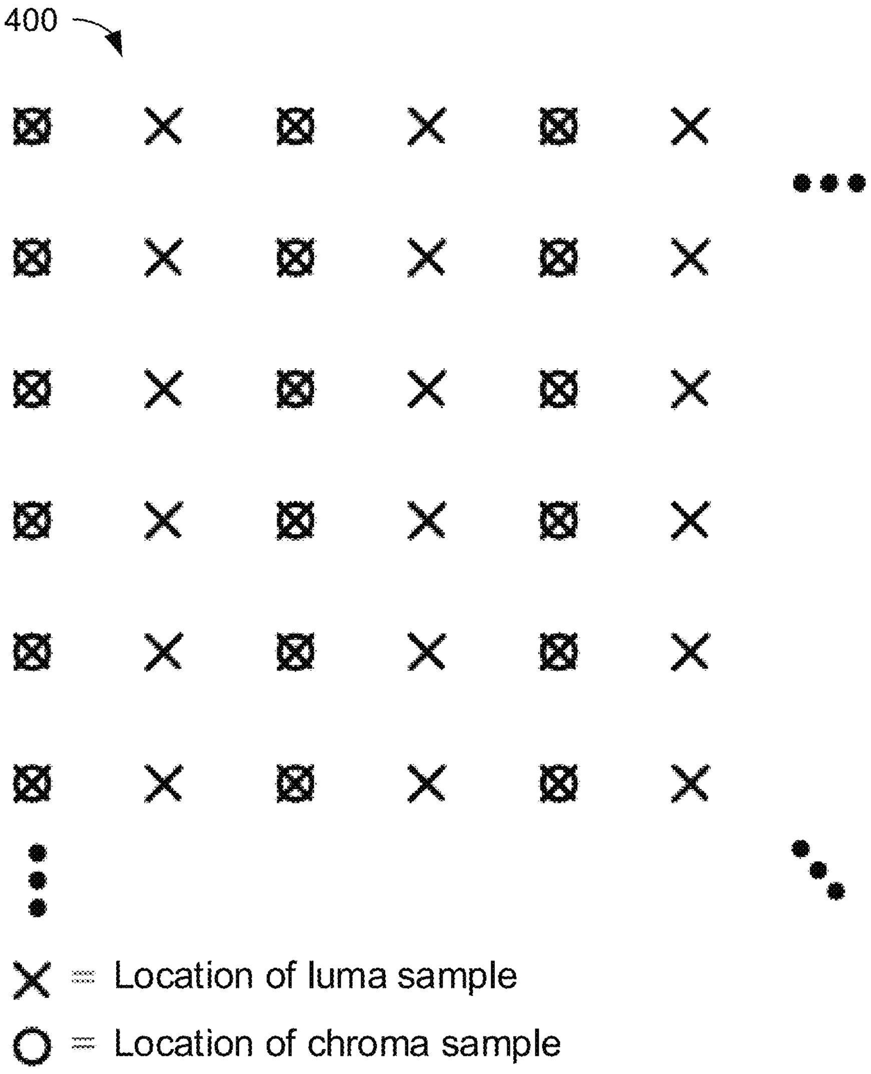
FIG. 4 is a schematic diagram illustrating nominal vertical and horizontal locations of 4:2:2 luma and chroma samples in a picture.

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 4 in VVC working draft. FIG. 4 is a schematic diagram 400 illustrating nominal vertical and horizontal locations of 4:2:2 luma and chroma samples in a picture 2.1.3 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

TABLE 2-1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

2.2. Coding Flow of a Typical Video Codec

Figure 5:
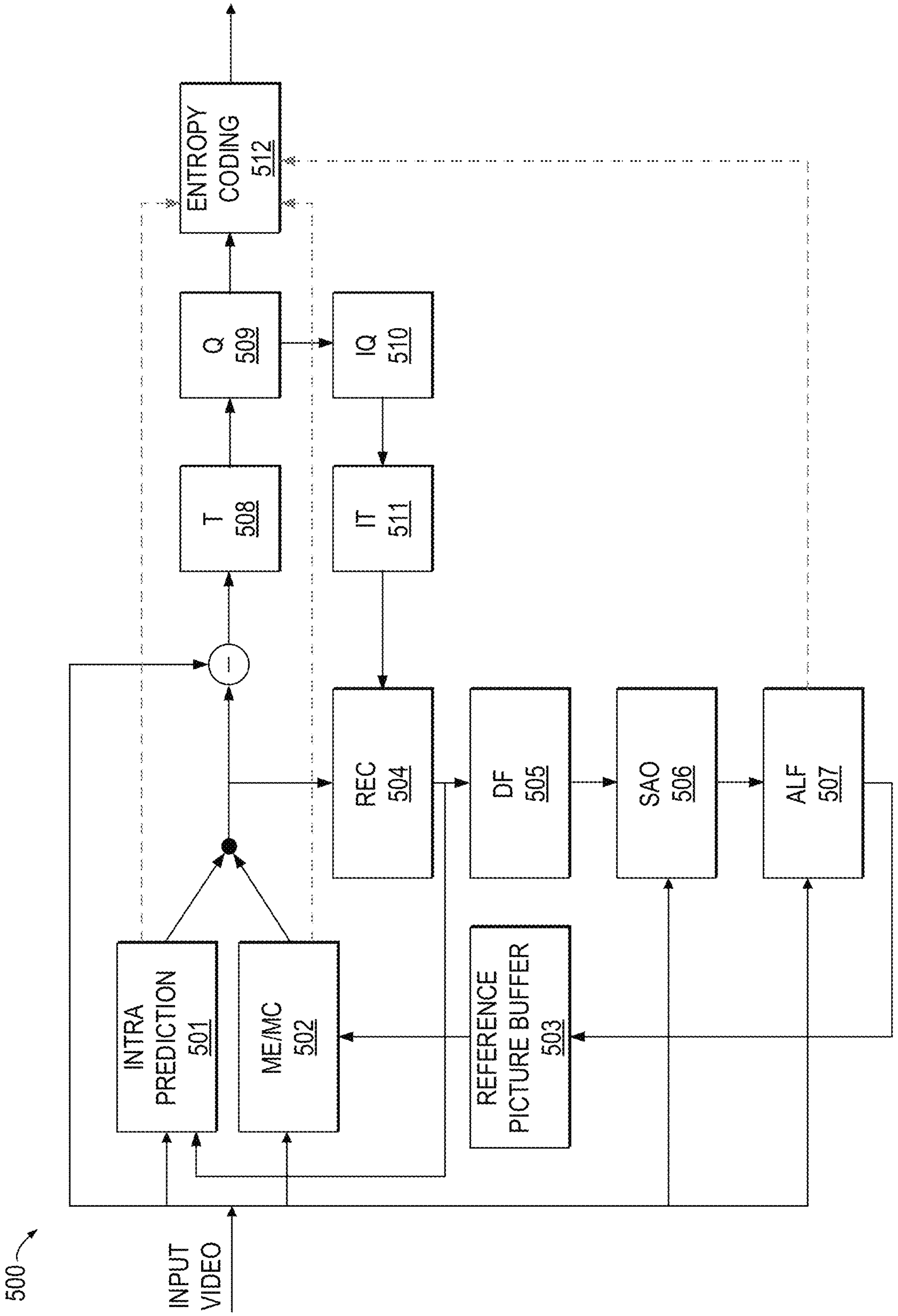
FIG. 5 is a schematic diagram illustrating example of encoder block diagram.

FIG. 5 is a schematic diagram 500 illustrating example of encoder block diagram. FIG. 5 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.3. Intra Mode Coding With 67 Intra Prediction Modes

Figure 6:
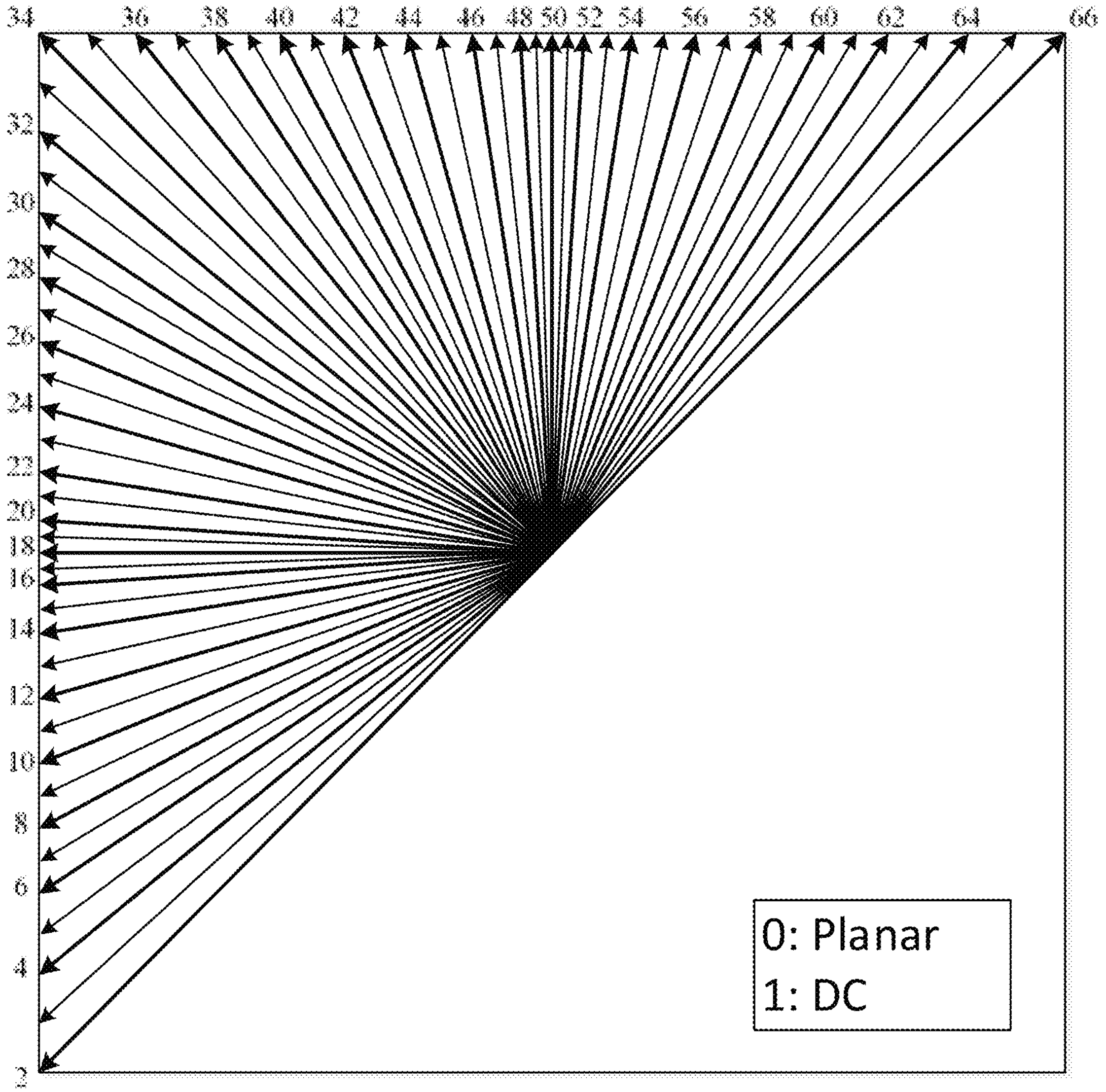
FIG. 6 is a schematic diagram illustrating 67 intra prediction modes.

To capture the arbitrary edge directions presented in natural video, the number of directional intra modes is extended from 33, as used in HEVC, to 65, as shown in FIG. 6, and the planar and DC modes remain the same. FIG. 6 is a schematic diagram 600 illustrating 67 intra prediction modes. These denser directional intra prediction modes apply for all block sizes and for both luma and chroma intra predictions.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.3.1 Wide Angle Intra Prediction

Although 67 modes are defined in the VVC, the exact prediction direction for a given intra prediction mode index is further dependent on the block shape. Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 7:
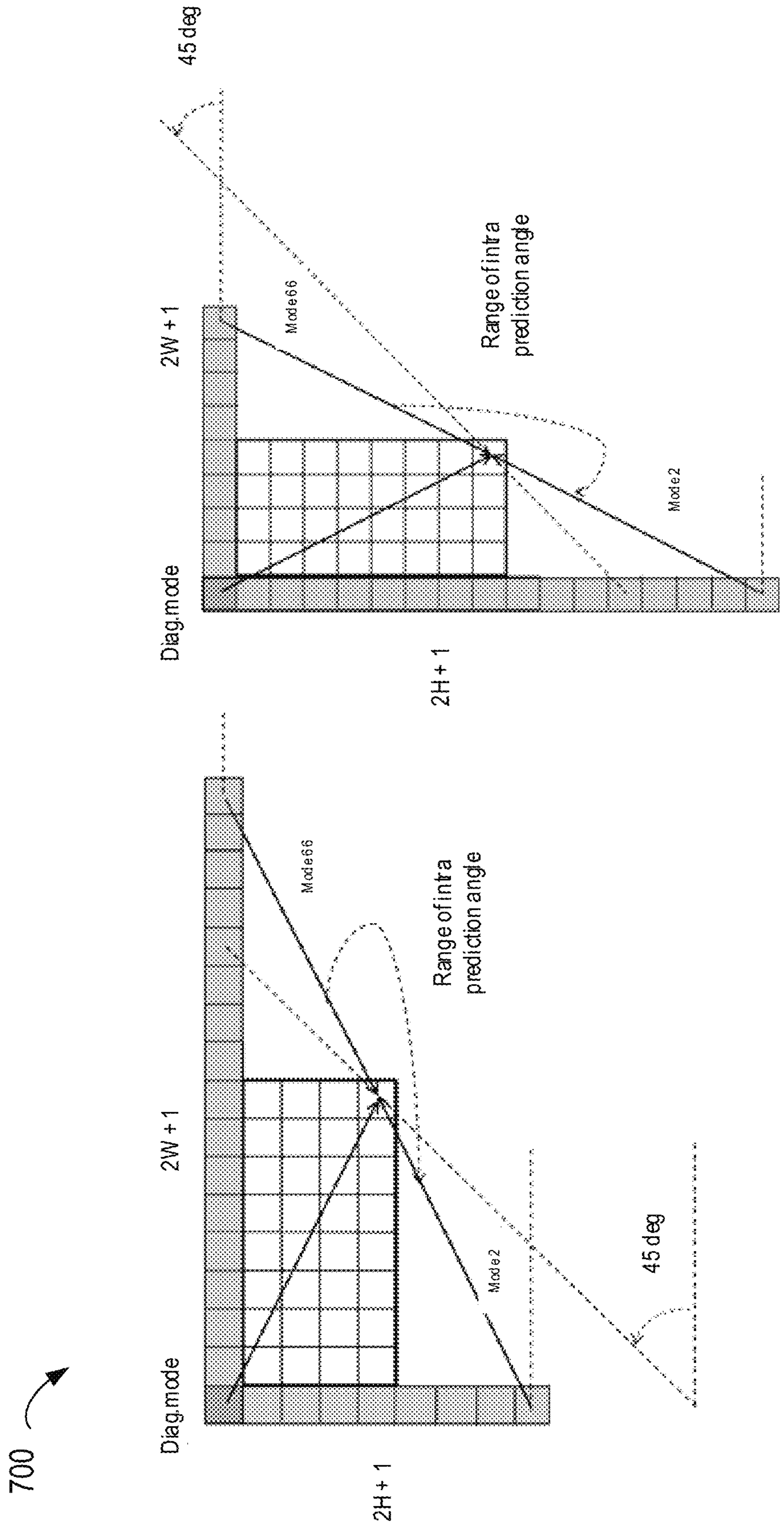
FIG. 7 is a schematic diagram illustrating reference samples for wide-angular intra prediction.

To support these prediction directions, the top reference with length 2W+1, and the left reference with length 2H+1, are defined as shown in FIG. 7. FIG. 7 is a schematic diagram 700 illustrating reference samples for wide-angular intra prediction.

The number of replaced modes in wide-angular direction mode depends on the aspect ratio of a block. The replaced intra prediction modes are illustrated in Table 2-2

TABLE 2-2

Intra prediction modes replaced by wide-angular modes

| Aspect ratio | Replaced intra prediction modes |
|---|---|
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == ½ | Modes 59, 60, 61, 62, 63, 64, 65, 66 |
| W/H == ¼ | Mode 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 8:
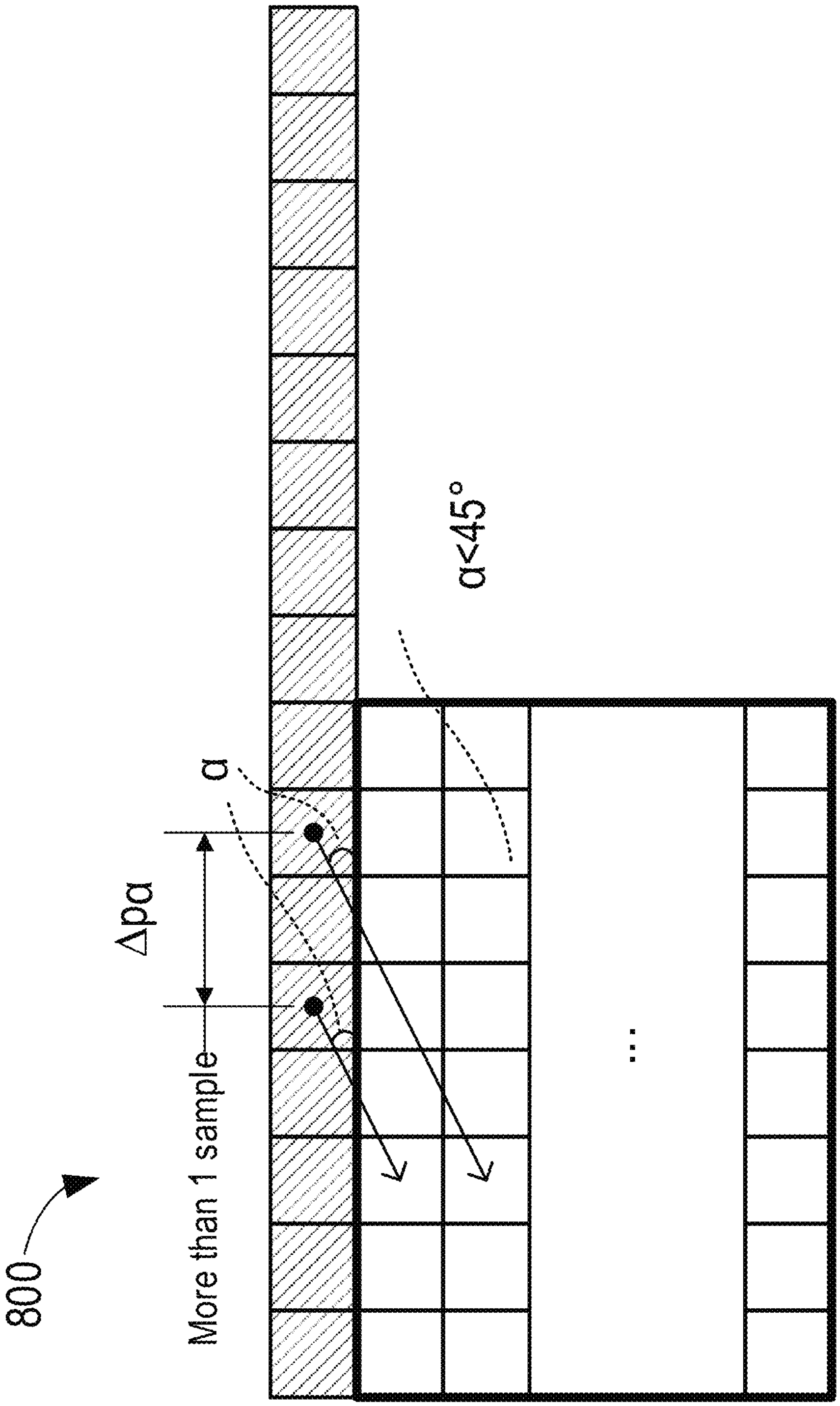
FIG. 8 is a schematic diagram illustrating problem of discontinuity in case of directions beyond 45°.

FIG. 8 is a schematic diagram 800 illustrating problem of discontinuity in case of directions beyond 45°. As shown in FIG. 8, two vertically adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_{\alpha}$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135 degree and above 45 degree, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

2.4. Intra Prediction Mode Coding for Chroma Component

For the chroma component of an intra PU, the encoder selects the best chroma prediction modes among five modes including Planar, DC, Horizontal, Vertical and a direct copy of the intra prediction mode for the luma component. The mapping between intra prediction direction and intra prediction mode number for chroma is shown in Table 2-3.

When the intra prediction mode number for the chroma component is 4, the intra prediction direction for the luma component is used for the intra prediction sample generation for the chroma component. When the intra prediction mode number for the chroma component is not 4 and it is identical to the intra prediction mode number for the luma component, the intra prediction direction of 66 is used for the intra prediction sample generation for the chroma component.

2.5. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.6. Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signalled as IBC AMVP mode or IBC skip/merge mode as follows:

- IBC skip/merge mode: a merge candidate index is used to indicate which of the block vectors in the list from neighbouring candidate IBC coded blocks is used to predict the current block. The merge list consists of spatial, HMVP, and pairwise candidates.
- IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

2.7. Cross-Component Linear Model Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i,j)=\alpha\cdot rec_L'(i,j)+\beta \quad (2\text{-}1)$$

where $pred_C(i, j)$ represents the predicted chroma samples in a CU and $rec_L(i, j)$ represents the down-sampled reconstructed luma samples of the same CU.

The CCLM parameters (α and β) are derived with at most four neighbouring chroma samples and their corresponding down-sampled luma samples. Suppose the current chroma block dimensions are W×H, then W" and H' are set as W'=W, H'=H when LM mode is applied;

W'=W+H when LM_T mode is applied;

H'=H+W when LM_L mode is applied;

The above neighbouring positions are denoted as S[0, −1] . . . S[W'−1, −1] and the left neighbouring positions are denoted as S[−1, 0] . . . S[−1, H'−1]. Then the four samples are selected as

- S[W'/4, −1], S[3*W'/4, −1], S[−1, H'/4], S[−1, 3*H'/4] when LM mode is applied and both above and left neighbouring samples are available;
- S[W'/8, −1], S[3*W'/8, −1], S[5*W'/8, −1], S[7*W'/8, −1] when LM_T mode is applied or only the above neighbouring samples are available;
- S[−1, H'/8], S[−1, 3*H'/8], S[−1, 5*H'/8], S[−1, 7*H'/8] when LM_L mode is applied or only the left neighbouring samples are available;

The four neighbouring luma samples at the selected positions are down-sampled and compared four times to find two larger values: $x^0_A$ and $x^1_A$, and two smaller values: $x^1_B$ and $x^1_B$. Their corresponding chroma sample values are denoted as $y^0_A$, $y^1_A$, $y^0_B$ and $y^1_B$. Then $X_A$, $X_B$, $Y_A$ and $y_B$ are derived as:

$$X_a=(x^0_A+x^1_A+1)>>1;\ X_b=(x^0_B+x^1_B+1)>>\mathbf{1};Y_a=(y^0_A+y^1_A+1)>>\mathbf{1};Y_b=(y^0_B+y^1_B+1)>>\mathbf{1} \quad (2\text{-}2)$$

Finally, the linear model parameters α and β are obtained according to the following equations.

$$\alpha = \frac{Y_a - Y_b}{X_a - X_b} \quad (2\text{-}3)$$

$$\beta = Y_b - \alpha \cdot X_b \quad (2\text{-}4)$$

Figure 9:
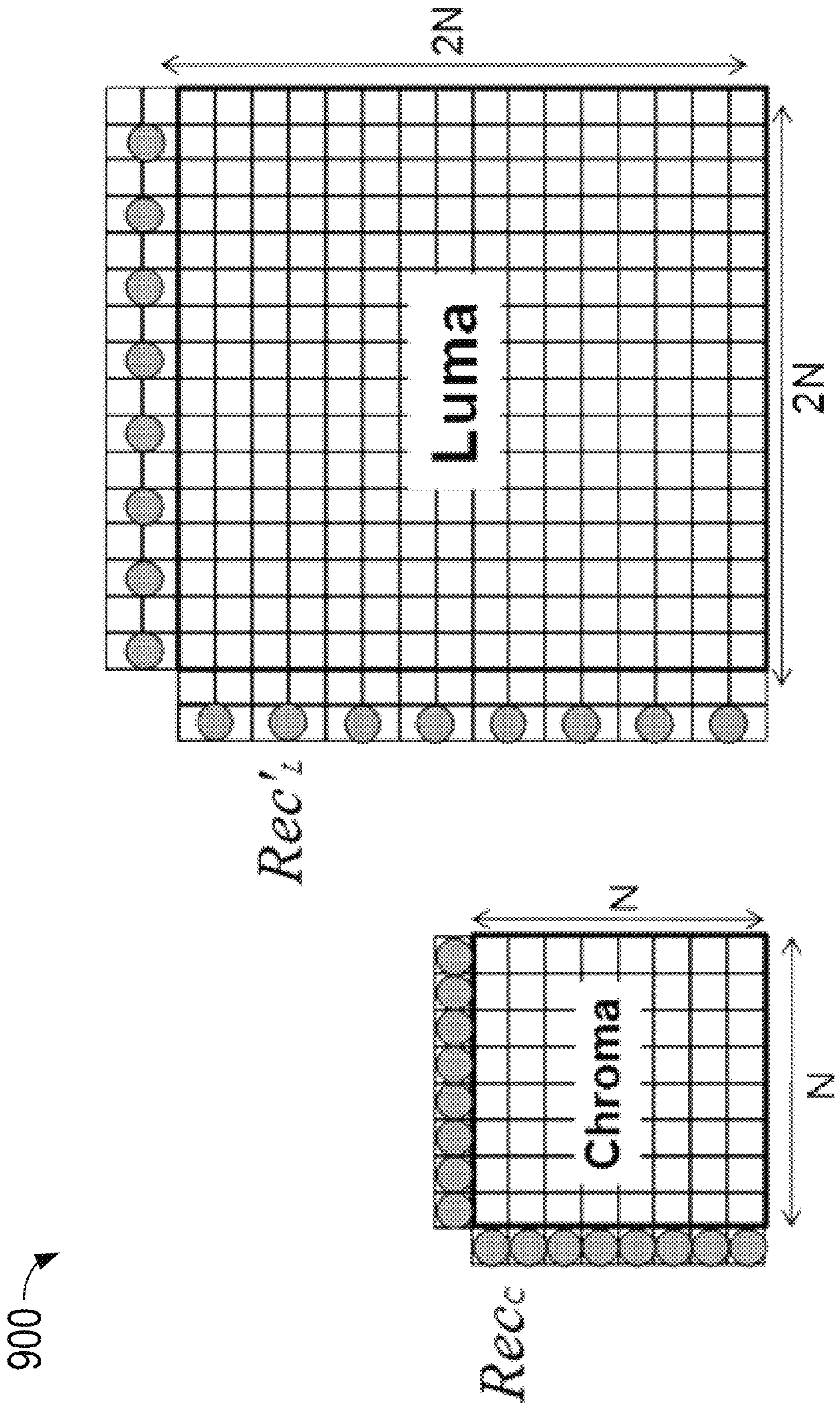
FIG. 9 is a schematic diagram illustrating locations of the samples used for the derivation of α and β.

FIG. 9 is a schematic diagram 900 illustrating locations of the samples used for the derivation of α and β. FIG. 9 shows an example of the location of the left and above samples and the sample of the current block involved in the CCLM mode.

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

DivTable [ ]={0, 7, 6, 5, 5, 4, 4, 3, 3, 2, 2, 1, 1, 1, 1, 0 } (2-5)

This would have a benefit of both reducing the complexity of the calculation as well as the memory size required for storing the needed tables Besides the above template and left template can be used to calculate the linear model coefficients together, they also can be used alternatively in the other 2 LM modes, called LM_T, and LM_L modes. In LM_T mode, only the above template is used to calculate the linear model coefficients. To get more samples, the above template is extended to (W+H) samples. In LM_L mode, only left template is used to calculate the linear model coefficients. To get more samples, the left template is extended to (H+W) samples.

In LM mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = \begin{bmatrix} rec_L(2i-1, 2j-1) + 2\cdot rec_L(2i-1, 2j-1) + rec_L(2i+1, 2j-1) + \\ rec_L(2i-1, 2j) + 2\cdot rec_L(2i, 2j) + rec_L(2i+1, 2j) + 4 \end{bmatrix} \gg 3 \quad (2\text{-}6)$$

$$rec'_L(i, j) = \begin{bmatrix} rec_L(2i, 2j-1) + rec_L(2i-1, 2j) + 4\cdot rec_L(2i, 2j) + \\ rec_L(2i+1, 2j) + rec_L(2i, 2j+1) + 4 \end{bmatrix} \gg 3 \quad (2\text{-}7)$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five conventional intra modes and three cross-component linear model modes (LM, LM_T, and LM_L). Chroma mode signalling and derivation process are shown in Table 2-3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 2-3

Derivation of chroma prediction mode from luma mode when CCLM is enabled

| Chroma prediction mode | Corresponding luma intra prediction mode 0 | 50 | 18 | 1 | X (0 <= X <= 66) |
|---|---|---|---|---|---|
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2-4.

TABLE 2-4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2-4, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_T (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded.

This single binarization table is used for both sps_cclm_enabled_flag equal to 0 and 1 cases. The first two bins in Table 2-4 are context coded with its own context model, and the rest bins are bypass coded. In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node is allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

2.8. Multi-Model Linear Model (MMLM)

With MMLM, there can be more than one linear models between the luma samples and chroma samples in a CU. In this method, neighboring luma samples and neighboring chroma samples of the current block are classified into several groups, each group is used as a training set to derive a linear model (i.e., particular α and β are derived for a particular group). Furthermore, the samples of the current luma block is also classified based on the same rule for the classification of neighboring luma samples.

The neighboring samples can be classified into M groups, where M is 2 or 3. The MMLM method with M=2 and M=3 are designed as two appended Chroma prediction modes named MMLM2 and MMLM3, besides the original LM mode. The encoder chooses the optimal mode in the RDO process and signal the mode.

Figure 10:
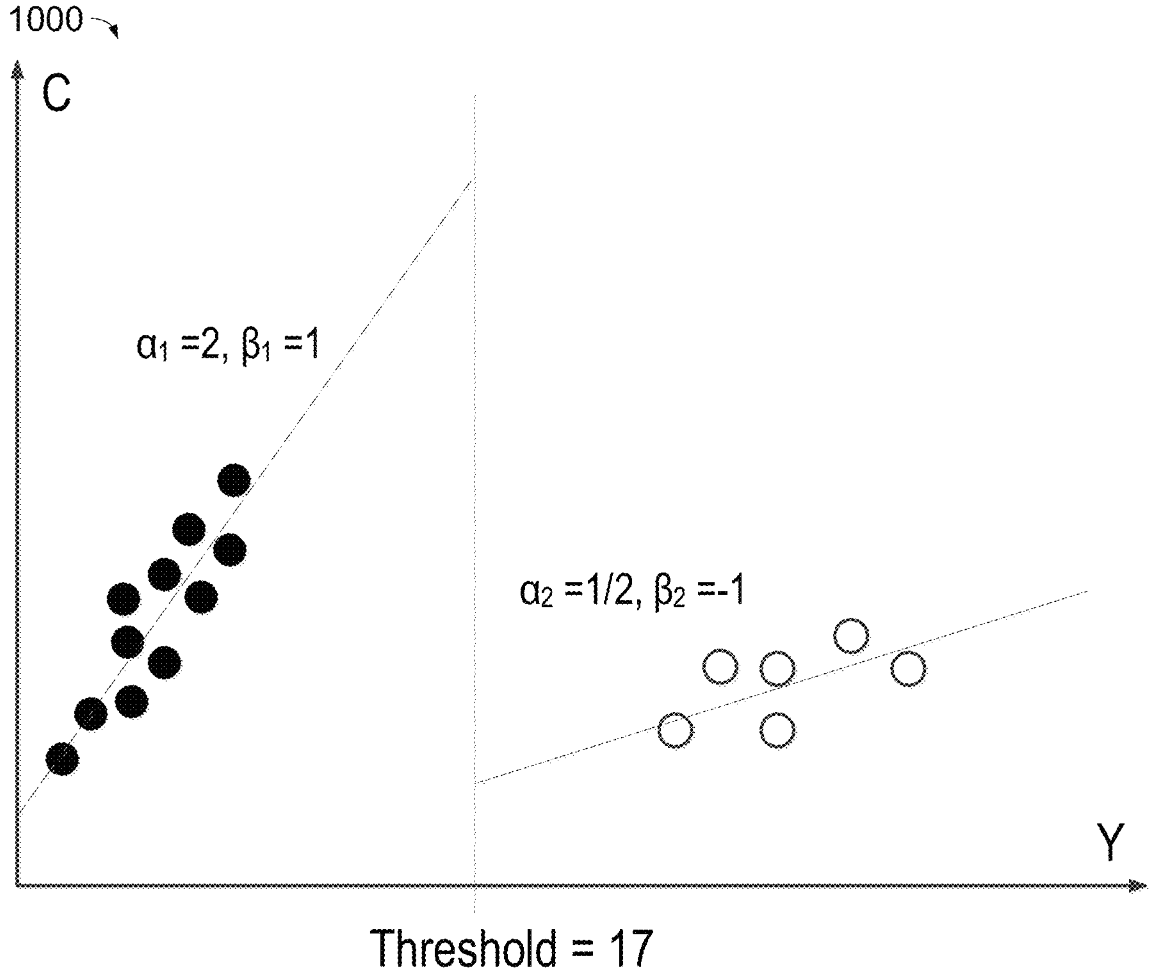
FIG. 10 is a schematic diagram illustrating an example of classifying the neighboring samples into two groups.
Figure 11A:
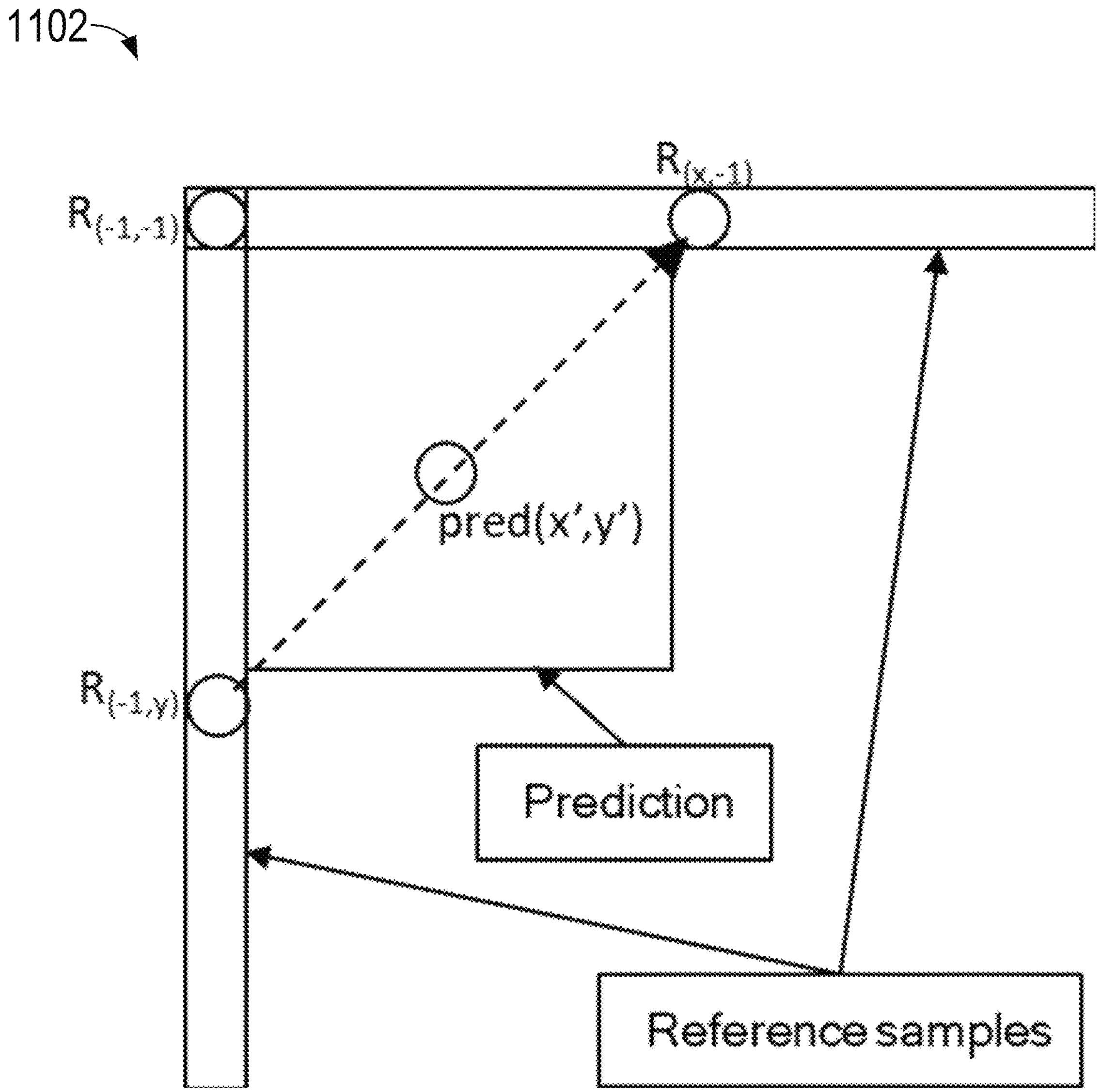
FIG. 11A is a schematic diagram illustrating definition of samples used by PDPC applied to a diagonal top-right mode.
Figure 11B:
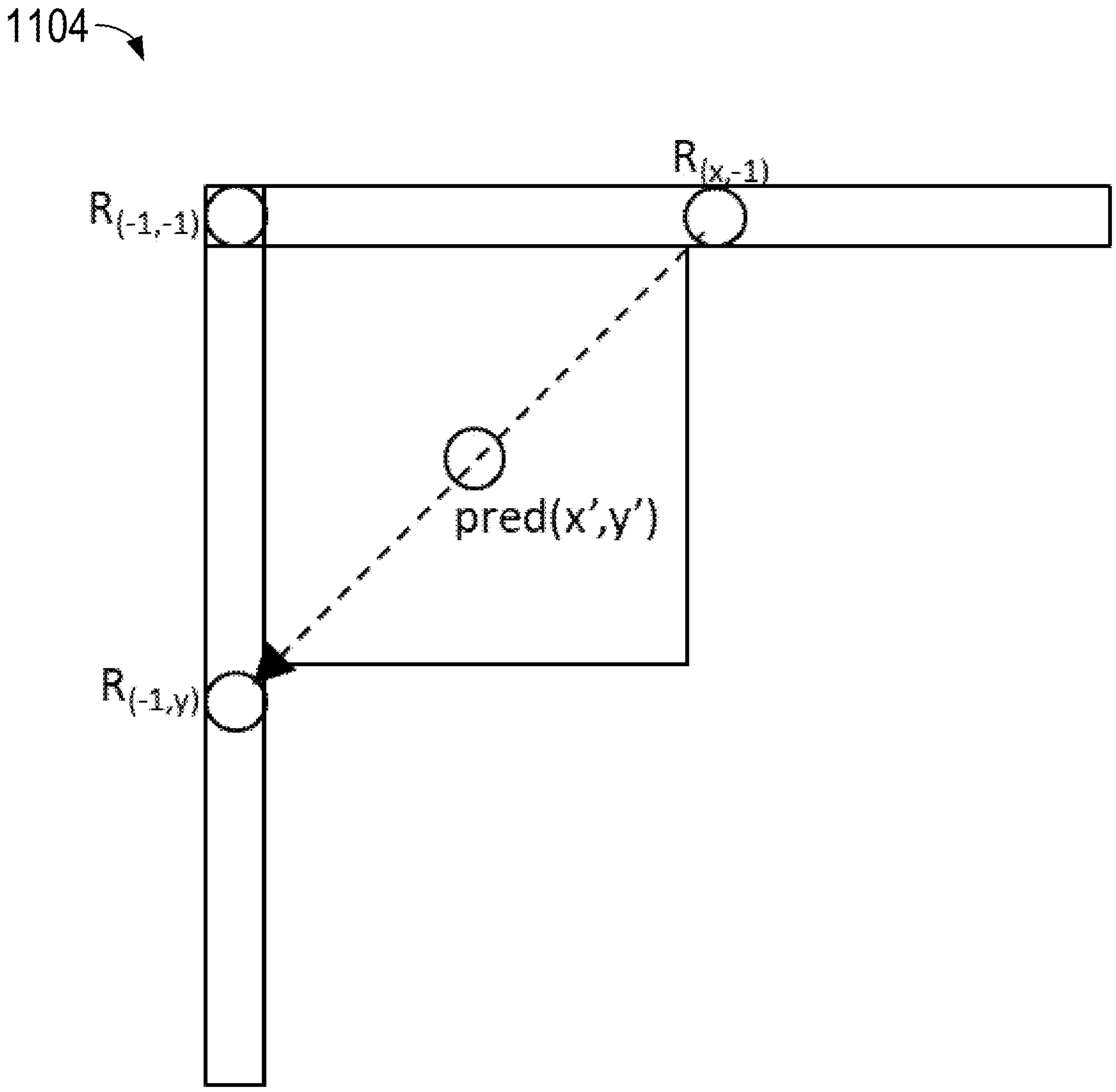
FIG. 11B is a schematic diagram illustrating definition of samples used by PDPC applied to a diagonal bottom-left mode.
Figure 11C:
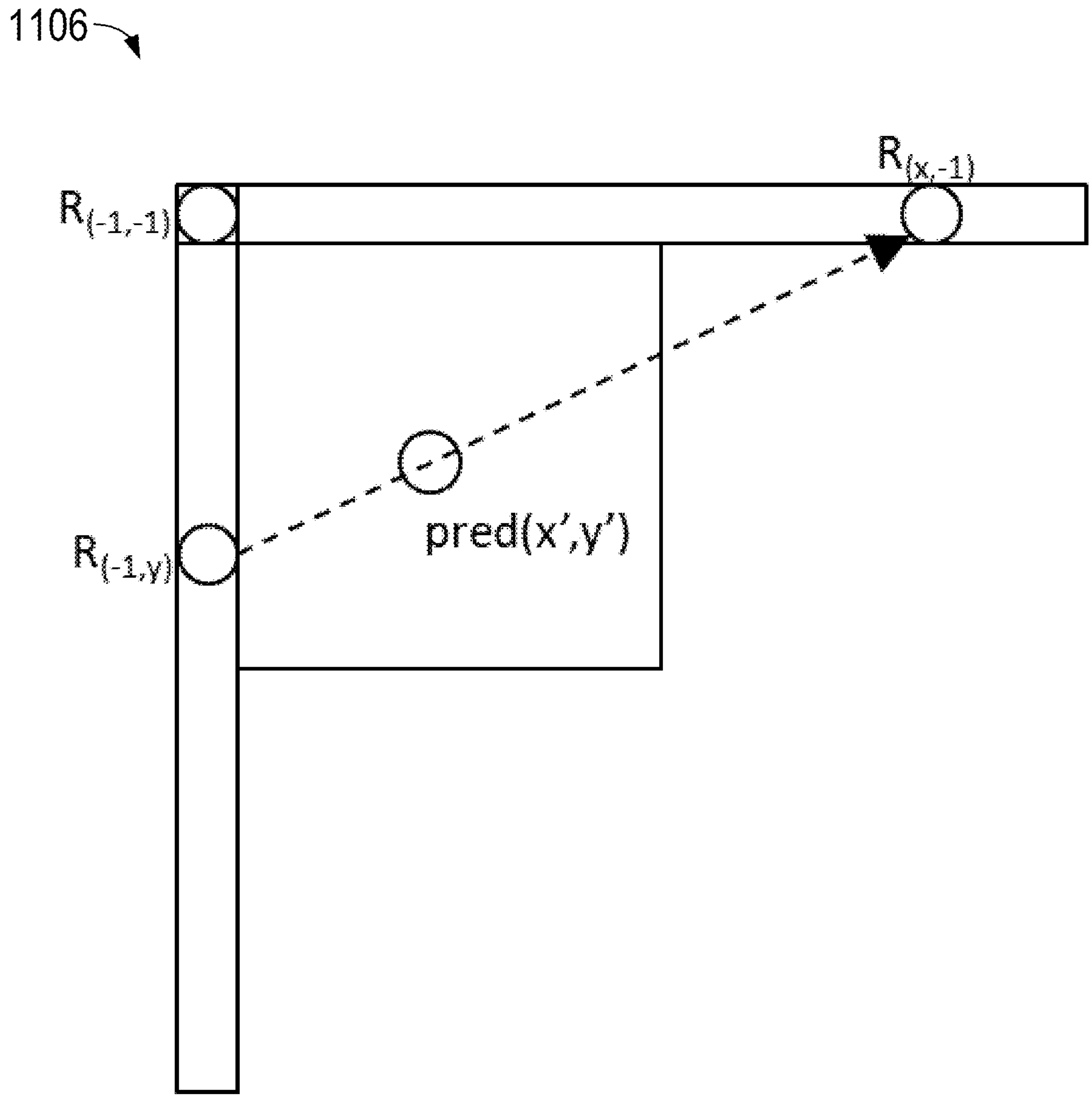
FIG. 11C is a schematic diagram illustrating definition of samples used by PDPC applied to an adjacent diagonal top-right mode.
Figure 11D:
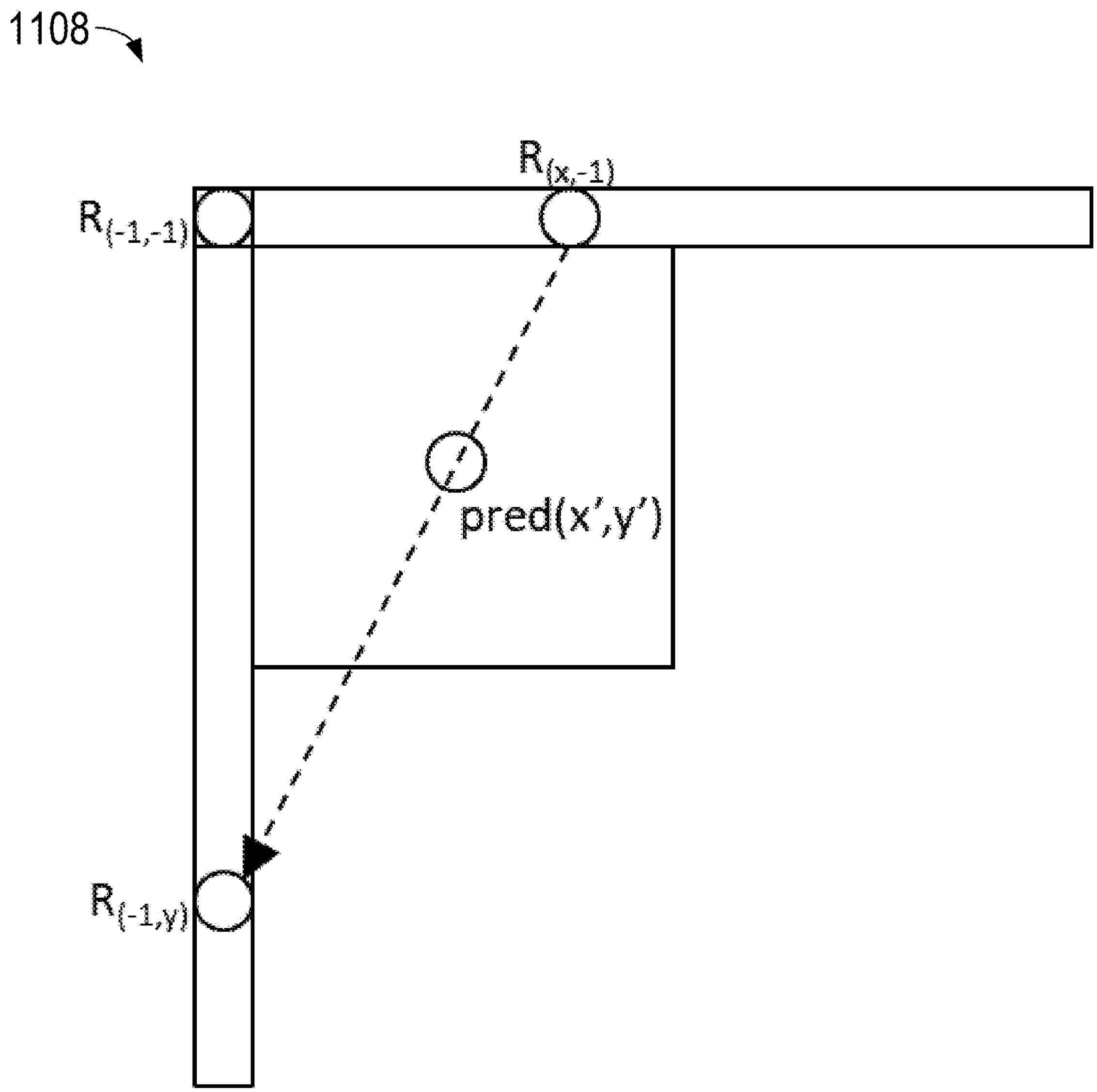
FIG. 11D is a schematic diagram illustrating definition of samples used by PDPC applied to an adjacent diagonal bottom-left mode.

When M is equal to 2, FIG. 10 shows an example of classifying the neighboring samples into two groups. Threshold is calculated as the average value of the neighboring reconstructed Luma samples.

A neighboring sample with Rec'L[x,y]<=Threshold $Rec'_L(x,y) \le Threshold$ is classified into group 1; while a neighboring sample with $Rec'_L[x,y]$>Threshold $Rec'_L[x,y] > Threshold$ is classified into group 2. Similar to CCLM, there are 3 modes in MMLM, namely MMLM, MMLM_T, and MMLM_L. Two models are derived as $$\begin{cases} Pred_C[x, y] = \alpha_1 \times Rec'_L[x, y] + \beta 1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases} \tag{2-8}$$

The threshold which is the average of the luma reconstructed neighboring samples. The linear model of each class is derived by using the Least-Mean-Square (LMS) method, if enabled, or min/max method of VVC.

2.9. Position Dependent Intra Prediction Combination

In VVC, the results of intra prediction of DC, planar and several angular modes are further modified by a position dependent intra prediction combination (PDPC) method. PDPC is an intra prediction method which invokes a combination of the boundary reference samples and HEVC style intra prediction with filtered boundary reference samples. PDPC is applied to the following intra modes without signalling: planar, DC, intra angles less than or equal to horizontal, and intra angles greater than or equal to vertical and less than or equal to 80. If the current block is BDPCM mode or MRL index is larger than 0, PDPC is not applied.

The prediction sample pred(x',y') is predicted using an intra prediction mode (DC, planar, angular) and a linear combination of reference samples according to the Equation 2-8 as follows:

$$\text{pred}(x',y')=\text{Clip}(0,(1<<\text{BitDepth})-1,(wL\times R_{-1,y'}+wT\times R_{x',-1}+(64-wL-wT)\times\text{pred}(x',y')+32)>>6) \tag{2-9}$$

where $R_{x,-1}$, $R_{-1,y}$ represent the reference samples located at the top and left boundaries of current sample (x, y), respectively.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical. For angular modes, if the current angular mode is HOR_IDX or VER_IDX, left or top reference samples is not used, respectively. The PDPC weights and scale factors are dependent on prediction modes and the block sizes. PDPC is applied to the block with both width and height greater than or equal to 4.

FIGS. 11A-11D illustrate the definition of reference samples ($R_{x,-1}$ and $R_{-1,y}$) for PDPC applied over various prediction modes. The prediction sample pred(x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other angular mode, the reference samples $R_{x,-1}$ and $R_{-1,y}$ could be located in fractional sample position. In this case, the sample value of the nearest integer sample location is used.

2.10. Gradient PDPC

Figure 12:
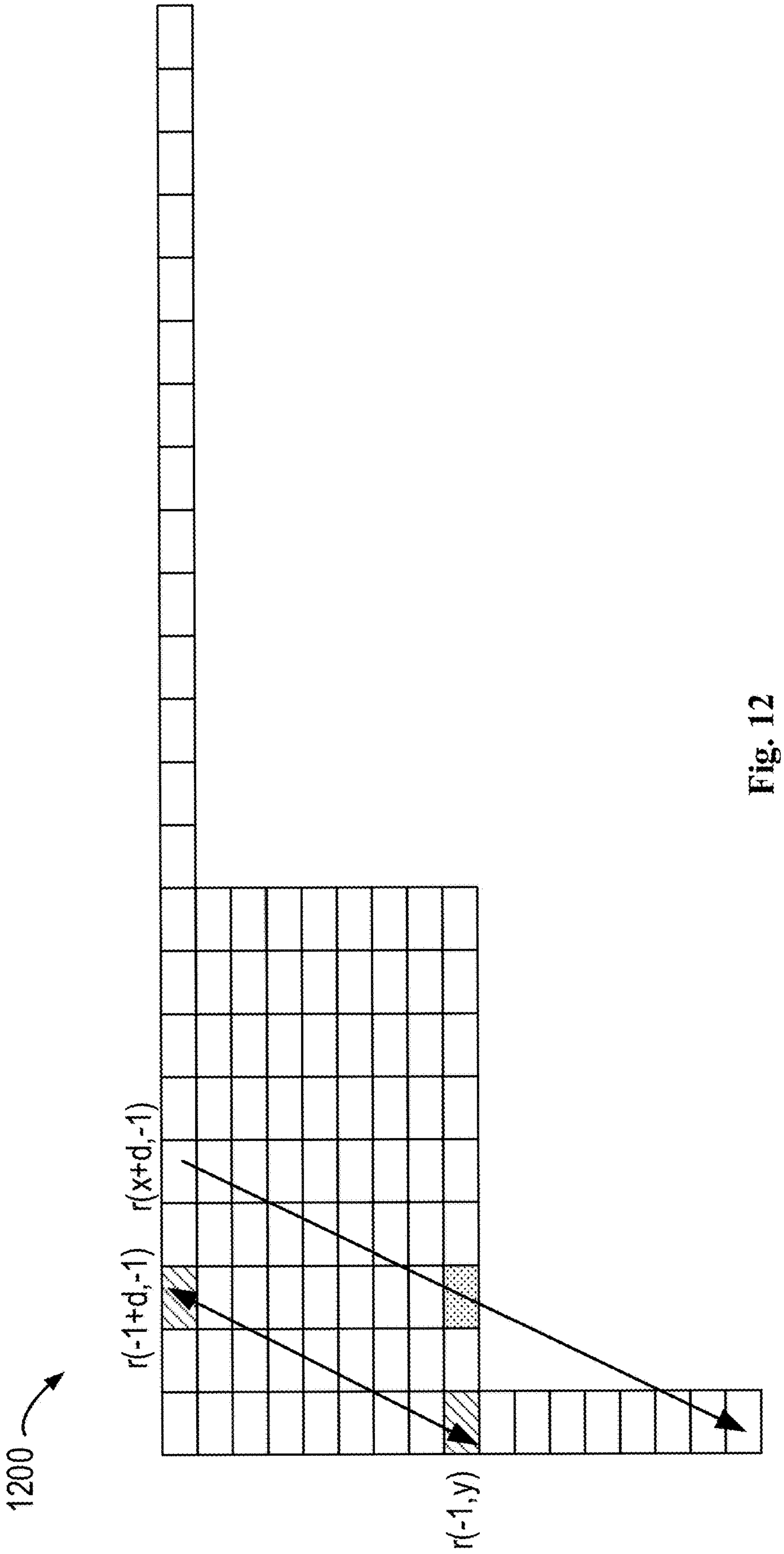
FIG. 12 is a schematic diagram illustrating gradient approach for non-vertical/non-horizontal mode.

The gradient based approach is extended for non-vertical/non-horizontal mode, as shown in FIG. 12. FIG. 12 is a schematic diagram 1200 illustrating gradient approach for non-vertical/non-horizontal mode. Here, the gradient is computed as r(−1, y)−r(−1+d, −1), where d is the horizontal displacement depending on the angular direction. A few points to note here:

The gradient term r(−1, y)−r(−1+d, −1) is needed to be computed once for every row, as it does not depend on the x position.

The computation of d is already part of original intra prediction process which can be reused, so a separate computation of d is not needed. Accordingly, d is in 1/32 pixel accuracy Two tap (linear) filtering is used when d is at fractional position, i.e., if dPos is the displacement in 1/32 pixel accuracy, dInt is the (floored) integer part (dPos>>5), and dFract is the fractional part in 1/32 pixel accuracy (dPos & 31), then r(−1+d) is computed as:

$$r(-1+d)=(32-d\text{Frac})*r(-1+d\text{Int})+d\text{Frac}*r(-1+d\text{Int}+1)$$

This 2 tap filtering is performed once per row (if needed), as explained in a.

Finally, the prediction signal is computed $$p(x,y)=\text{Clip}(((64-wL(x))*p(x,y)+wL(x)*(r(-1,y)-r(-1+d,-1))+32)>>6)$$

Where wL(x)=32>>((x<<1)>>nScale2), and nScale2=(log 2(nTbH)+log 2(nTbW)−2)>>2, which are the same as vertical/horizontal mode. In a nutshell, the same process is applied compared to vertical/horizontal mode (in fact, d=0 indicates vertical/horizontal mode).

Figure 14:
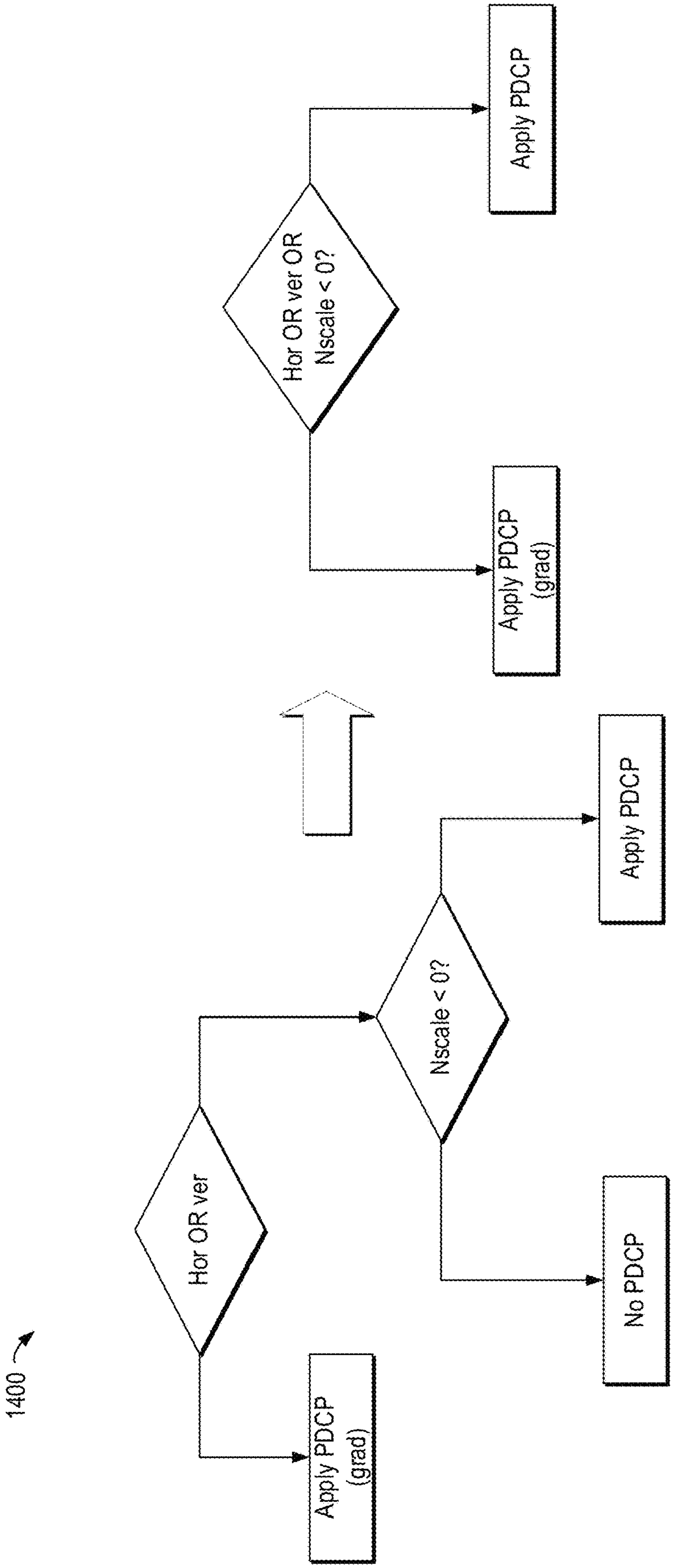
FIG. 14 is a schematic diagram illustrating flowcharts of current PDPC and proposed PDPC.

Second, the gradient based approach is activated for non-vertical/non-horizontal mode when (nScale<0) or when PDPC can't be applied due to unavailability of secondary reference sample. The values of nScale are shown in FIG. 13, with respect to TB size and angular mode, to better visualize the cases where gradient approach is used. FIG. 13 is a schematic diagram 1300 illustrating nScale values with respect to nTbH and mode number; for all nScale<0 cases gradient approach is used. Additionally, in FIG. 14, the flowcharts for current PDPC (left) and proposed PDPC (right) are shown.

2.11. Secondary MPM

Figure 15:
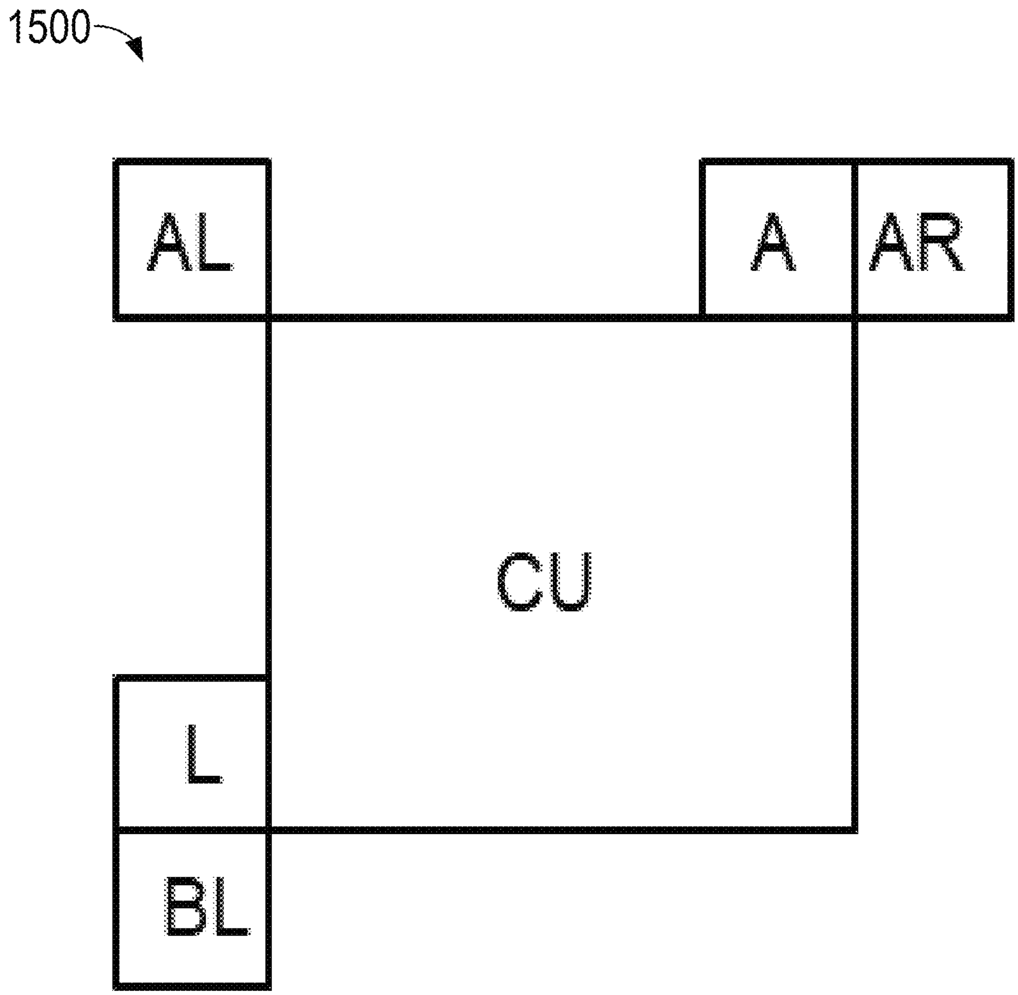
FIG. 15 is a schematic diagram illustrating neighbouring blocks (L, A, BL, AR, AL) used in the derivation of a general MPM list.

The existing primary MPM (PMPM) list consists of 6 entries and the secondary MPM (SMPM) list includes 16 entries. A general MPM list with 22 entries is constructed first, and then the first 6 entries in this general MPM list are included into the PMPM list, and the rest of entries form the SMPM list. The first entry in the general MPM list is the Planar mode. The remaining entries are composed of the intra modes of the left (L), above (A), below-left (BL), above-right (AR), and above-left (AL) neighbouring blocks as shown in FIG. 15, the directional modes with added offset from the first two available directional modes of neighbouring blocks, and the default modes. FIG. 15 is a schematic diagram 1500 illustrating neighbouring blocks (L, A, BL, AR, AL) used in the derivation of a general MPM list.

If a CU block is vertically oriented, the order of neighbouring blocks is A, L, BL, AR, AL; otherwise, it is L, A, BL, AR, AL.

A PMPM flag is parsed first, if equal to 1 then a PMPM index is parsed to determine which entry of the PMPM list is selected, otherwise the SPMPM flag is parsed to determine whether to parse the SMPM index or the remaining modes.

2.12. 6-Tap Intra Interpolation Filter

To improve prediction accuracy, it is proposed to replace 4-tap Cubic interpolation filter with 6-tap interpolation filter, the filter coefficients are derived based on the same polynomial regression model, but with polynomial order of 6.

Filter coefficients are listed below,

{0, 0, 256, 0, 0, 0 }, // 0/32 position
{0, −4, 253, 9, −2, 0 }, // 1/32 position
{1, −7, 249, 17, −4, 0 }, // 2/32 position
{1, −10, 245, 25, −6, 1 }, // 3/32 position
{1, −13, 241, 34, −8, 1 }, // 4/32 position
{2, −16, 235, 44, −10, 1 }, // 5/32 position
{2, −18, 229, 53, −12, 2 }, // 6/32 position
{2, −20, 223, 63, −14, 2 }, // 7/32 position
{2, −22, 217, 72, −15, 2 }, // 8/32 position
{3, −23, 209, 82, −17, 2 }, // 9/32 position
{3, −24, 202, 92, −19, 2 }, // 10/32 position
{3, −25, 194, 101, −20, 3 }, // 11/32 position
{3, −25, 185, 111, −21, 3 }, // 12/32 position
{3, −26, 178, 121, −23, 3 }, // 13/32 position
{3, −25, 168, 131, −24, 3 }, // 14/32 position
{3, −25, 159, 141, −25, 3 }, // 15/32 position
{3, −25, 150, 150, −25, 3 }, // half-pel position The reference samples used for interpolation come from reconstructed samples or padded as in HEVC, so that the conditional check on reference sample availability is not needed.

Figure 16:
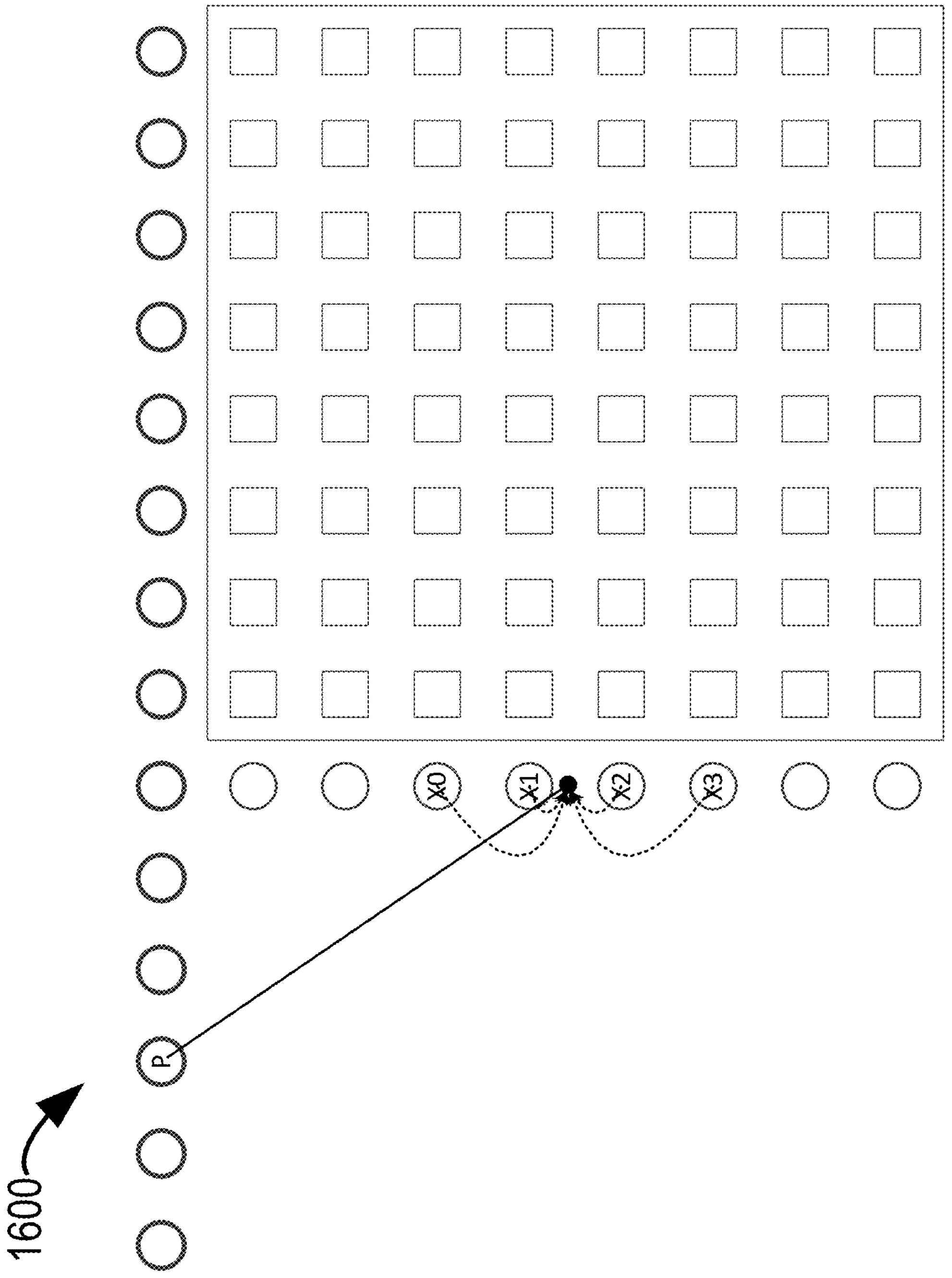
FIG. 16 is a schematic diagram illustrating an example on proposed intra reference mapping.

Instead of using nearest rounding operation to derive the extended Intra reference sample, it is proposed to use 4-tap Cubic interpolation filter. FIG. 16 is a schematic diagram 1600 illustrating an example on proposed intra reference mapping. As shown in an example in FIG. 16, to derive the value of reference sample P, a four tap interpolation filter is used, while in JEM-3.0 or HM, P is directly set as X1.

2.13. Multiple Reference Line (MRL) Intra Prediction

Figure 17:
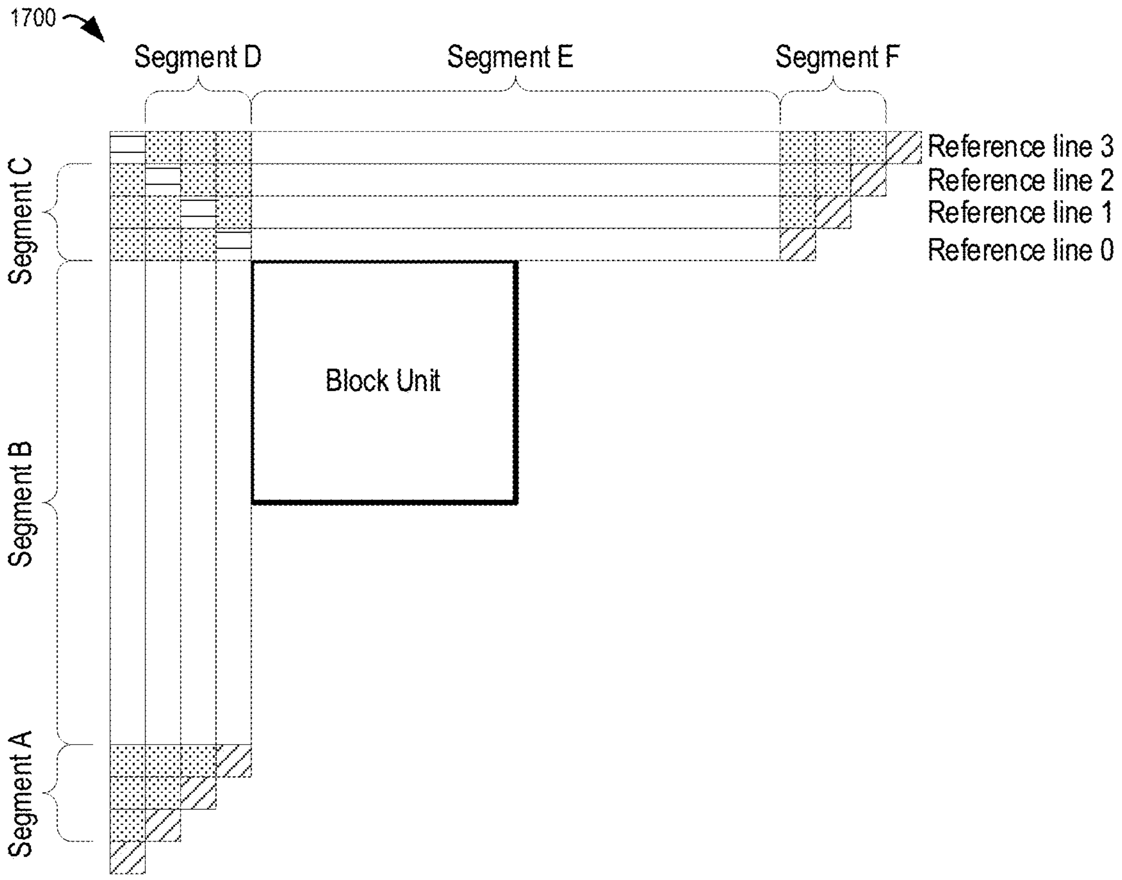
FIG. 17 is a schematic diagram illustrating an example of four reference lines neighbouring to a prediction block.

Multiple reference line (MRL) intra prediction uses more reference lines for intra prediction. FIG. 17 is a schematic diagram 1700 illustrating an example of four reference lines neighbouring to a prediction block. In FIG. 17, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 2) are used.

The index of selected reference line (mrl_idx) is signalled and used to generate intra predictor. For reference line index, which is greater than 0, only include additional reference line modes in MPM list and only signal MPM index without remaining mode. The reference line index is signalled before intra prediction modes, and Planar mode is excluded from intra prediction modes in case a nonzero reference line index is signalled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices are aligned with that of reference line index 0. MRL requires the storage of 3 neighbouring luma reference lines with a CTU to generate predictions. The Cross-Component Linear Model (CCLM) tool also requires 3 neighbouring luma reference lines for its down-sampling filters. The definition of MRL to use the same 3 lines is aligned as CCLM to reduce the storage requirements for decoders.

2.14. Intra Sub-Partitions (ISP)

Figure 18A:
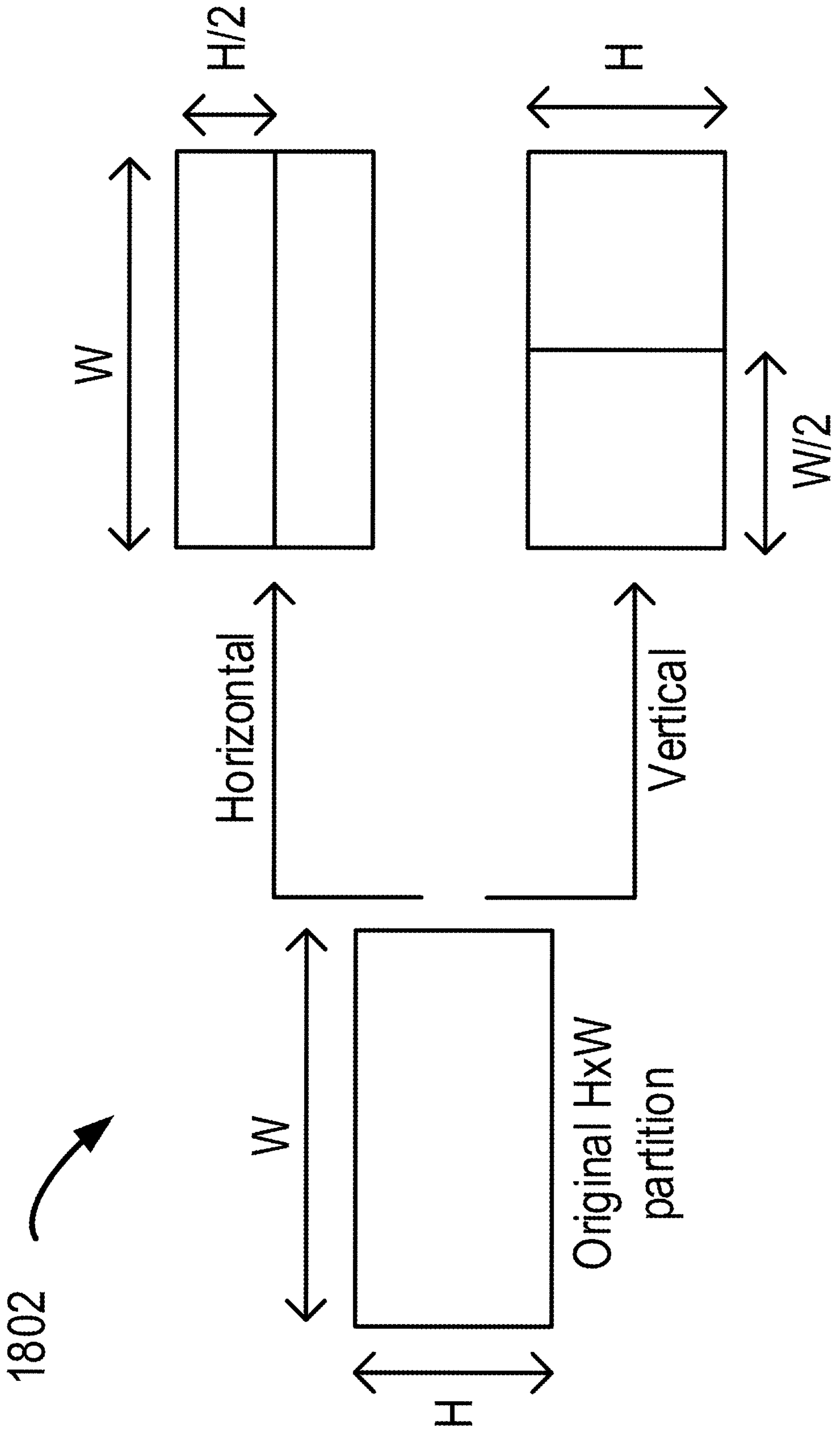
FIG. 18A is a schematic diagram illustrating examples of sub-partitions for 4×8 and 8×4 CUs.
Figure 18B:
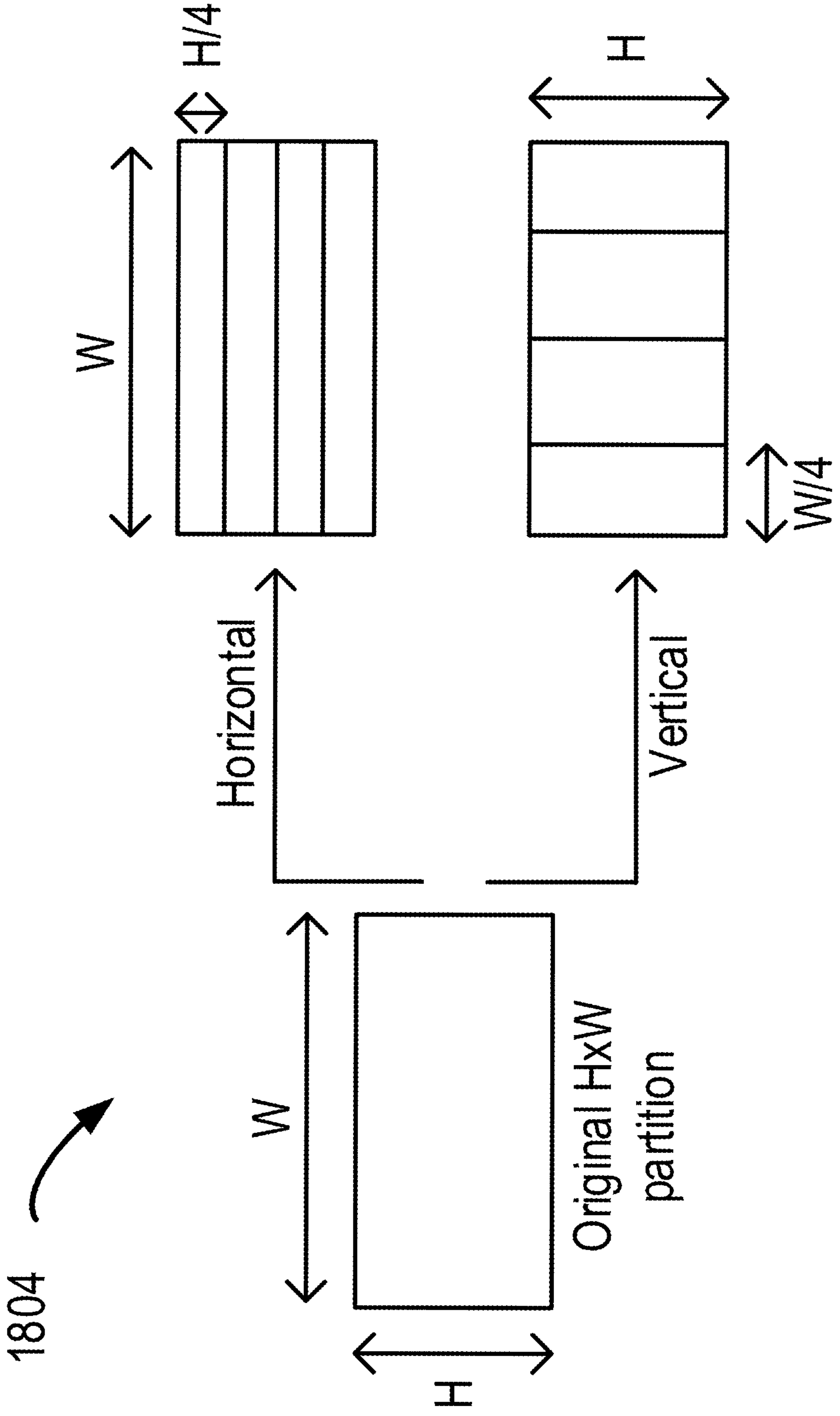
FIG. 18B is a schematic diagram illustrating examples of sub-partitions for CUs other than 4×8, 8×4 and 4×4.

The intra sub-partitions (ISP) divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding M/2×64 chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU sizes that can use ISP is restricted to a maximum of 64×64. FIGS. 18A-18B show examples of the two possibilities. FIG. 18A is a schematic diagram 1802 illustrating examples of sub-partitions for 4×8 and 8×4 CUs. FIG. 18B is a schematic diagram 1804 illustrating examples of sub-partitions for CUs other than 4×8, 8×4 and 4×4. All sub-partitions fulfill the condition of having at least 16 samples.

In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks than processing 4×4 regular-coded intra blocks.

TABLE 2-5

Entropy coding coefficient group size

| Block Size | Coefficient group Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode. The followings are summary of interaction of ISP with other coding tools.

- Multiple Reference Line (MRL): if a block has an MRL index other than 0, then the ISP coding mode will be inferred to be 0 and therefore ISP mode information will not be sent to the decoder.
- Entropy coding coefficient group size: the sizes of the entropy coding subblocks have been modified so that they have 16 samples in all possible cases, as shown in Table 2-5. Note that the new sizes only affect blocks produced by ISP in which one of the dimensions is less than 4 samples. In all other cases coefficient groups keep the 4×4 dimensions.
- CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.
- Transform size restriction: all ISP transforms with a length larger than 16 points uses the DCT-II.
- MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.

If w≥4 and w≤16, $t_H$=DST-VII, otherwise, $t_H$=DCT-II

If h≥4 and h≤16, $t_V$=DST-VII, otherwise, $t_V$=DCT-II

In ISP mode, all 67 intra prediction modes are allowed. PDPC is also applied if corresponding width and height is at least 4 samples long. In addition, the reference sample filtering process (reference smoothing) and the condition for intra interpolation filter selection doesn't exist anymore, and Cubic (DCT-IF) filter is always applied for fractional position interpolation in ISP mode.

2.15. Matrix Weighted Intra Prediction (MIP)

Figure 19:
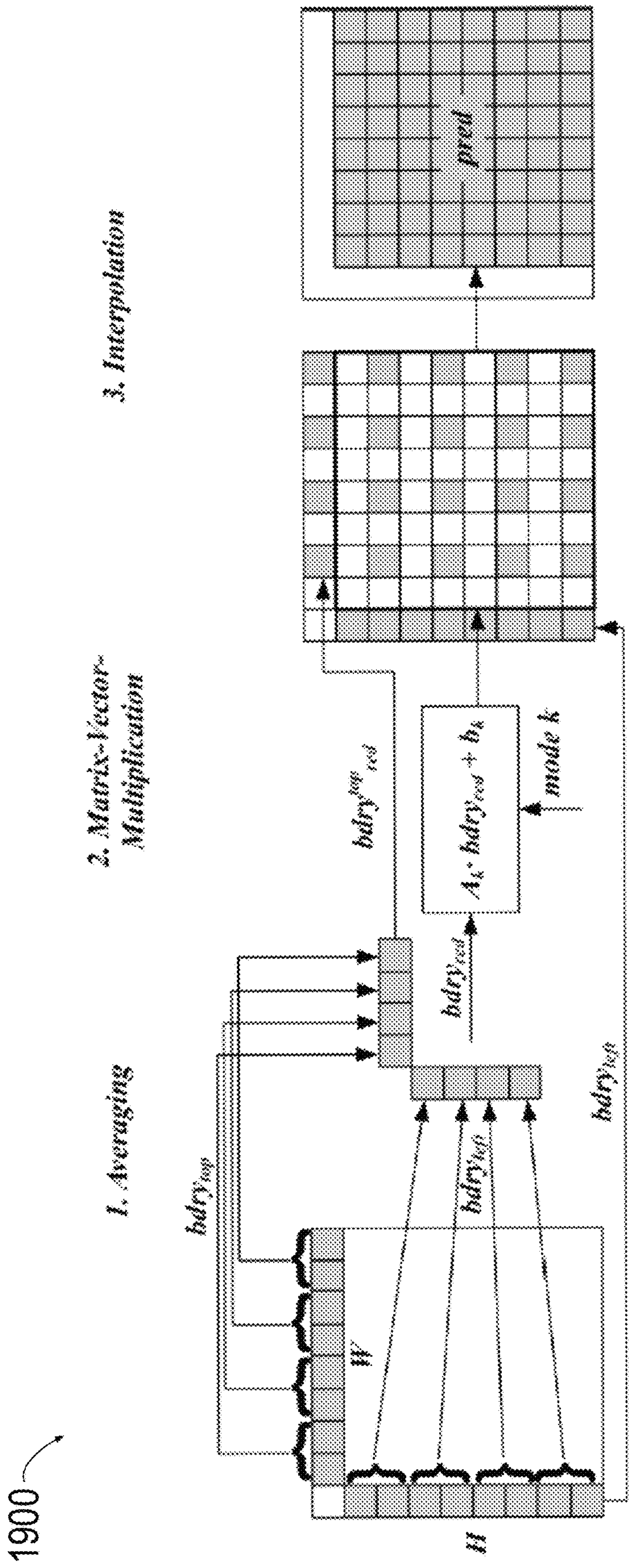
FIG. 19 is a schematic diagram illustrating matrix weighted intra prediction process.

Matrix weighted intra prediction (MIP) method is a newly added intra prediction technique into VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the prediction signal is based on the following three steps, which are averaging, matrix vector multiplication and linear interpolation as shown in FIG. 19. FIG. 19 is a schematic diagram 1900 illustrating matrix weighted intra prediction process.

2.15.1 Averaging Neighbouring Samples

Among the boundary samples, four samples or eight samples are selected by averaging based on block size and shape. Specifically, the input boundaries $bdry^{top}$ and $bdry^{left}$ are reduced to smaller boundaries $$bdry_{red}^{top} \text{ and } bdry_{red}^{left}$$

by averaging neighbouring boundary samples according to predefined rule depends on block size. Then, the two reduced boundaries $$bdry_{red}^{top} \text{ and } bdry_{red}^{left}$$

are concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6. \end{cases} \quad (2\text{-}10)$$

2.15.2 Matrix Multiplication

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the down-sampled block of width $W_{red}$ and height $H_{red}$ is generated. Here, $W_{red}$ and $H_{red}$ are defined as:

$$W_{red}=\begin{cases}4 & \text{for } \max(W,H)\le 8\\ \min(W,8) & \text{for } \max(W,H)>8\end{cases} \quad (2\text{-}11)$$

$$H_{red}=\begin{cases}4 & \text{for } \max(W,H)\le 8\\ \min(H,8) & \max(W,H)>8\end{cases} \quad (2\text{-}12)$$

The reduced prediction signal $pred_{red}$ is computed by calculating a matrix vector product and adding an offset:

$$pred_{red}=A\cdot bdry_{red}+b. \quad (2\text{-}13)$$

Here, A is a matrix that has $W_{red}\cdot H_{red}$ rows and 4 columns if W=H=4 and 8 columns in all other cases. b is a vector of size $W_{red}\cdot H_{red}$. The matrix A and the offset vector b are taken from one of the sets $S_0$, $S_1$, $S_2$. One defines an index idx=idx(W, H) as follows:

$$idx(W,H)=\begin{cases}0 & \text{for } W=H=4\\ 1 & \text{for } \max(W,H)=8\\ 2 & \text{for } \max(W,H)>8.\end{cases} \quad (2\text{-}14)$$

Here, each coefficient of the matrix A is represented with 8 bit precision. The set $S_0$ consists of 16 matrices $$A_0^i,\ i\in\{0,\ldots,15\}$$

each of which has 16 rows and 4 columns and 16 offset vectors $$b_0^i,\ i\in\{0,\ldots,16\}$$

each of size 16. Matrices and offset vectors of that set are used for blocks of size 4×4. The set $S_1$ consists of 8 matrices $$A_1^i,\ i\in\{0,\ldots,7\},$$

each of which has 16 rows and 8 columns and 8 offset vectors $$b_1^i,\ i\in\{0,\ldots,7\}$$

each of size 16. The set $S_2$ consists of 6 matrices $$A_2^i,\ i\in\{0,\ldots,5\},$$

each of which has 64 rows and 8 columns and of 6 offset vectors $$b_2^i,\ i\in\{0,\ldots,5\}$$

of size 64.

2.15.3 Interpolation

The prediction signal at the remaining positions is generated from the prediction signal on the subsampled set by linear interpolation which is a single step linear interpolation in each direction. The interpolation is performed firstly in the horizontal direction and then in the vertical direction regardless of block shape or block size.

2.15.4 Signalling of MIP Mode and Harmonization With Other Coding Tools

For each Coding Unit (CU) in intra mode, a flag indicating whether an MIP mode is to be applied or not is sent. If an MIP mode is to be applied, MIP mode (predModeIntra) is signalled. For an MIP mode, a transposed flag (isTransposed), which determines whether the mode is transposed, and MIP mode Id (modeId), which determines which matrix is to be used for the given MIP mode is derived as follows isTransposed=predModeIntra&1 modeId=predModeIntra>>1 (2-15)

MIP coding mode is harmonized with other coding tools by considering following aspects:

- LFNST is enabled for MIP on large blocks. Here, the LFNST transforms of planar mode are used
- The reference sample derivation for MIP is performed exactly as for the conventional intra prediction modes
- For the up-sampling step used in the MIP-prediction, original reference samples are used instead of down-sampled ones
- Clipping is performed before up-sampling and not after up-sampling
- MIP is allowed up to 64×64 regardless of the maximum transform size The number of MIP modes is 32 for sizeId=0, 16 for sizeId=1 and 12 for sizeId=2

2.16. Decoder-Side Intra Mode Derivation

In JEM-2.0 intra modes are extended to 67 from 35 modes in HEVC, and they are derived at encoder and explicitly signalled to decoder. A significant amount of overhead is spent on intra mode coding in JEM-2.0.For example, the intra mode signalling overhead may be up to 5~10% of overall bitrate in all intra coding configuration. This contribution proposes the decoder-side intra mode derivation approach to reduce the intra mode coding overhead while keeping prediction accuracy.

To reduce the overhead of intra mode signalling, this contribution presents a decoder-side intra mode derivation (DIMD) approach. In the proposed approach, instead of signalling intra mode explicitly, the information is derived at both encoder and decoder from the neighbouring reconstructed samples of current block. The intra mode derived by DIMD is used in two ways:

1) For 2N×2N CUs, the DIMD mode is used as the intra mode for intra prediction when the corresponding CU-level DIMD flag is turned on;
2) For N×N CUs, the DIMD mode is used to replace one candidate of the existing MPM list to improve the efficiency of intra mode coding.

2.16.1 Templated Based Intra Mode Derivation

Figure 20:
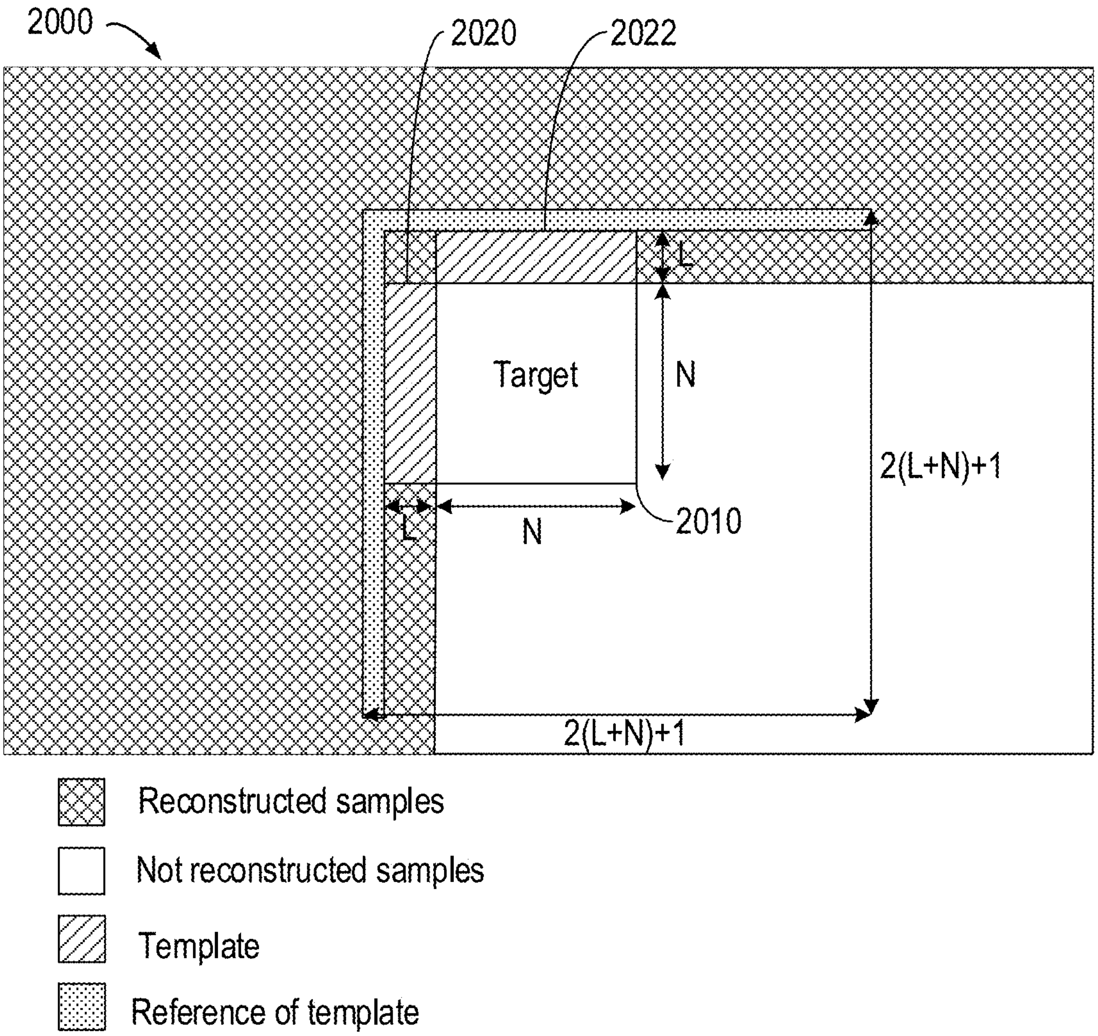
FIG. 20 is a schematic diagram illustrating target samples, template samples and the reference samples of template used in the DIMD.

FIG. 20 is a schematic diagram 2000 illustrating target samples, template samples and the reference samples of template used in the DIMD. As illustrated in FIG. 20, the target denotes the current block (of block size N) for which intra prediction mode is to be estimated. The template (indicated by the patterned region in FIG. 20) specifies a set of already reconstructed samples, which are used to derive the intra mode. The template size is denoted as the number of samples within the template that extends to the above and the left of the target block, i.e., L. In the current implementation, a template size of 2 (i.e., L=2) is used for 4×4 and 8×8 blocks and a template size of 4 (i.e., L=4) is used for 16×16 and larger blocks. The reference of template (indicated by the dotted region in FIG. 20) refers to a set of neighbouring samples from above and left of the template, as defined by JEM-2.0. Unlike the template samples which are always from reconstructed region, the reference samples of template may not be reconstructed yet when encoding/decoding the target block. In this case, the existing reference samples substitution algorithm of JEM-2.0 is utilized to substitute the unavailable reference samples with the available reference samples.

For each intra prediction mode, the DIMD calculates the absolute difference (SAD) between the reconstructed template samples and its prediction samples obtained from the reference samples of the template. The intra prediction mode that yields the minimum SAD is selected as the final intra prediction mode of the target block.

2.16.2 DIMD for Intra 2N×2N CUs

For intra 2N×2N CUs, the DIMD is used as one additional intra mode, which is adaptively selected by comparing the DIMD intra mode with the optimal normal intra mode (i.e., being explicitly signalled). One flag is signalled for each intra 2N×2N CU to indicate the usage of the DIMD. If the flag is one, then the CU is predicted using the intra mode derived by DIMD; otherwise, the DIMD is not applied and the CU is predicted using the intra mode explicitly signalled in the bit-stream. When the DIMD is enabled, chroma components always reuse the same intra mode as that derived for luma component, i.e., DM mode.

Additionally, for each DIMD-coded CU, the blocks in the CU can adaptively select to derive their intra modes at either PU-level or TU-level. Specifically, when the DIMD flag is one, another CU-level DIMD control flag is signalled to indicate the level at which the DIMD is performed. If this flag is zero, it means that the DIMD is performed at the PU level and all the TUs in the PU use the same derived intra mode for their intra prediction; otherwise (i.e., the DIMD control flag is one), it means that the DIMD is performed at the TU level and each TU in the PU derives its own intra mode.

Further, when the DIMD is enabled, the number of angular directions increases to 129, and the DC and planar modes still remain the same. To accommodate the increased granularity of angular intra modes, the precision of intra interpolation filtering for DIMD-coded CUs increases from 1/32-pel to 1/64-pel. Additionally, in order to use the derived intra mode of a DIMD coded CU as MPM candidate for neighbouring intra blocks, those 129 directions of the DIMD-coded CUs are converted to “normal” intra modes (i.e., 65 angular intra directions) before they are used as MPM.

2.16.3 DIMD for Intra N×N CUs

In the proposed method, intra modes of intra N×N CUs are always signalled. However, to improve the efficiency of intra mode coding, the intra modes derived from DIMD are used as MPM candidates for predicting the intra modes of four PUs in the CU. In order to not increase the overhead of MPM index signalling, the DIMD candidate is always placed at the first place in the MPM list and the last existing MPM candidate is removed. Also, pruning operation is performed such that the DIMD candidate will not be added to the MPM list if it is redundant.

2.16.4 Intra Mode Search Algorithm of DIMD

In order to reduce encoding/decoding complexity, one straightforward fast intra mode search algorithm is used for DIMD. Firstly, one initial estimation process is performed to provide a good starting point for intra mode search. Specifically, an initial candidate list is created by selecting N fixed modes from the allowed intra modes. Then, the SAD is calculated for all the candidate intra modes and the one that minimizes the SAD is selected as the starting intra mode. To achieve a good complexity/performance trade-off, the initial candidate list consists of 11 intra modes, including DC, planar and every 4-th mode of the 33 angular intra directions as defined in HEVC, i.e., intra modes 0, 1, 2, 6, 10 . . . 30, 34.

If the starting intra mode is either DC or planar, it is used as the DIMD mode. Otherwise, based on the starting intra mode, one refinement process is then applied where the optimal intra mode is identified through one iterative search. It works by comparing at each iteration the SAD values for three intra modes separated by a given search interval and maintain the intra mode that minimize the SAD. The search interval is then reduced to half, and the selected intra mode from the last iteration will serve as the center intra mode for the current iteration. For the current DIMD implementation with 129 angular intra directions, up to 4 iterations are used in the refinement process to find the optimal DIMD intra mode.

2.17. Decoder-Side Intra Mode Derivation by Calculating the Gradients of Neighbouring Samples Three angular modes are selected from a Histogram of Gradient (HoG) computed from the neighboring pixels of current block. Once the three modes are selected, their predictors are computed normally and then their weighted average is used as the final predictor of the block. To determine the weights, corresponding amplitudes in the HoG are used for each of the three modes. The DIMD mode is used as an alternative prediction mode and is always checked in the FullRD mode.

Current version of DIMD has modified some aspects in the signaling, HoG computation and the prediction fusion. The purpose of this modification is to improve the coding performance as well as addressing the complexity concerns raised during the last meeting (i.e., throughput of 4×4 blocks). The following sections describe the modifications for each aspect.

2.17.1 Signalling

Figure 21:
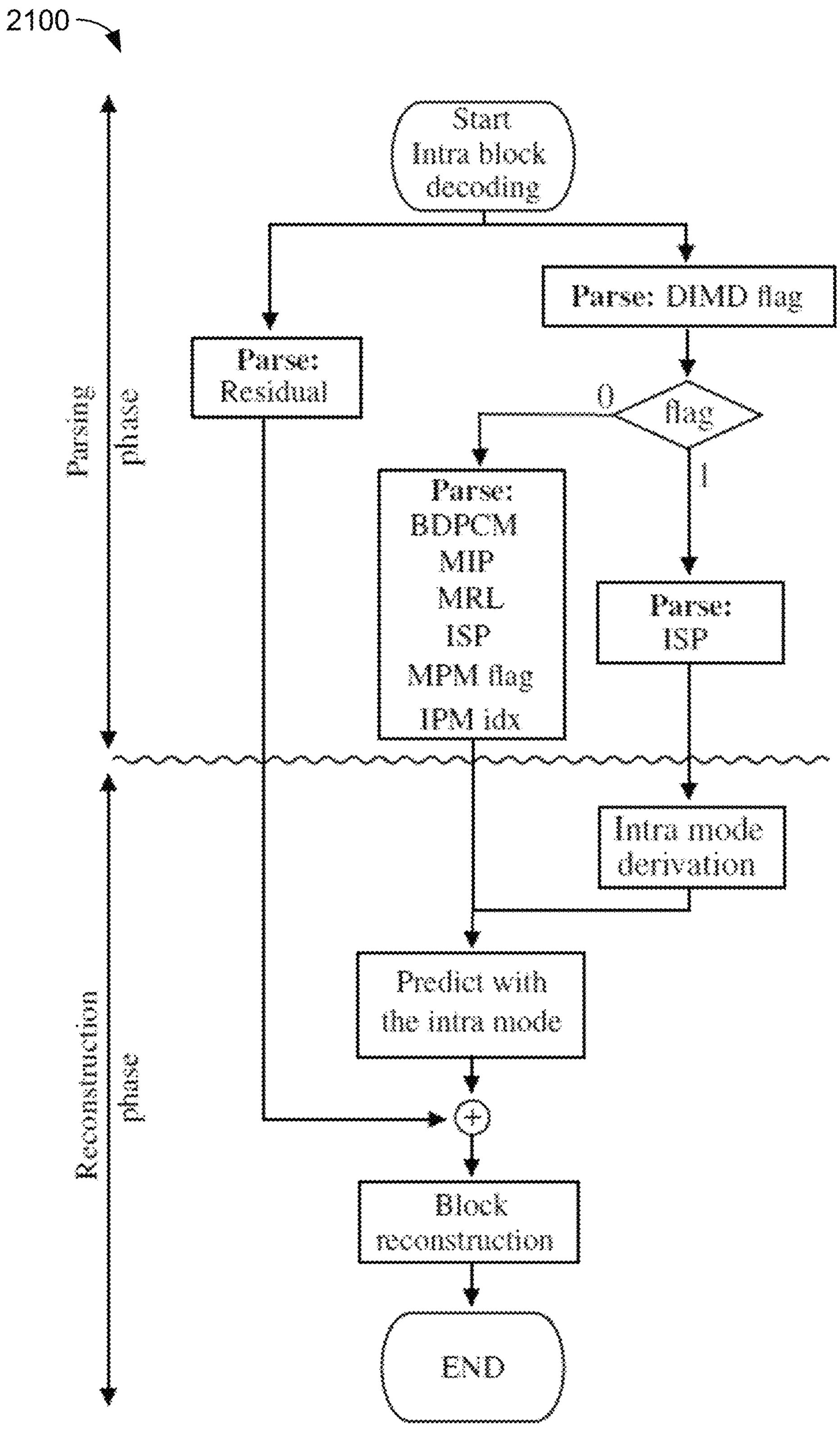
FIG. 21 is a schematic diagram illustrating proposed intra block decoding process.

FIG. 21 is a schematic diagram 2100 illustrating proposed intra block decoding process. FIG. 21 shows the order of parsing flags/indices in VTM5, integrated with the proposed DIMD.

As can be seen, the DIMD flag of the block is parsed first using a single CABAC context, which is initialized to the default value of 154.

If flag==0, then the parsing continues normally.

Else (if flag==1), only the ISP index is parsed and the following flags/indices are inferred to be zero: BDPCM flag, MIP flag, MRL index. In this case, the entire IPM parsing is also skipped.

During the parsing phase, when a regular non-DIMD block inquires the IPM of its DIMD neighbor, the mode PLANAR_IDX is used as the virtual IPM of the DIMD block.

2.17.2 Texture Analysis

Figure 22:
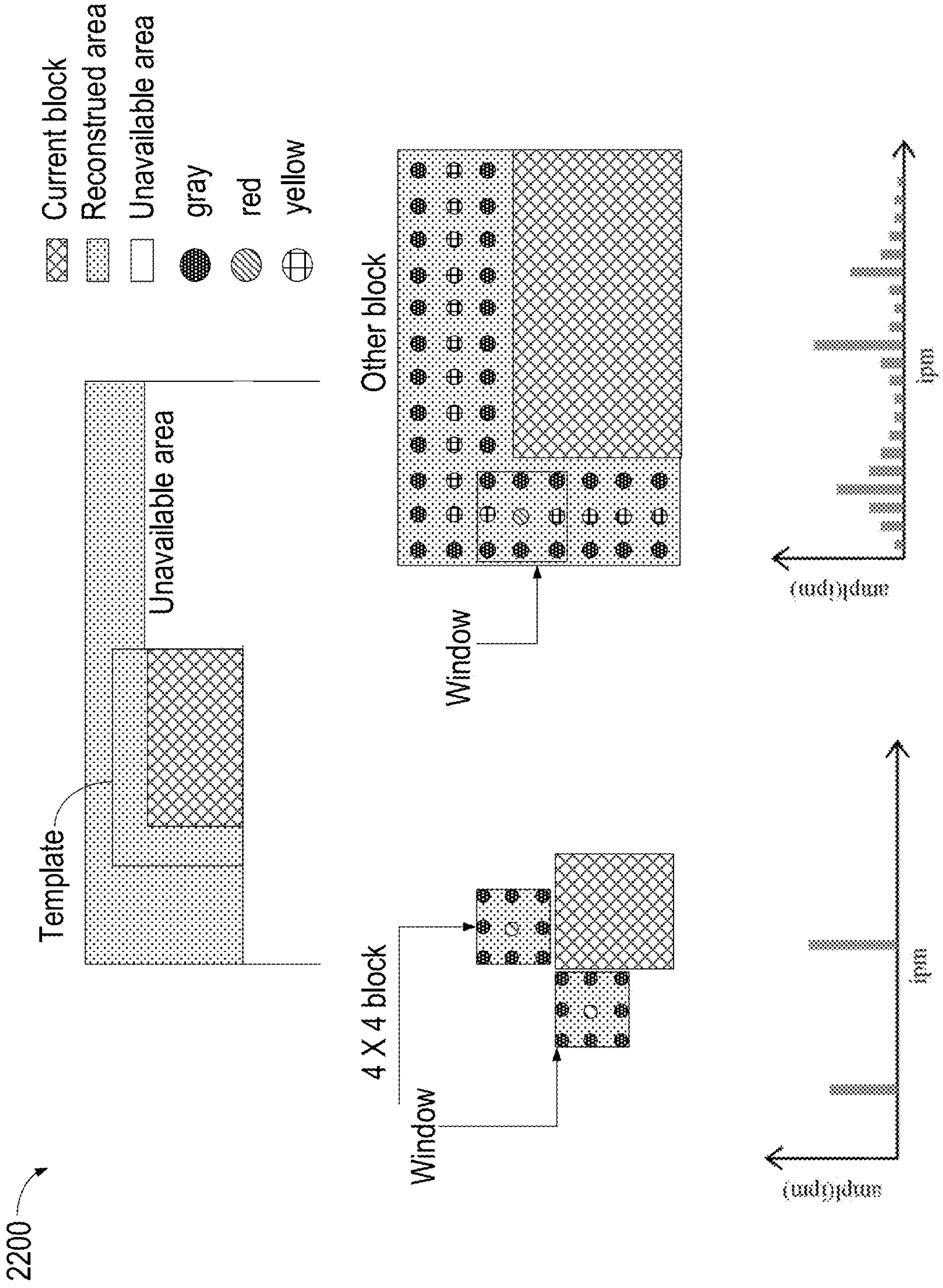
FIG. 22 is a schematic diagram illustrating HoG computation from a template of width 3 pixels.

The texture analysis of DIMD includes a Histogram of Gradient (HoG) computation (FIG. 22). The HoG computation is carried out by applying horizontal and vertical Sobel filters on pixels in a template of width 3 around the block. Except, if above template pixels fall into a different CTU, then they will not be used in the texture analysis.

Once computed, the IPMs corresponding to two tallest histogram bars are selected for the block.

In previous versions, all pixels in the middle line of the template were involved in the HoG computation. However, the current version improves the throughput of this process by applying the Sobel filter more sparsely on 4×4 blocks. To this aim, only one pixel from left and one pixel from above are used. This is shown in FIG. 22. FIG. 22 is a schematic diagram 2200 illustrating HoG computation from a template of width 3 pixels.

In addition to reduction in the number of operations for gradient computation, this property also simplifies the selection of best 2 modes from the HoG, as the resulting HoG cannot have more than two non-zero amplitudes.

2.17.3 Prediction Fusion

The current method uses a fusion of three predictors for each block. However, it is proposed that the choice of prediction modes is different and makes use of the combined hypothesis intra-prediction method, where the Planar mode is considered to be used in combination with other modes when computing an intra-predicted candidate. In the current version, the two IPMs corresponding to two tallest HoG bars are combined with the Planar mode.

Figure 23:
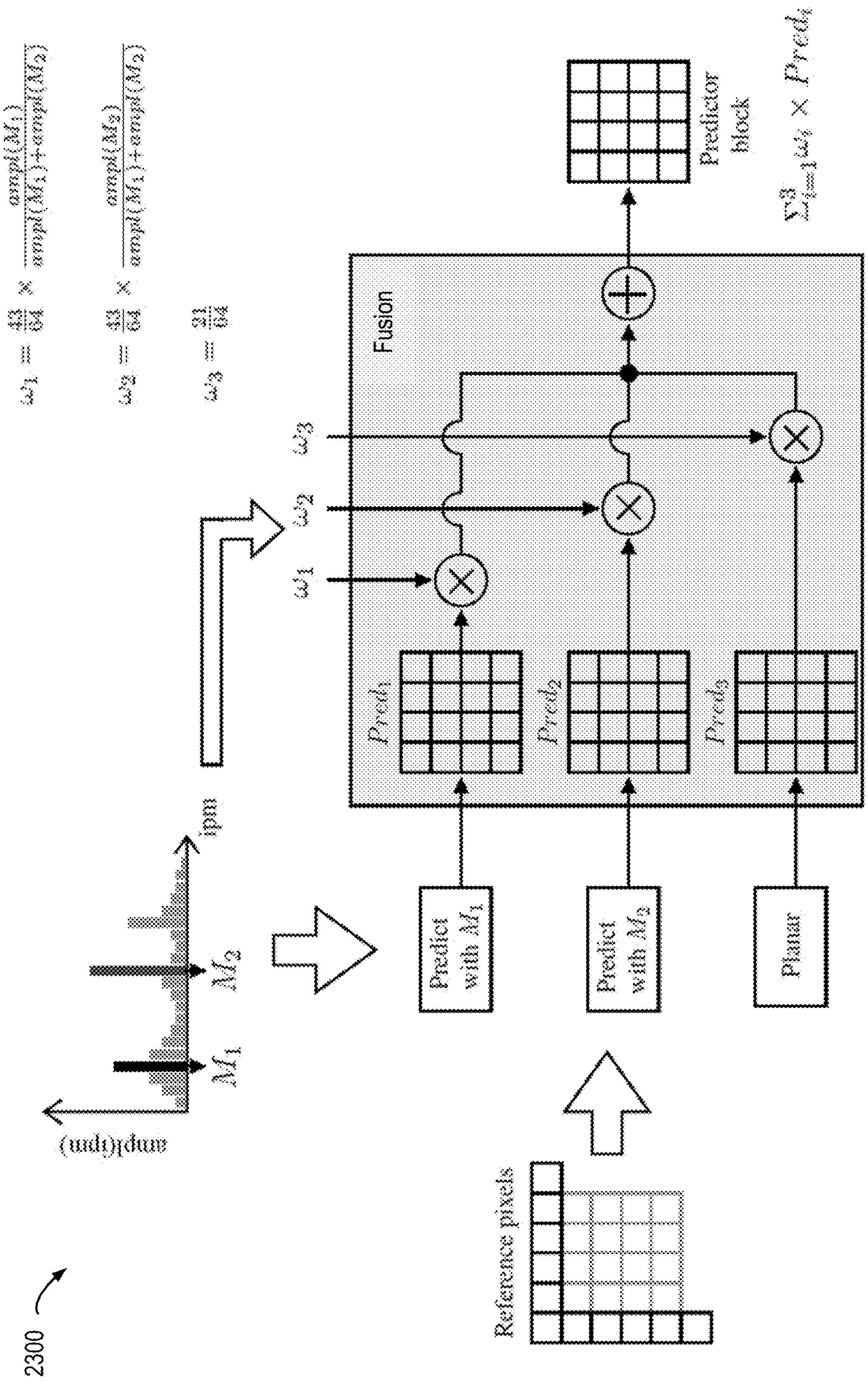
FIG. 23 is a schematic diagram illustrating prediction fusion by weighted averaging of two HoG modes and planar.

The prediction fusion is applied as a weighted average of the above three predictors. To this aim, the weight of planar is fixed to $21/64$ (~$1/3$). The remaining weight of $43/64$ (~$2/3$) is then shared between the two HoG IPMs, proportionally to the amplitude of their HoG bars. FIG. 23 visualises this process. FIG. 23 is a schematic diagram 2300 illustrating prediction fusion by weighted averaging of two HoG modes and planar.

2.18. Template-Based Intra Mode Derivation (TIMD)

This contribution proposes a template-based intra mode derivation (TIMD) method using MPMs, in which a TIMD mode is derived from MPMs using the neighbouring template. The TIMD mode is used as an additional intra prediction method for a CU.

2.18.1 TIMD Mode Derivation

For each intra prediction mode in MPMs, The SATD between the prediction and reconstruction samples of the template is calculated. The intra prediction mode with the minimum SATD is selected as the TIMD mode and used for intra prediction of current CU. Position dependent intra prediction combination (PDPC) is included in the derivation of the TIMD mode.

2.18.2 TIMD Signalling

A flag is signalled in sequence parameter set (SPS) to enable/disable the proposed method. When the flag is true, a CU level flag is signalled to indicate whether the proposed TIMD method is used. The TIMD flag is signalled right after the MIP flag. If the TIMD flag is equal to true, the remaining syntax elements related to luma intra prediction mode, including MRL, ISP, and normal parsing stage for luma intra prediction modes, are all skipped.

2.18.3 Interaction With New Coding Tools

A DIMD method with prediction fusion using Planar was integrated in EE2. When EE2 DIMD flag is equal to true, the proposed TIMD flag is not signalled and set equal to false.

Similar to PDPC, Gradient PDPC is also included in the derivation of the TIMD mode.

When secondary MPM is enabled, both the primary MPMs and the secondary MPMs are used to derive the TIMD mode.

6-tap interpolation filter is not used in the derivation of the TIMD mode.

2.18.4 Modification of MPM List Construction in the Derivation of TIMD Mode

During the construction of MPM list, intra prediction mode of a neighbouring block is derived as Planar when it is inter-coded. To improve the accuracy of MPM list, when a neighbouring block is inter-coded, a propagated intra prediction mode is derived using the motion vector and reference picture and used in the construction of MPM list. This modification is only applied to the derivation of the TIMD mode.

2.18.5 TIMD With Fusion

Instead of selecting the only one mode with the smallest SATD cost, this contribution proposes to choose the first two modes with the smallest SATD costs for the intra modes derived using TIMD method and then fuse them with the weights, and such weighted intra prediction is used to code the current CU.

The costs of the two selected modes are compared with a threshold, in the test the cost factor of 2 is applied as follows:

costMode2<2□costMode1.

If this condition is true, the fusion is applied, otherwise the only model is used.

Weights of the modes are computed from their SATD costs as follows:

weight1=costMode2/(costMode1+costMode2)

weight2=1−weight1

3. PROBLEMS

1. In above described design of intra prediction for chroma components, the indication of intra prediction mode is signalled in the bitstream. However, the signalling of the indication may limit the compression efficiency, especially in the low bit rate scenarios.
2. In above described design of DIMD and TIMD with fusion, division operation and floating point are used to derive the weights of each intra prediction mode, which is not hardware-friendly.

4. EXEMPLARY EMBODIMENTS

The detailed embodiments below should be considered as examples to explain general concepts. These embodiments should not be interpreted in a narrow way. Furthermore, these embodiments can be combined in any manner.

In this disclosure, the term decoder-side derivation of intra prediction mode (DDIPM) represents a coding tool that derives intra prediction mode using previously decoded blocks/samples. In one example, the DDIPM could also be interpreted to a decoder-side intra mode derivation (DIMD) method or a template-based intra prediction mode (TIMD) method.

Fusion means using multiple predicted signals to get the final predicted signal for a video unit, in which each predicted signal is generated using one intra prediction mode.

The term 'block' may represent a coding block (CB), or a coding unit (CU), or a prediction block (PB), or a prediction unit (PU), or a transform block (TB), or a transform unit (TU), or a coding tree block (CTB), or a coding tree unit (CTU), or a rectangular region of samples/pixels.

In the following discussion, SatShift(x, n) is defined as $$\text{SatShift}(x, n) = \begin{cases} (x + \text{offsset}0) \gg n & \text{if } x \geq 0 \\ -((-x + \text{offset}1) \gg n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or((1<<(n−1)))−1.

Clip3(min, max, x) is defined as $$\text{Clip3 (Min, Max, } x) = \begin{cases} \text{Min} & \text{if } x < \text{Min} \\ \text{Max} & \text{if } x > \text{Max} \\ x & \text{Otherwise} \end{cases}$$

On Chroma DM mode and Chroma Intra Prediction Mode Candidate List

1. When the DDIPM is applied to luma and chroma DM mode is applied, the final chroma intra prediction mode is dependent on the derived IPM in the DDIPM for luma.
   a. In one example, the derived IPM for luma may be used as the final chroma intra prediction mode.
   b. In one example, when the derived IPM for luma is not the same angle range of as traditional IPMs for chroma (e.g., mode range of the derived IPM for luma is [0, 130], and mode range of the traditional IPMs for chroma is [0, 66]), the derived IPM for luma may be modified to the range same as the traditional IPMs for chroma.
      i. In one example, the modification may be defined as a mapping function, such as MAP131TO67(x)=(x<2?x:((x>>1)+1)), wherein x is in the range of [0, 130].
   c. In one example, when the DDIPM is applied to luma, one or more derived IPMs may be added to the chroma intra prediction mode candidate list as additional and/or replaced modes.
2. When DDIPM is applied to chroma, it is proposed that the derived intra prediction mode (IPM) at decoder for chroma components may be used to construct the chroma intra prediction mode candidate list.
   a. In one example, the derived IPM may be added in the chroma intra prediction mode candidate list as an additional mode.
      i. In one example, the derived IPM may be added at the first position or the last position of the candidate list.
      ii. In one example, the derived IPM may be added before or after an existing chroma mode.
         1) In one example, the existing chroma mode may refer to one of CCLM modes, or one of MMLM modes, or the chroma DM mode, or one of the pre-defined traditional intra prediction modes (e.g., Planar, DC, horizontal mode, vertical mode).

b. In one example, the derived IPM may be added in the chroma intra prediction mode candidate list as a replaced mode.
      i. In one example, the chroma DM mode is replaced by the derived IPM.
      ii. In one example, one of the pre-defined IPMs may be replaced by the derived IPM.
         1) For example, the Planar mode, or DC mode, or horizontal mode, or vertical mode, or diagonal mode, or vertical diagonal mode may be replaced by the derived IPM.
      iii. In one example, one of the CCLM or MMLM modes may be replaced by the derived IPM.
   c. In one example, when more than one IPMs are derived for chroma components, one or more of the derived IPMs may be added as additional/replaced modes in the chroma intra prediction mode candidate list.
   d. In one example, how to construct the chroma intra prediction mode candidate list may be different for the two chroma components.
   e. In one example, the order of modes excluding the derived IPM in the chroma IPM candidate list with the derived IPM and without the derived IPM may be different.
      i. Alternatively, the order of modes excluding the derived IPM in the chroma IPM candidate list with the derived IPM and without the derived IPM may be the same.

Indication of Intra Prediction Mode Derivation for Chroma Components

3. Indication of the DDIPM_CHROMA mode may be derived on-the-fly.
   a. In one example, if the current chroma block is not coded with the linear model mode (e.g., including CCLM, MMLM), the DDIPM_CHROMA mode may be inferred to be used.
4. Indication of the DDIPM_CHROMA mode may be conditionally signalled wherein the condition may include:
   a. whether DDIPM_CHROMA for luma is allowed
   b. block dimensions and/or block size
   c. block depth
   d. slice/picture type and/or partition tree type (single, or dual tree, or local dual tree)
   e. block location
   f. colour component
5. Whether current block is coded with DDIPM_CHROMA mode may be signalled using one or more syntax elements.
   a. In one example, the indication of DDIPM_CHROMA for two chroma components such as Cb and Cr may be signalled as one syntax element, or may be signalled as two syntax elements.
      i. In one example, whether to apply DDIPM_CHROMA on two chroma components such as Cb and Cr may be controlled together, or may be controlled in a separate way.
   b. In one example, the syntax element may be binarized with fixed length coding, or truncated unary coding, or unary coding, or EG coding, or coded a flag.
   c. In one example, the syntax element may be bypass coded or context coded.
      i. The context may depend on coded information, such as block dimensions, and/or block size, and/or slice/picture types, and/or the information of neighbouring blocks (adjacent or non-adjacent), and/or the information of other coding tools used for current block, and/or the information of temporal layer.

d. In one example, the syntax element may be signalled before or after the indication of colour space conversion, or indication of CCLM and/or MMLM, or indication of conventional intra prediction modes, or chroma DM mode.

e. In one example, one of current syntax element may be replaced to indicate whether DDIPM_CHROMA mode is used for the current block.

i. In one example, one of the syntax elements indicating conventional intra prediction modes may be replaced.

1) In one example, the syntax indicates Planar, or horizontal mode, or vertical mode, or DC mode, or chroma DM may be replaced.

2) In one example, the syntax indicates one of CCLM or MMLM modes may be replaced.

f. In one example, whether a block is allowed to be coded with DDIPM_CHROMA mode may depend on one or more syntax elements.

i. In one example, the one or more syntax elements may be signalled as general constraints information.

1) In one example, when a syntax element (e.g., gci_no_ddipm_chroma_constraint_flag) indicating general constraint on DDIPM_CHROMA is equal to X (e.g., X=0 or X=1), DDIPM_CHROMA shall be not allowed.

2) In one example, when either a syntax element (e.g., gci_no_ddipm_constraint_flag or gci_no_ddipm_constraint_flag) indicating general constraint on DDIPM for Luma is equal to X1 (e.g., X1=0 or X1=1).

ii. In one example, the one or more syntax elements may be signalled at sequence header/picture header/SPS/VPS/DPS/DCI/PPS/APS/slice header/tile group header.

Figure 24:
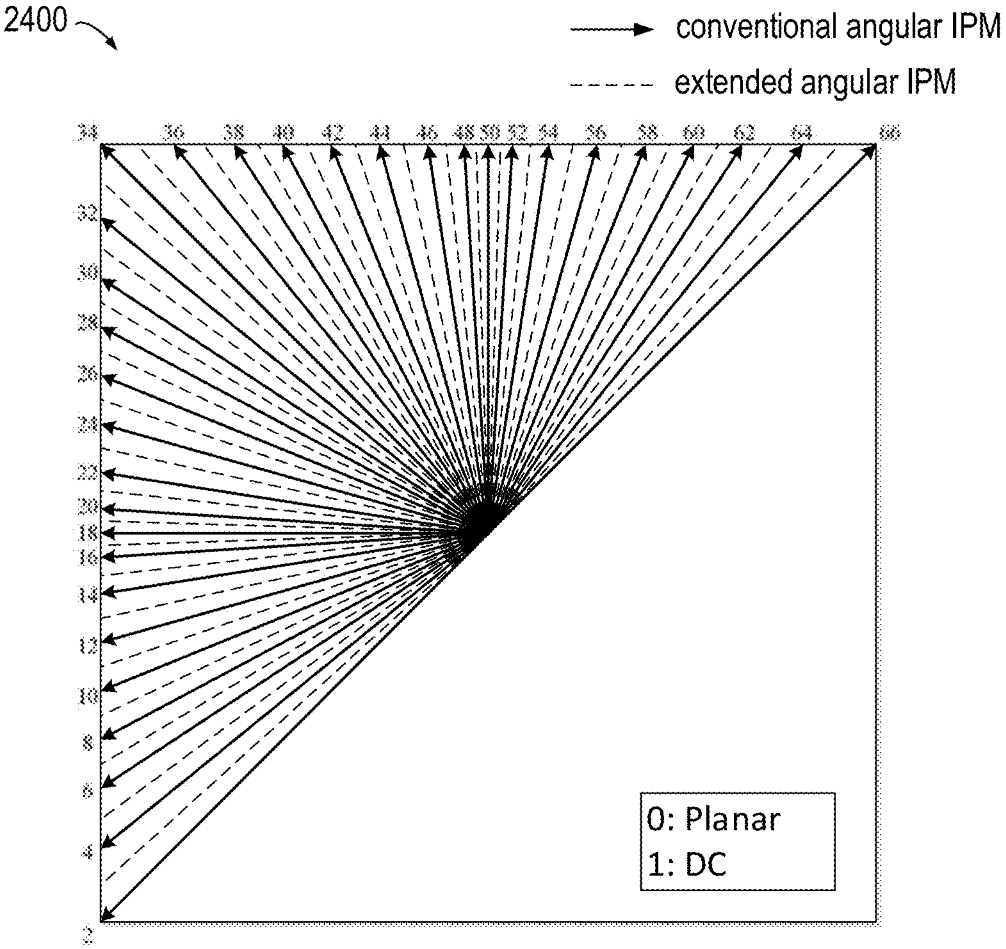
FIG. 24 is a schematic diagram illustrating conventional angular IPMs and extended angular IPMs.

Determination of Intra Prediction Mode for Chroma Components When its Collocated Luma Block is DDIPM 6. It is proposed that the IPM used in intra prediction for chroma components may depend on whether its collocated luma block is coded with DDIPM or not.

a. In one example, when the collocated luma block is coded with DDIPM and the IPM of luma is in the range of extended angular modes (e.g., mode index in [0, 130]), the IPM of luma may be mapped to conventional range of IPMs (e.g., mode index in [0, 66]) and used as the derived mode for chroma. FIG. 24 is a schematic diagram 2400 illustrating conventional angular IPMs and extended angular IPMs.

i. Alternatively, the IPM of luma is used as the derived mode without mapping to conventional range.

b. In one example, when the collocated luma block is coded with DDIPM, the chroma derived mode is always used in intra prediction for chroma.

i. In one example, the signalling of colour space conversion, and/or CCLM, and/or MMLM, and/or conventional IPMs is skipped.

ii. Alternatively, when the collocated luma block is coded with DDIPM, the intra prediction for chroma may use colour space conversion, or CCLM, or MMLM, or chroma DM.

1) In one example, in this case, the signalling of conventional IPMs is skipped.

Removal of Division and Floating Point Operation in Fusion Method of TIMD

7. Instead of using a constant cost factor (i.e., 2) in current design of TIMD with fusion, it is proposed to use an adaptive cost factor, wherein the cost factor may be dependent on the coding information.

a. In one example, the coding information may refer to quantization parameter, and/or slice type, and/or block size, etc.

8. In the fusion process of intra-prediction for luma or chorma, the final prediction may be derived as $P=W1\times P1+W2\times P2+\ldots+Wk\times Pk$ in the fusion process, wherein $W1+W2+\ldots+Wk=1$. P1, P2, . . . Pk represent the prediction value generated by k IPMs.

a. In an integer form, $P=\text{Shift}(W1\times P1+W2\times P2+\ldots+Wk\times Pk, s)$, wherein W1, W2, . . . , Wk are integers and $W1+W2+\ldots+Wk=1<<s$.

b. In one example, W1, W2, . . . , Wk may depend on sample positions.

c. In one example, W1, W2, . . . , Wk may depend on at least one of the k IPMs.

d. In one example, W1, W2, . . . , Wk may depend on at least one cost for the k IPMs.

9. In current design of TIMD with fusion, the weights for two IPMs are derived using division operation and floating point. Instead of this, it is proposed to derive the weights for the two IPMs using a look-up table or one or multiple equations.

a. In one example, the costs of the two IPMs may be modified before deriving the weights using the look-up table.

i. In one example, shift operation with/without an offset may be used in the modification.

b. Alternatively, the weights may be derived using the same way as derivation of linear parameters in CCLM and/or MMLM.

i. One example of deriving the weights is shown as Embodiment 1.

10. In above examples, the adaptive cost factor and/or how to remove the division operation may be applied to DDIPM (e.g., DIMD).

11. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

12. Whether to and/or how to apply the disclosed methods above may be signalled at PB/TB/CB/PU/TU/CU/VPDU/CTU/CTU row/slice/tile/sub-picture/other kinds of region contains more than one sample or pixel.

13. Whether to and/or how to apply the disclosed methods above may be dependent on coded information, such as block size, colour format, single/dual tree partitioning, colour component, slice/picture type.

14. The proposed methods disclosed in this document may be used to generate intra prediction in other coding tools which require an intra prediction signal (e.g., the CIIP mode).

5. OTHER EMBODIMENTS

Intra Prediction Mode Derivation for Chroma Components

1. Instead of signalling an intra prediction mode (IPM) of a block for at least one chroma component, it is proposed to derive the IPM at decoder, which is used to get the prediction/reconstruction of the block for at least one chroma component, wherein the coded mode of the block is denoted as DDIPM_CHROMA.

a. In one example, a template used to derive the IPM for chroma components may consist of the neighbouring adjacent and/or non-adjacent reconstructed samples/pixels.

i. FIGS. 25A-25J are schematic diagrams illustrating templates used in the derivation of IPM for chroma. In one example, as shown in FIGS. 25A-25J, "Template-LA" consists of the neighbouring left-above reconstructed samples, and "Template-L" consists of the neighbouring left reconstructed samples, and "Template-A" consists of the neighbouring above reconstructed samples, and "Template-LB" consists of the neighbouring left-below reconstructed samples, and "Template-RA" consists of the neighbouring right-above reconstructed samples.

ii. In one example, the template may consist of the (adjacent and/or non-adjacent) neighbouring left, and/or above, and/or left-above, and/or left-below, and/or right-above reconstructed samples.

1) In one example, the template may only consist of neighbouring left-above reconstructed samples, or left reconstructed samples, or above reconstructed samples, or left-below reconstructed samples, or right-above reconstructed samples. Such as, one of "Template-LA" (e.g., FIG. 25A), "Template-L" (e.g., FIG. 25D), "Template-A" (e.g., FIG. 25C), "Template-LB", and "Template-RA".

Figure 25A:
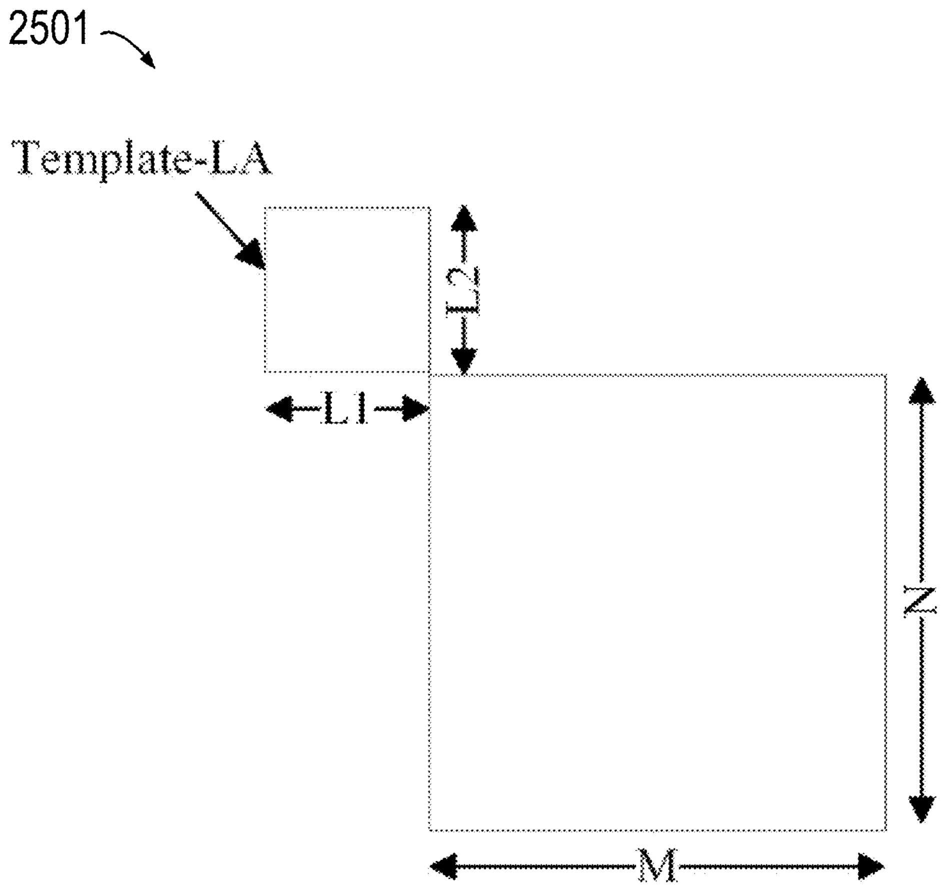
FIGS. 25A-25J are schematic diagrams illustrating templates used in the derivation of IPM for chroma.
Figure 25B:
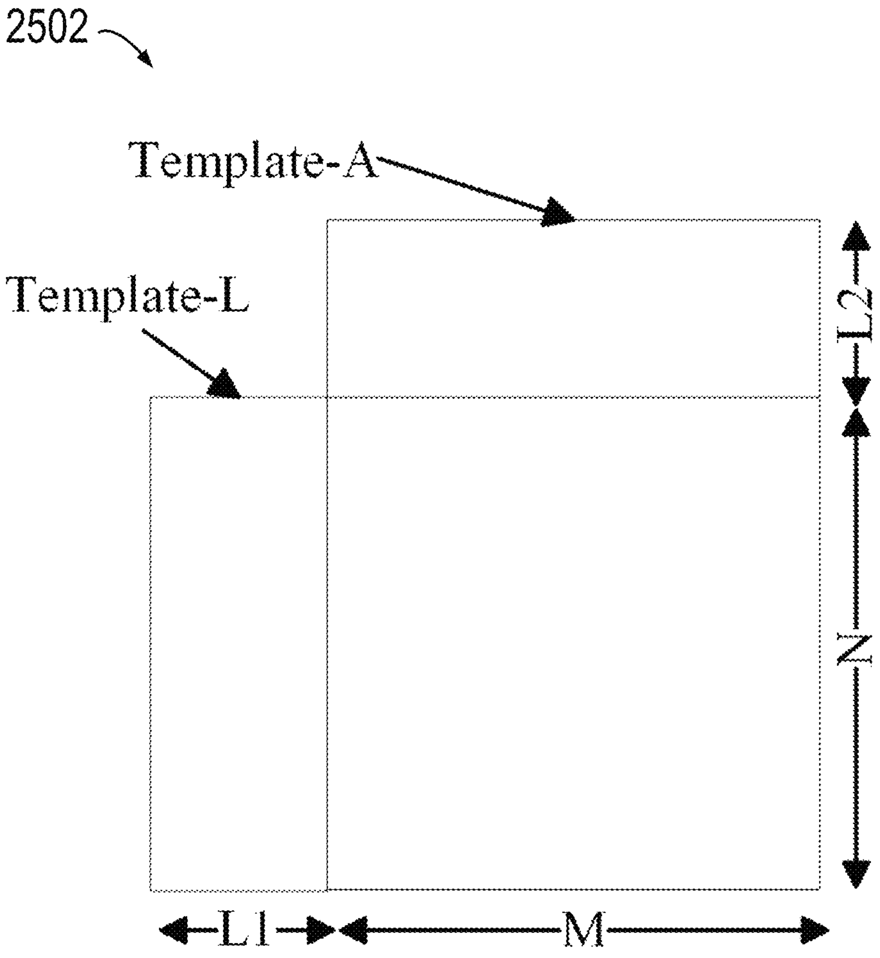
Figure 25C:
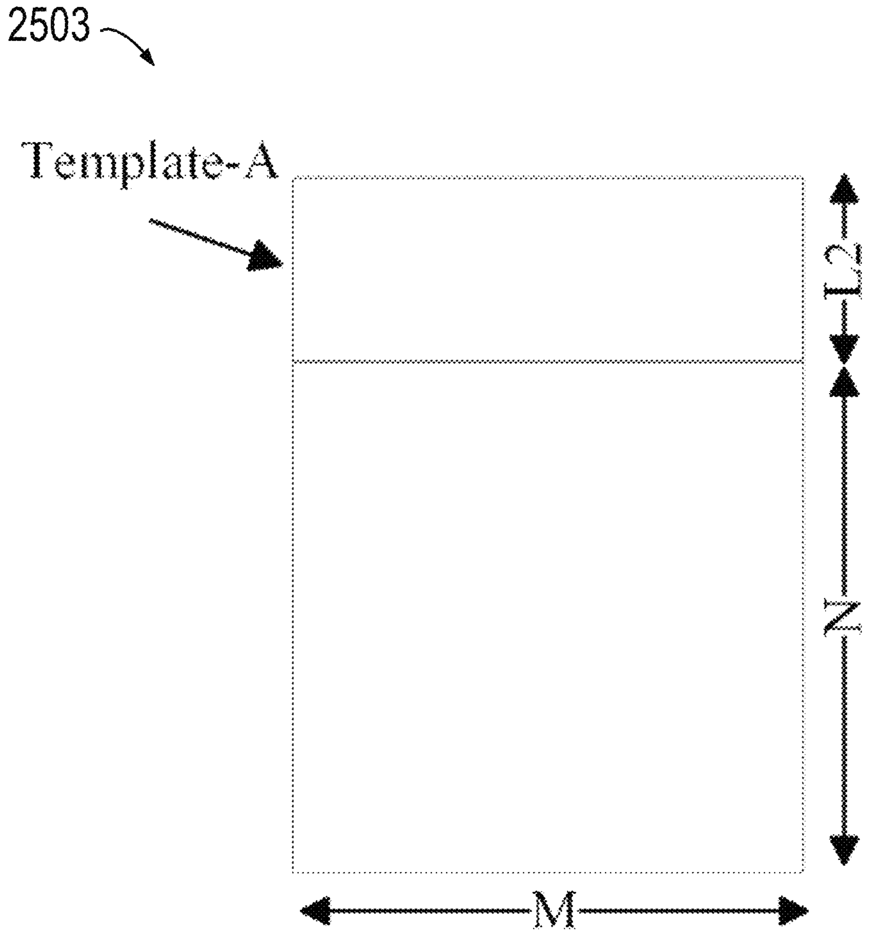
Figure 25D:
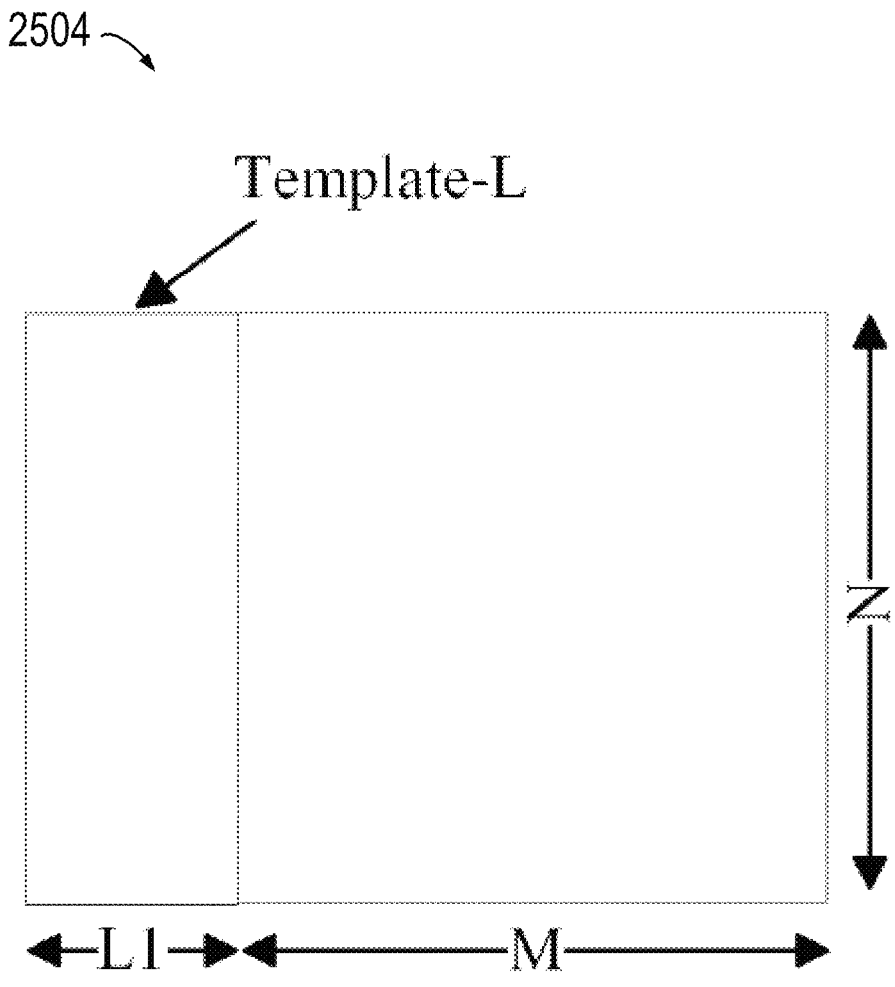
Figure 25E:
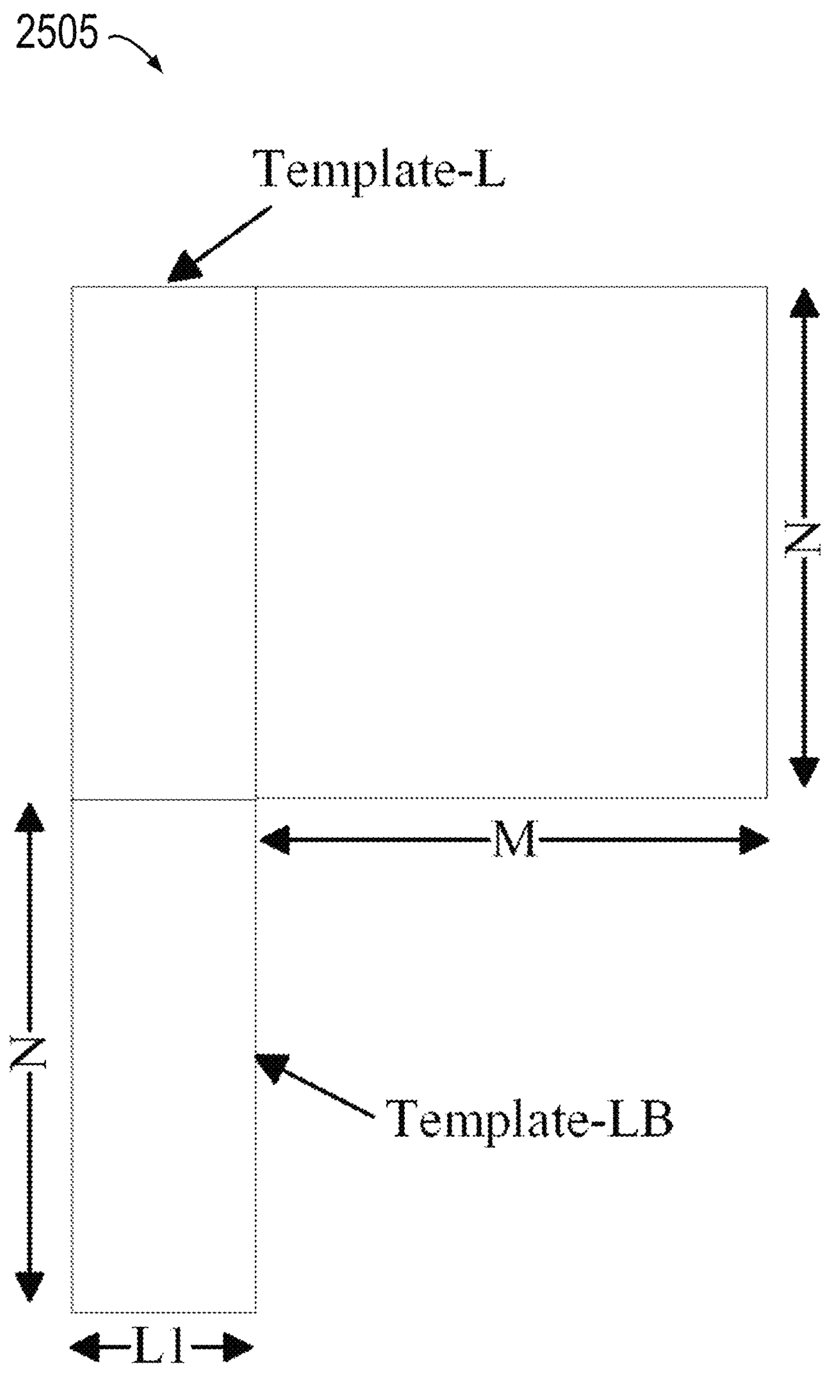
Figure 25F:
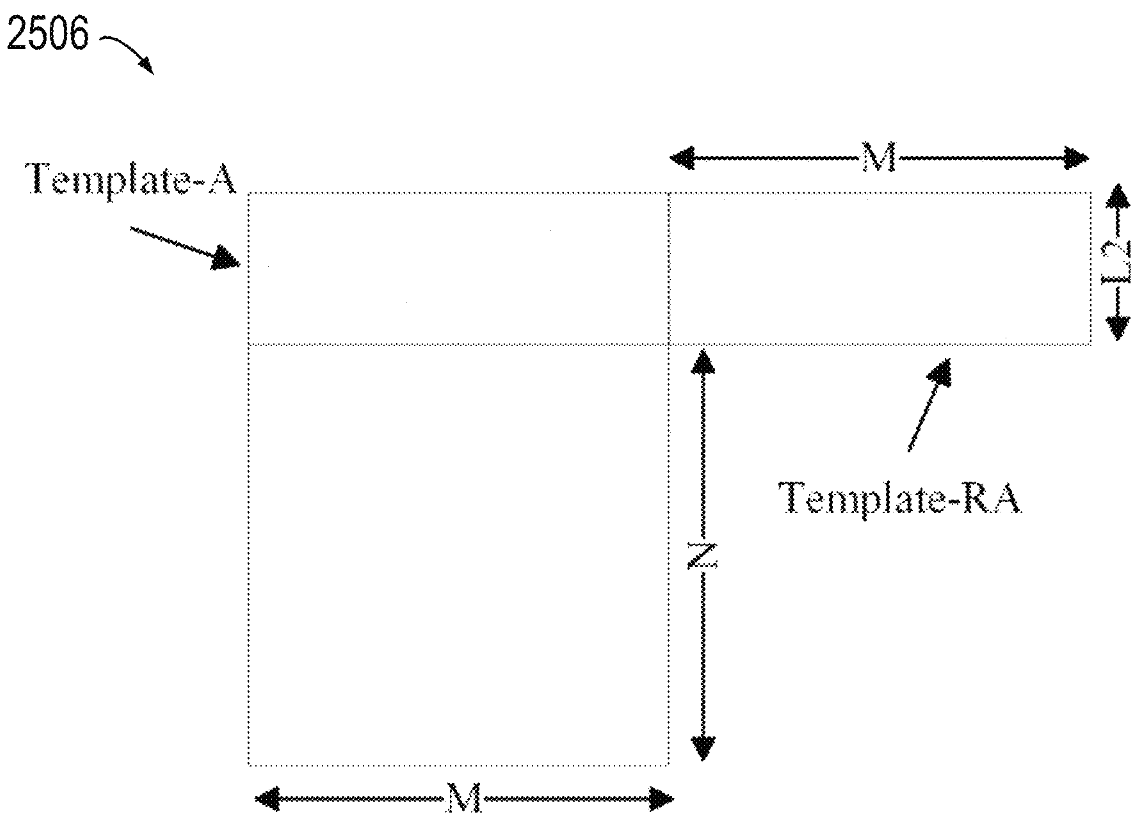
Figure 25G:
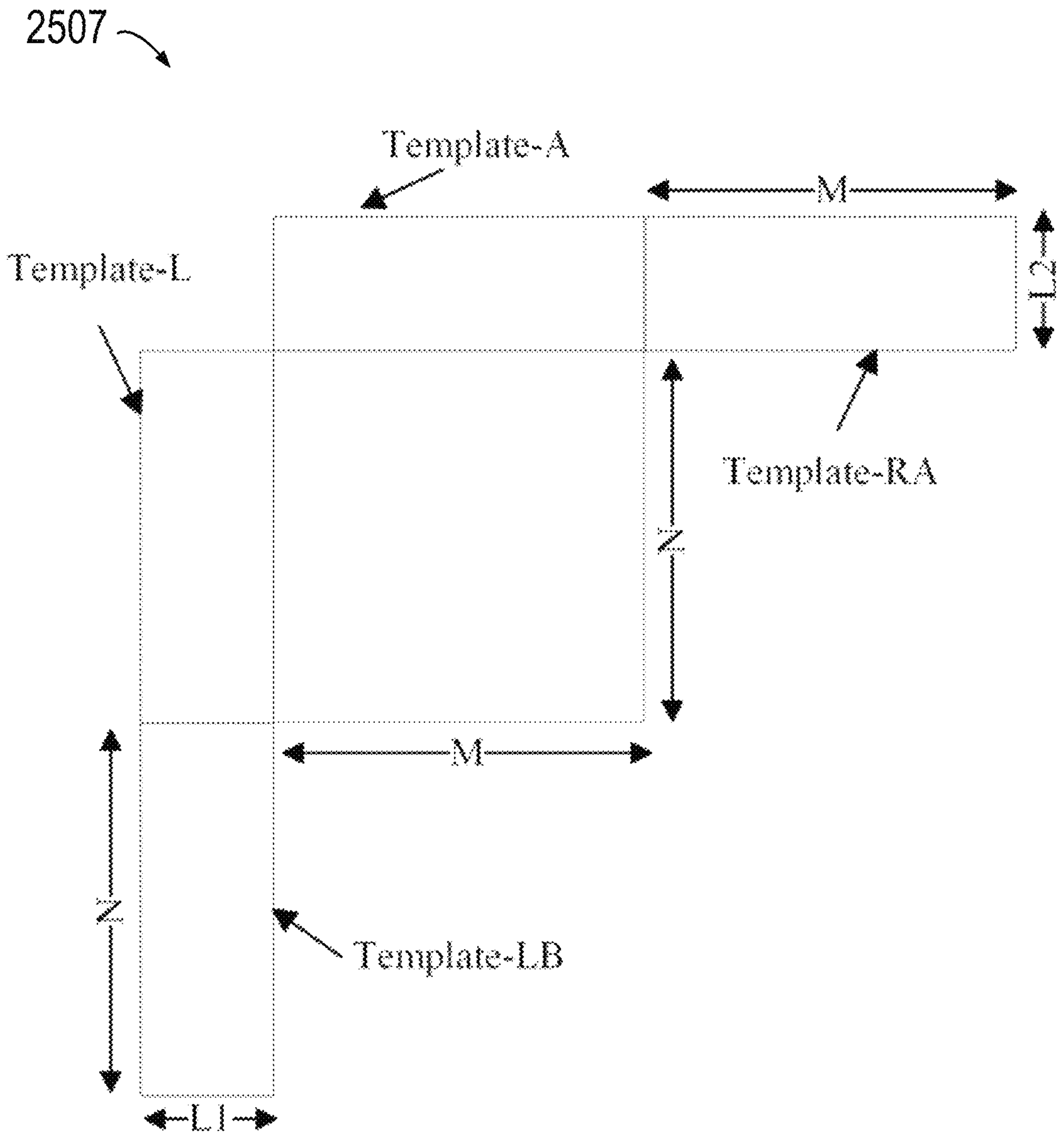
Figure 25H:
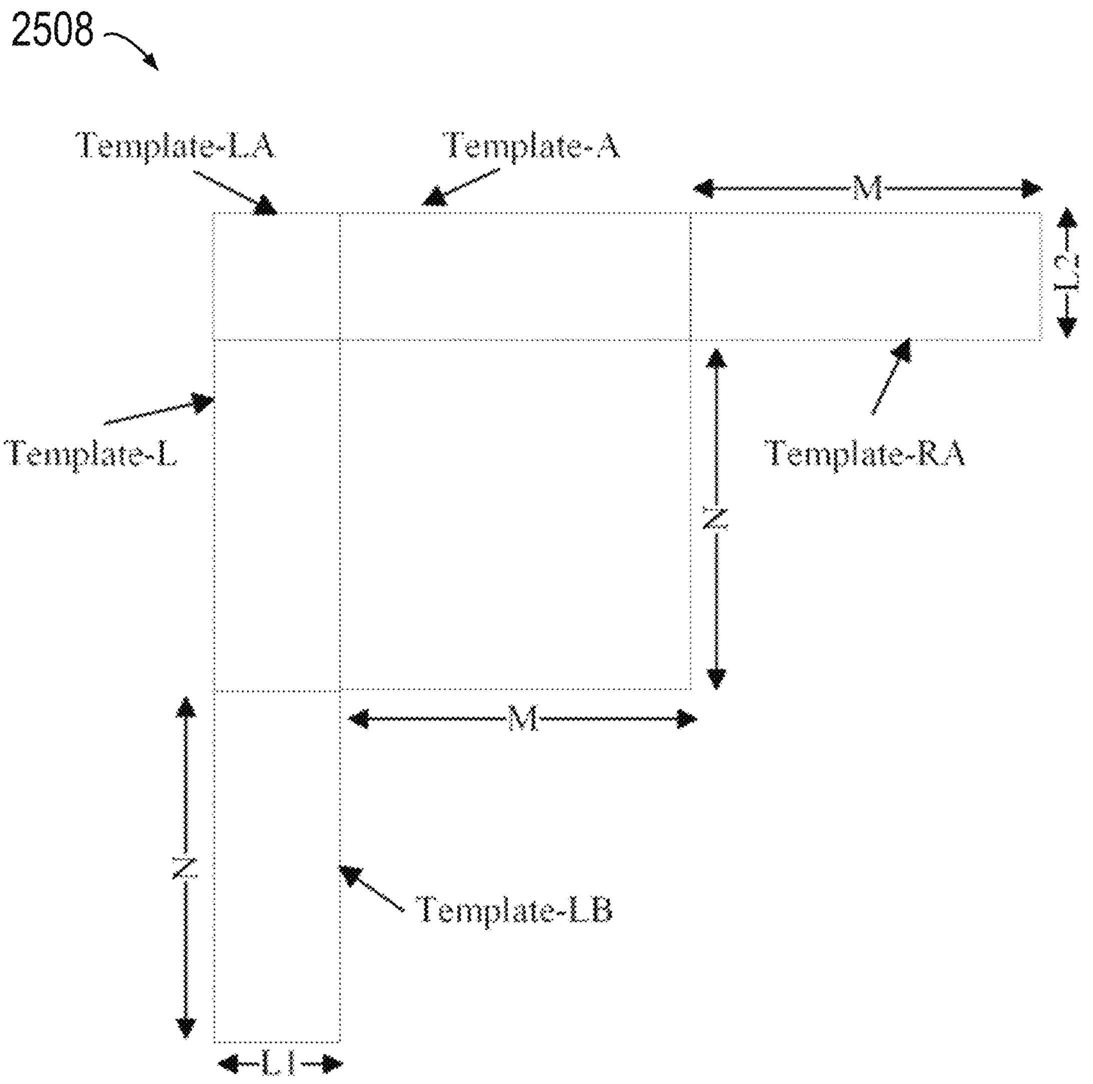

2) In one example, the template may consist of the combined neighbouring reconstructed samples from left-above, and/or left, and/or above, and/or left-below, and/or right-above reconstructed samples.

a) In one example, the template may consist of "Template-L" and "Template-A", such as example shown in FIG. 25B.

b) In one example, the template may consist of "Template-L" and "Template-LB", such as an example shown in FIG. 25E.

c) In one example, the template may consist of "Template-A" and "Template-RA", such as an example shown in FIG. 25F.

d) In one example, the template may consist of "Template-A", "Template-L", "Template-LB", and "Template-RA", such as an example shown in FIG. 25G.

e) In one example, the template may consist of "Template-LA", "Template-A", "Template-L", "Template-LB", and "Template-RA", such as an example shown in FIG. 25H.

Figure 25I:
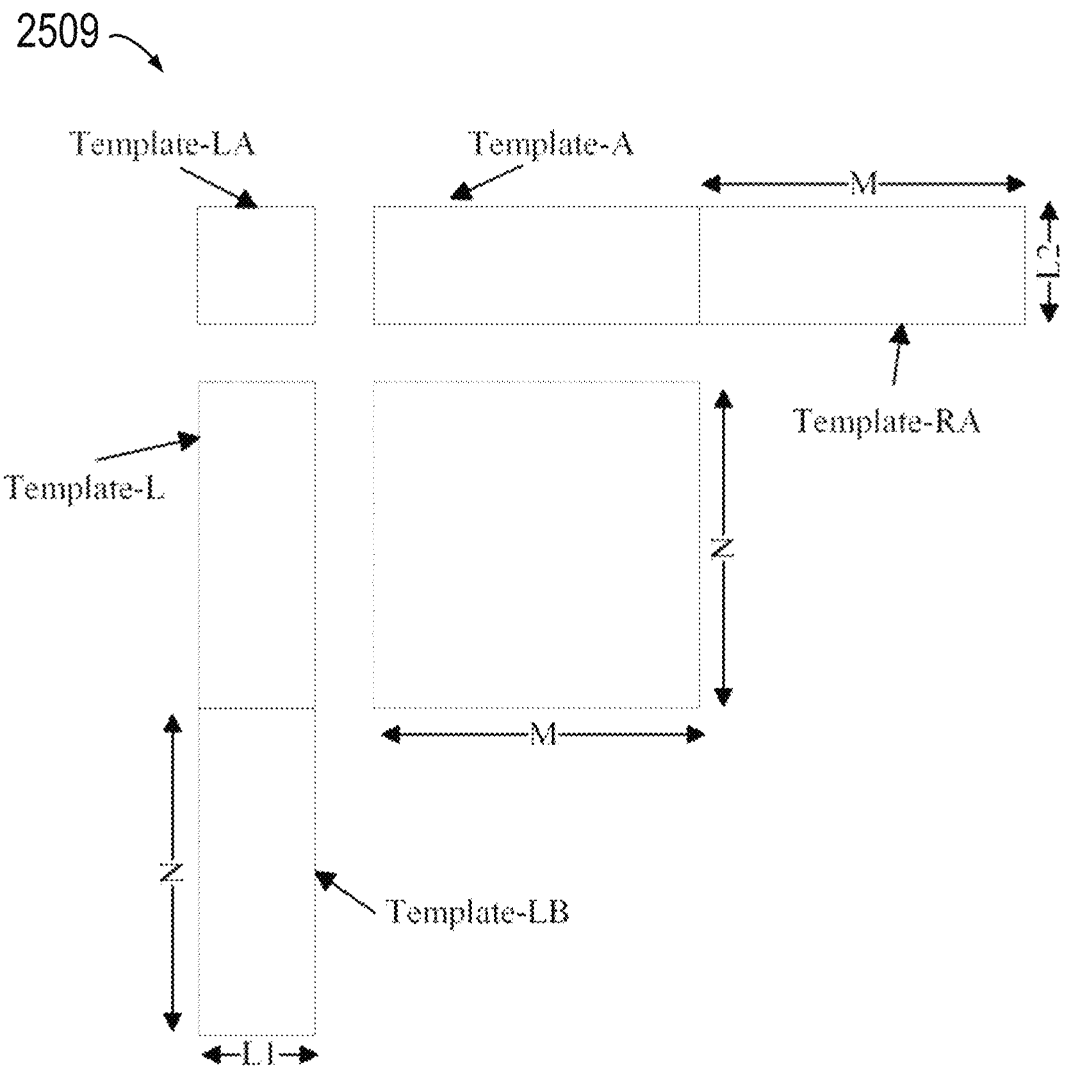
Figure 25J:
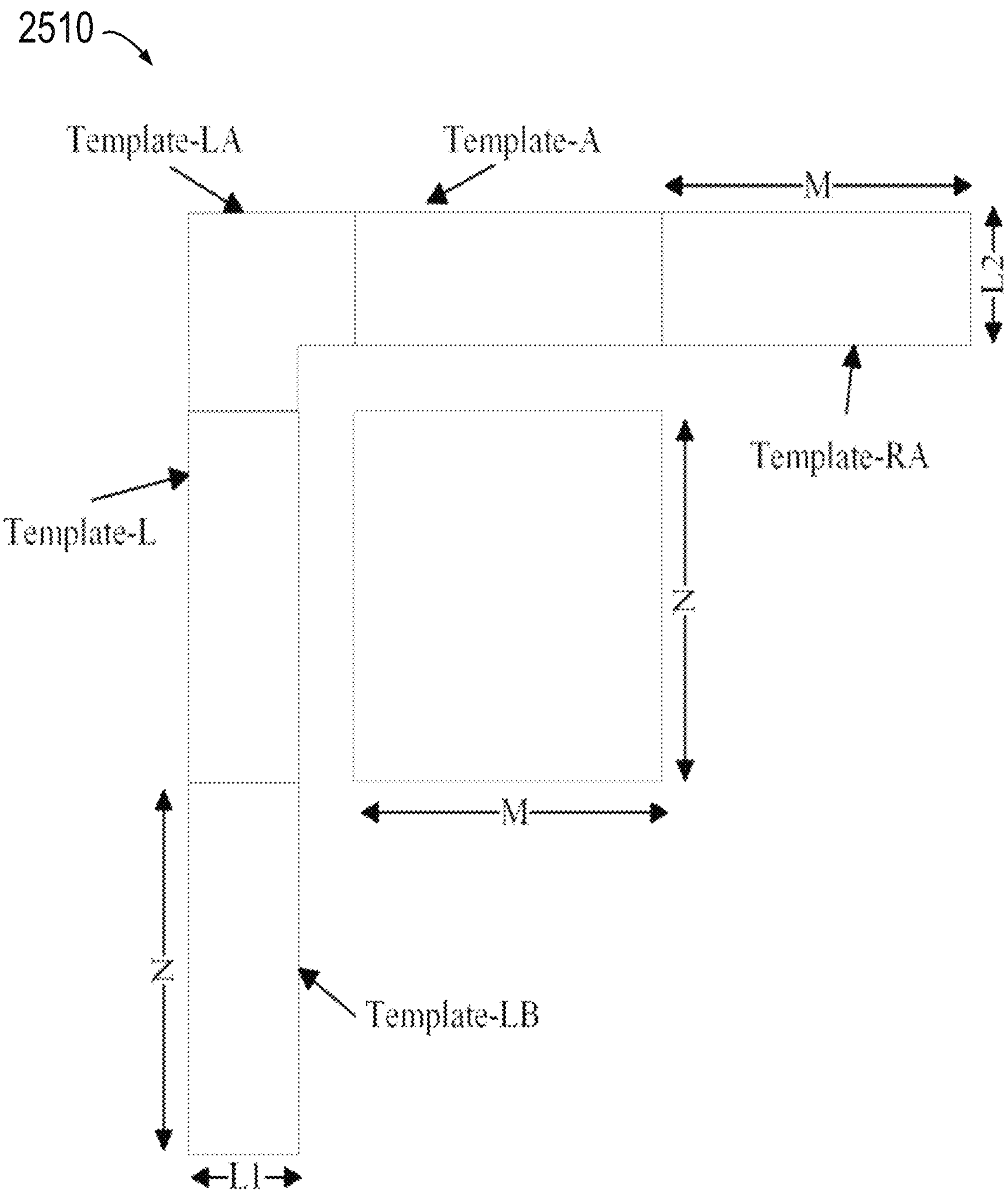

3) In one example, the template may be non-adjacent, such as an example shown in FIG. 25I and FIG. 25J.

iii. In one example, the template consists of samples of component A may be used to derive the IPM for component A. (e.g., A may be Cb or Cr).

iv. In one example, the template consists of samples of component A may be used to derive the IPM for component B. (e.g., A may be Cb, and B may be Cr. e.g., A may be Y, and B may be Cr).

1) In one example, A may consist of more than one components and B may consist of more than one components, such as A may be Cb and Cr, and B may be Cb and Cr.

b. In one example, during the derivation of the IPM for chroma components, intra prediction is processed on the template using one of IPMs from an IPM candidate list, and the IPM with the minimum cost is determined as the derived IPM.

i. In one example, the derivation of the IPM for chroma components may be same as the derivation of IPM for luma component.

1) In one example, the template (e.g., shape/size) used in the derivation of the IPM for chroma may be same as luma.

2) In one example, the IPM candidate list used to derive the IPM for chroma may be same as luma.

3) In one example, how to calculate the cost used to derive the IPM for chroma may be same as luma.

ii. In one example, the shape/size/dimensions of the template used to derive the IPM for chroma may be different from luma.

1) In one example, the template shape/size/width/height for chroma may depend on the template shape/size/width/height for luma. Denote the template size/width/height for chroma as S1/W1/H1, and the template size/width/height for luma as S2/W2/H2. SubWidthC and SubHeightC are defined in Table 2-1.

a) In one example, S1=S2/(SubWidth SubHeight).

b) In one example, W1=W2/SubWidth.

c) In one example, H1=H2/SubHeight.

iii. In one example, the IPM candidate list used to derive the IPM for chroma may be different from the IPM candidate list used to derive the IPM for luma.

Figure 26:
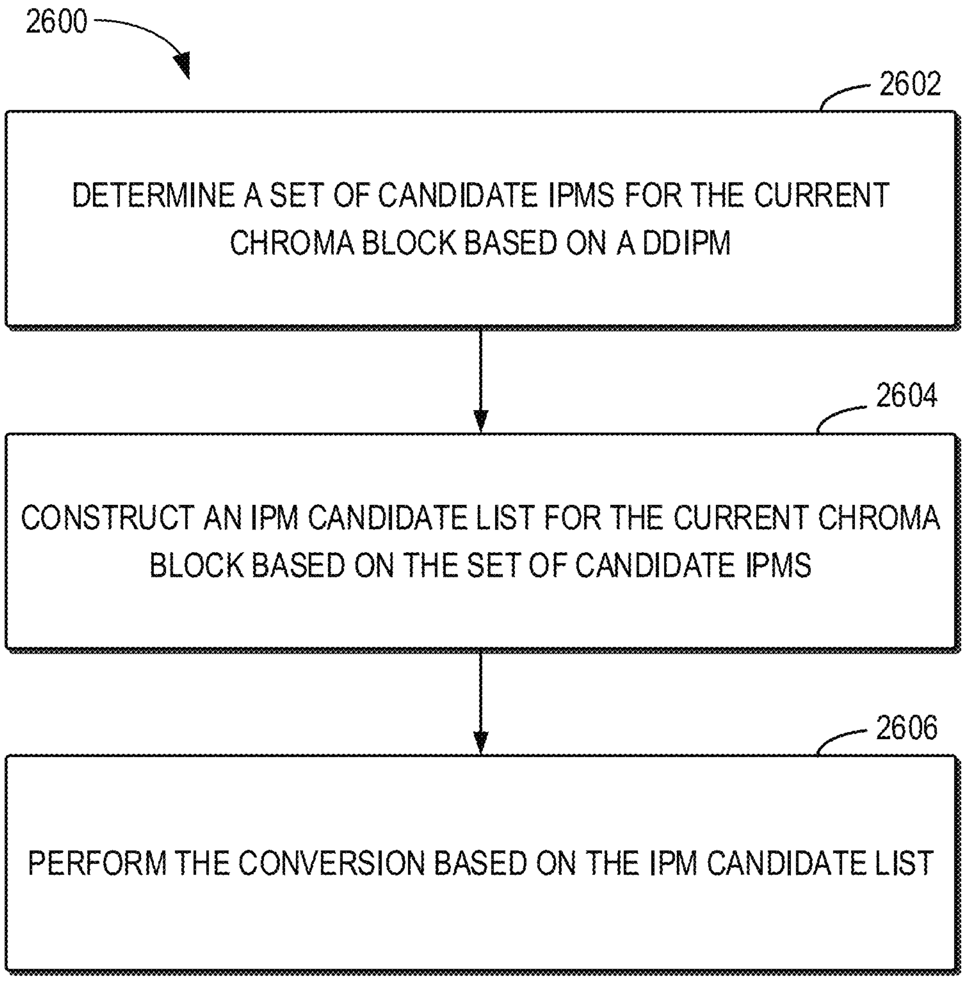
FIG. 26 illustrates a flowchart of a method for video processing in accordance with some embodiments of the present disclosure.

1) In one example, the IPM candidate list for chroma may consist of one or more IPMs that can be signalled explicitly in the conventional intra prediction modes (e.g., 35 IPMs in HEVC, or 67 IPMs in VVC), and/or one or more extended angular IPMs (e.g., shown in FIG. 26).

2) In one example, the number of IPMs in the IPM candidate list for chroma may be less than the number of IPMs in the IPM candidate list for luma.

3) In one example, the IPM candidate list for chroma may consist of cross-component prediction mode such as LM, and/or LM_T, and/or LM_L, and/or MMLM, and/or MMLM_T, and/or MMLM_L.

iv. In one example, how to derive the optimal IPM from the IPM candidate list for chroma may be different from luma.

1) In one example, partial or all IPMs may be used/checked in the intra prediction for the template during the derivation of the IPM for chroma.

2) In one example, early termination may be used during the derivation of the IPM for chroma.

a) In one example, when the cost of an IPM is less than T1, the IPM is determined as the derived IPM and all remaining unchecked IPMs in the IPM candidate list are skipped, wherein T1 is a threshold which may be pre-defined, or signalled in the bitstream, or dependent on the coding information.

i. In one example, T1 may depend on the number of IPMs that have been checked.

ii. In one example, T1 may depend on the costs of IPMs that have been checked.

3) In one example, the IPMs in the IPM candidate list may be reordered during the derivation of the IPM for chroma.

4) In one example, whether to and/or how to check the next one or more IPMs may depend on the costs of the IPMs that have been checked.

v. In one example, the sum of the absolute transformed difference (SATD) between the predicted samples and the reconstructed samples of the template may be calculated and used to derive the cost. (e.g., SATD may be used as the cost).

vi. Alternatively, the sum of the squared errors (SSE), or the sum of the absolute difference (SAD), or the mean removal sum of the absolute difference (MRSAD), or a subjective quality metric (e.g., the structural similarity index measure (SSIM)) may be calculated and used as the cost. (e.g., SSE or SAD or MRSAD or SSIM may be used as the cost).

1) Alternatively, the cost may be calculated in a form of D+lambda×R, wherein D is a metric of distortion such as SAD, SATD, SSE et. al, R represents the number of bits under consideration and lambda is a pre-defined factor or derived on-the-fly.

2) In one example, partial samples or all samples of the template may be used to calculate the cost.

3) In one example, both of the two Chroma components (e.g., Cb and Cr in YCbCr colour format, or B and R in RGB colour format) may be used to calculate the cost. Denote the cost of the first chroma component as C1, and the cost of the second chroma component as C2, and the total cost as C.

a) In one example, C=C1+C2.

b) In one example, C=w1□C1+w2□C2, wherein w1 and w2 are weighted factors.

i. In one example, w1=1−w2.

c) In one example, C=(w1 □C1+w2□C2+offset)>>shift, wherein w1, w2, offset, and shift are integers.

d) In above examples, w1, w2, offset, and shift may be signalled in the bitstream, or pre-defined, or derived on-the-fly, or dependent on coding information.

vii. In one example, the reference samples used in the intra prediction for the template during the derivation of the IPM for chroma may be unfiltered.

1) Alternatively, the reference samples used in the intra prediction for the template during the derivation of the IPM may be filtered using the same way as intra prediction for chroma, or intra prediction for luma, or the derivation of the IPM for luma.

viii. In one example, the filtering method used to refine the predicted signal of intra prediction for the block (e.g., PDPC or gradient PDPC) may be used during the derivation of the IPM for chroma.

1) Alternatively, whether to or how to apply the filtering method used to refine the predicted signal of intra prediction for the template during the derivation of the IPM may be the same way as intra prediction for chroma, or intra prediction for luma, or the derivation of the IPM for luma.

ix. In one example, the interpolation filter used in the intra prediction for the template during the derivation of the IPM for chroma may be same as the interpolation filter used in intra prediction for chroma, or the interpolation filter used in intra prediction for luma, or the interpolation filter used in the intra prediction during the derivation of the IPM for luma.

1) Alternatively, the interpolation filter used in the intra prediction for the template during the derivation of the IPM for chroma may be different from the interpolation filter used in intra prediction for chroma, and/or the interpolation filter used in intra prediction for luma, and/or the interpolation filter used in the intra prediction for the template during the derivation of the IPM for luma.

x. In one example, the mode conversion process for extended IPMs in the derivation of the IPM for chroma or luma may be same as or different from the mode conversion process for extended IPMs used in intra prediction for chroma or luma.

c. In one example, a histogram of gradients (HoG) is built using the samples/pixels in the template, in which each bin is mapped to an IPM, and the IPM with the highest amplitude may be used as the derived IPM.

i. In one example, the derivation of the IPM for chroma (e.g., how to build the HoG, or the number of bins in the HoG, or how to map the bins to IPMs) may be same as luma.

ii. In one example, the shape/size/dimensions of the template for chroma components may be different from that used in the calculation of gradients for luma component.

1) Alternatively, the ratio of template size for chroma compared to luma may follow the ratio due to colour formats.

iii. In one example, the calculation of gradients for chroma may be different from the calculation of gradients for luma.

1) In one example, the Sobel operator, or Isotropic Sobel operator, or Roberts operator, or Prewitt operator, Laplacian operator, or Canny operator may be used to calculate the gradients.

iv. In one example, the number of bins in the HoG may be equal to or less than the number of conventional IPMs that can be signalled explicitly.

v. In one example, both of the chroma components may be used to calculate the gradients.

d. In above examples, only one of the chroma components (e.g., Cb or Cr in YCbCr colour format, or B or R in RGB colour format) may be used to derive the IPM (e.g., calculate the cost or calculate the gradients).

i. In one example, which chroma component is used may be signalled in the bitstream, or per-defined, or determined on-the-fly, or dependent on coding information.

ii. In one example, the derived IPM may be used in the intra prediction of the block for the two chroma components.

2. In one example, an IPM is derived using above methods for each chroma component individually.
   a. In one example, the derivation of the IPM may be different for different chroma components.
   b. In one example, the derived IPMs for the chroma components may be different.
   c. In one example, the derived IPMs for the chroma components may be the same.
3. In above examples, more than one IPMs may be derived and use which IPM in the intra prediction for chroma components may be signalled in the bitstream, and/or determined on-the-fly, and/or dependent on coding information.
4. In one example, fusion of the predicted signals generated by more than one IPMs may be used as the final prediction of the block for chroma components.
   a. In one example, the IPMs used in fusion may consist of one or more derived IPMs, and/or one or more pre-defined or signalled modes.
      i. In one example, the pre-defined modes or signalled modes may be cross-component prediction mode such as LM, and/or LM_T, and/or LM_L, and/or MMLM, and/or MMLM_T, and/or MMLM_L.
      ii. In one example, the pre-defined modes or signalled modes may be Planar, and/or DC, and/or horizontal mode, and/or vertical mode, and/or diagonal mode, and/or vertical diagonal mode.
   b. In one example, different fusion methods may be applied, in which different fusion methods may refer to use different IPMs and/or different weighted factors in the fusion.
      i. In one example, the weighted factors may be dependent on the cost or the amplitude during the derivation of the IPMs.
   c. In above examples, whether to and/or how to fuse the predicted signals, and/or the number of the IPMs used in fusion, and/or the indication of the fusion method may be signalled in the bitstream, and/or determined on-the-fly, and/or dependent on coding information.
      i. In one example, whether to and/or how to apply the fusion method may be dependent on the costs or the amplitudes of the derived IPMs.
         1) In one example, denote the cost of the best derived IPM as Cost1, and the cost the second best derived IPM as Cost2, when Cost2 is less than T□Cost1, the fusion method may be applied, wherein T is a cost factor.
5. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.
6. Whether to and/or how to apply the disclosed methods above may be signalled at PB/TB/CB/PU/TU/CU/VPDU/CTU/CTU row/slice/tile/sub-picture/other kinds of region contains more than one sample or pixel.
7. Whether to and/or how to apply the disclosed methods above may be dependent on coded information, such as block size, colour format, single/dual tree partitioning, colour component, slice/picture type.
8. The proposed methods disclosed in this document may be used to generate intra prediction in other coding tools which require an intra prediction signal (e.g., the CIIP mode).

6. EMBODIMENT

6.1. Embodiment 1

An example of deriving weights in TIMD with fusion.

$$x=\text{Floor}(\text{Log }2(\text{costMode1}+\text{costMode2}))$$

$$\text{normDiff}=(((\text{costMode1}+\text{costMode2})<<4)>>x)\&t$$

$$x+=(\text{normDiff}\ !=0)?1:0$$

$$y=\text{Abs}(\text{costMode2})>0?\text{Floor}(\text{Log }2(\text{Abs}(\text{costMode2})))+1:0$$

$$\text{weight1}=(\text{costMode2}*(\text{divSigTable}[\text{normDiff}]|8)+2^{y-1})>>y$$

$$k=((3+x-y)<1)?1:3+x-y$$

$$\text{weight1}=((3+x-y)<1)?\text{Sign}(\text{weight1})*t:\text{weight1}$$

where divSigTable[ ] is specified as follows:

$$\text{divSigTable}[\ ]=\{d0,d1,d2,d3,d4,d5,d6,d7,d8,d9,d10,d11,d12,d13,d14,d15\}$$

In one exmaple, t=15, divSigTable[ ]={0, 7, 6, 5, 5, 4, 4, 3, 3, 2, 2, 1, 1, 1, 1, 0 }

6.2. Embodiment 2

The cost factor used to determine whether to use the fusion method in intra prediciton of current block may be dependent on block size and/or block dimensions. When costMode2<s□costMode1, the fusion method is used; otherwise, the first derived IPM is used. Denote the block width and block height as W and H.

In one example, when WOH is larger than T1, s is equal to S1; Otherwise, s is equal to S2, wherein S1 and S2 are not the same, such as S1=3 and S2=2, or S1=2 and S2=3, or S1=1.8 and S2=2, or S1=2.2 and S2=1.8.

In one example, when W is larger than T1, s is equal to S1; Otherwise, s is equal to S2, wherein S1 and S2 are not the same, such as S1=3 and S2=2, or S1=2 and S2=3, or S1=1.8 and S2=2, or S1=2.2 and S2=1.8.

In one example, when H is larger than T1, s is equal to S1; Otherwise, s is equal to S2, wherein S1 and S2 are not the same, such as S1=3 and S2=2, or S1=2 and S2=3, or S1=1.8 and S2=2, or S1=2.2 and S2=1.8.

In one example, when W/H (or H/W) is larger than T1, s is equal to S1; Otherwise, s is equal to S2, wherein S1 and S2 are not the same, such as S1=3 and S2=2, or S1=2 and S2=3, or S1=1.8 and S2=2, or S1=2.2 and S2=1.8.

In one example, when Min(W, H) or Max(W, H) is larger than T1, s is equal to S1; Otherwise, s is equal to S2, wherein S1 and S2 are not the same, such as S1=3 and S2=2, or S1=2 and S2=3, or S1=1.8 and S2=2, or $1=2.2 and S2=1.8.

6.3. Embodiment 3

The cost factor used to determine whether to use the fusion method in intra prediciton of current block may be dependent on quantizaiton parameters (QP). When costMode2<s□costMode1, the fusion method is used; otherwise, the first derived IPM is used.

In one example, when QP is larger than T1, s is equal to S1; Otherwise, s is equal to S2, wherein S1 and S2 are not the same, such as T1=30, S1=3 and S2=2, or S1=2 and S2=3, or S1=1.8 and S2=2, or S1=2.2 and S2=1.8.

6.4. Embodiment 4

The cost factor used to determine whether to use the fusion method in intra prediciton of current block may be dependent on slice type. When costMode2<s□costMode1, the fusion method is used; otherwise, the first derived IPM is used.

In one example, when the current slice is I-slice, s is equal to S1; When current slice is P/B slice, s is equal to S2, wherein S1 and S2 are not the same, such as S1=3 and S2=2, or S1=2 and S2=3, or S1=1.8 and S2=2, or S1=2.2 and S2=1.8.

The embodiments of the present disclosure are related to intra prediction mode derivation for chroma. As used herein, the term "decoder-side derivation of intra prediction mode (DDIPM)" represents a coding tool that derives intra prediction mode using previously decoded blocks or samples. In one example, the DDIPM may be a decoder-side intra mode derivation (DIMD) method. Alternatively, the DDIPM may be a template-based intra prediction mode (TIMD) method. The term "fusion" refers to using multiple predicted signals to get a final predicted signal for a video block, in which each predicted signal is generated by using one intra prediction mode. The term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular.

FIG. 26 illustrates a flowchart of a method 2600 for video processing in accordance with some embodiments of the present disclosure. The method 2600 may be implemented during a conversion between a current chroma block of a video and a bitstream of the video. As shown in FIG. 26, the method 2600 starts at 2602 where a set of candidate intra prediction modes (IPMs) for the current chroma block are determined based on a DDIPM. In some embodiments, in the DDIPM, an intra prediction mode is derived for a block of the video based on coded samples of the video and a syntax element indicating an index of the intra prediction mode in the IPM candidate list is omitted from the bitstream. Examples of DDIPM include, but are not limited to, DIMD or TIMD. By way of example, the DDIPM is DIMD. With reference to FIG. 20, a set of candidate IPMs may be determined for the current chroma block 2010 based on two adjacent templates 2020 and 2022 by using the DIMD.

At 2604, an IPM candidate list for the current chroma block is constructed based on the set of candidate IPMs. In one example, the set of candidate IPMs for current chroma block 2010 may be added into an IPM candidate list for the current chroma block 2010 so as to update the IPM candidate list. It should be understood that the above illustrations and/or examples are described merely for purpose of description. The scope of the present disclosure is not limited in this respect.

At 2606, the conversion is performed based on the IPM candidate list. In some embodiments, the conversion may include encoding the current chroma block into the bitstream. Alternatively or additionally, the conversion may include decoding the current chroma block from the bitstream.

According to the method 2600, an IPM candidate list for a chroma block is determined based on DDIPM which derives IPM by using previously decoded blocks or samples. Thereby, the proposed method can advantageously improve coding efficiency and reduce the coding bits while maintaining the coding quality.

In some embodiments, at 2604, the IPM candidate list may be updated by adding a first candidate IPM of the set of candidate IPMs into the IPM candidate list, so as to construct the IPM candidate list. In one example, the first candidate IPM may be added at the first position of the IPM candidate list. Alternatively, the first candidate IPM may be added at the last position of the IPM candidate list. In another example, the first candidate IPM may be added before a target IPM in the IPM candidate list. Alternatively, the first candidate IPM may be added after a target IPM in the IPM candidate list. By way of example, the target IPM may be one of a cross-component linear model (CCLM) mode, a multi-model linear model (MMLM) mode, a chroma derived mode (DM), or a pre-defined IPM. For example, the pre-defined IPM may be a planar mode. Alternatively, the predefined IPM may be a DC mode. It should be understood that the above illustrations and/or examples are described merely for purpose of description. The scope of the present disclosure is not limited in this respect.

In some embodiments, the IPM candidate list may be updated by replacing a target IPM in the IPM candidate list with a first candidate IPM of the set of candidate IPMs so as to construct the IPM candidate list. In one example, the target IPM may be a chroma DM. Alternatively, the target IPM may be one of pre-defined IPMs. For example, the pre-defined IPMs may comprise a planar mode, a DC mode, a horizontal mode, a vertical mode, a diagonal mode, a vertical diagonal mode, and/or the like. In another example, the target IPM may be one of a cross-component linear model (CCLM) mode, or a multi-model linear model (MMLM) mode.

In some embodiments, the set of candidate IPMs may comprise a plurality of candidate IPMs. In one example, one or more of the candidate IPMs may be added into the IPM candidate list.

In some embodiments, IPM candidate lists may be constructed in different manners for chroma components of the current chroma block. By way of example, for a first chroma component (e.g., Cb), the candidate IPMs may be added in to the IPM candidate list, so as to update the IPM candidate list, while for a second chroma component (e.g., Cr), existing IPMs in the IPM candidate list may be replaced with the candidate IPMs so as to update the IPM candidate list. It should be understood that the above illustrations and/or examples are described merely for purpose of description. The scope of the present disclosure is not limited in this respect.

In some embodiments, a position of an IPM in the updated IPM candidate list may be different from a position of the IPM in the IPM candidate list. For example, the IPMs in the IPM candidate list may be reordered. Alternatively, positions of all of IPMs excluding the set of candidate IPMs in the updated IPM candidate list may be the same as positions of the IPMs in the IPM candidate list.

In some embodiments, whether a target chroma block of the video is coded with the DDIPM may be determined on-the-fly. In one example, the target chroma block may be determined to be coded with the DDIPM, if the target chroma block is not coded with a linear model mode. Thereby, it is possible to reduce the number of bits for coding the current chroma block and thus reduce the bit rate of the bitstream.

In some embodiments, whether a target chroma block of the video is coded with the DDIPM may be determined based on: whether DDIPM is allowed for a collocated luma block of the target chroma block, block dimensions, a block size, a block depth, a slice type, a picture type, a partition tree type, a block location, a color component, and/or the like. It should be understood that the above illustrations and/or examples are described merely for purpose of description. The scope of the present disclosure is not limited in this respect.

In some embodiments, a first set of syntax elements may be indicated in the bitstream. The first set of syntax elements indicate whether a target chroma block of the video is coded with the DDIPM.

In some embodiments, whether chroma components of the target chroma block are coded with the DDIPM may be indicated in the bitstream by one syntax element of the first set of syntax elements. Alternatively, whether the chroma components of the target chroma block are coded with the DDIPM may be indicated in the bitstream by a plurality of syntax elements of the first set of syntax elements. In one example, whether the chroma components are coded with the DDIPM may be dependent on the one syntax element. Alternatively, whether the chroma components are coded with the DDIPM may be dependent on the plurality of syntax elements respectively.

In some embodiments, the first set of syntax elements may be coded as a flag. Alternatively, the first set of syntax elements may be binarized with fixed length coding. In another embodiment, the first set of syntax elements may be binarized with truncated unary coding. In a further embodiment, the first set of syntax elements may be binarized with unary coding. In yet another embodiment, the first set of syntax elements may be binarized with exponential Golomb (EG) coding.

In some embodiments, the first set of syntax elements may be bypass coded. Alternatively, the first set of syntax elements may be context coded. In one example, a context for context coding of the first set of syntax elements may be dependent on coded information of the video. By way of example, the coded information may comprise block dimensions, a block size, a slice type, a picture type, information of neighboring blocks of the target chroma block, information of other coding tools used for the target chroma block, information of temporal layer, and/or the like. It should be understood that the above illustrations and/or examples are described merely for purpose of description. The scope of the present disclosure is not limited in this respect.

In some embodiments, the first set of syntax elements may be indicated in the bitstream before an indication of color space conversion. Alternatively, the first set of syntax elements may be indicated in the bitstream after an indication of color space conversion. In another example, the first set of syntax elements may be indicated in the bitstream before an indication of CCLM. Alternatively, the first set of syntax elements may be indicated in the bitstream after an indication of CCLM. In another example, the first set of syntax elements may be indicated in the bitstream before an indication of MMLM. Alternatively, the first set of syntax elements may be indicated in the bitstream after an indication of MMLM. In another example, the first set of syntax elements may be indicated in the bitstream before an indication of a planar mode. Alternatively, the first set of syntax elements may be indicated in the bitstream after an indication of a planar mode. In another example, the first set of syntax elements may be indicated in the bitstream before an indication of a DC mode. Alternatively, the first set of syntax elements may be indicated in the bitstream after an indication of a DC mode. In another example, the first set of syntax elements may be indicated in the bitstream before an indication of a horizontal mode. Alternatively, the first set of syntax elements may be indicated in the bitstream after an indication of a horizontal mode. In another example, the first set of syntax elements may be indicated in the bitstream before an indication of a vertical mode. Alternatively, the first set of syntax elements may be indicated in the bitstream after an indication of a vertical mode. In another example, the first set of syntax elements may be indicated in the bitstream before an indication of a vertical diagonal mode. Alternatively, the first set of syntax elements may be indicated in the bitstream after an indication of a vertical diagonal mode. In another example, the first set of syntax elements may be indicated in the bitstream before an indication of chroma DM. Alternatively, the first set of syntax elements may be indicated in the bitstream after an indication of chroma DM.

In some embodiments, a target syntax element of current syntax elements for the current chroma block may be replaced with the first set of syntax elements. In one example, the target syntax element may indicate an IPM. For example, the target syntax element may indicate a planar mode, a horizontal mode, a vertical mode, a DC mode, a vertical diagonal mode, a chroma DM, or the like. In another example, the target syntax element may indicate a CCLM mode or a MMLM mode. It should be understood that the above illustrations and/or examples are described merely for purpose of description. The scope of the present disclosure is not limited in this respect.

In some embodiments, whether the target chroma block is allowed to be coded with the DDIPM may be dependent on a second set of syntax elements. By way of example, the second set of syntax elements may be indicated in the bitstream as general constraints information. In one example, the target chroma block may be not allowed to be coded with the DDIPM, if a syntax element of the second set of syntax elements indicates general constrain on DDIPM for chroma is equal to a predetermined value. For example, if a syntax element gci_no_ddipm_chroma_constraint_flag indicates general constrain on DDIPM for chroma is equal to 1, the target chroma block may be not allowed to be coded with the DDIPM. In another example, the target chroma block may be not allowed to be coded with the DDIPM, if a syntax element of the second set of syntax elements indicates general constrain on DDIPM for luma is equal to a predetermined value. For example, if a syntax element gci_no_ddipm_constraint_flag indicates general constrain on DDIPM for chroma is equal to 1, the target chroma block may be not allowed to be coded with the DDIPM. It should be understood that the above illustrations and/or examples are described merely for purpose of description. The scope of the present disclosure is not limited in this respect.

In some embodiments, the second set of syntax elements may be included in a sequence header. Alternatively, the second set of syntax elements may be included in a picture header. In another embodiment, the second set of syntax elements may be included in a sequence parameter set (SPS). Alternatively, the second set of syntax elements may be included in a video parameter set (VPS). In yet another embodiment, the second set of syntax elements may be included in a dependency parameter set (DPS). Alternatively, the second set of syntax elements may be included in a decoding capability information (DCI). In a further embodiment, the second set of syntax elements may be included in a picture parameter set (PPS) or an adaptation parameter sets (APS). Alternatively, the second set of syntax elements may be included in a slice header or a tile group header.

In some embodiments, a bitstream of a video may be stored in a non-transitory computer-readable recording medium. The bitstream of the video can be generated by a method performed by a video processing apparatus. According to the method, a set of candidate intra prediction modes (IPMs) for a current chroma block of the video may be determined based on a decoder-side derivation of intra prediction mode (DDIPM). An IPM candidate list for the current chroma block may be constructed based on the set of candidate IPMs. Moreover, the bitstream may be generated based on the IPM candidate list.

In some embodiments, a set of candidate intra prediction modes (IPMs) for a current chroma block of the video may be determined based on a decoder-side derivation of intra prediction mode (DDIPM). An IPM candidate list for the current chroma block may be constructed based on the set of candidate IPMs. Moreover, the bitstream may be generated based on the IPM candidate list. The bitstream may be stored in a non-transitory computer-readable recording medium.

Figure 27:
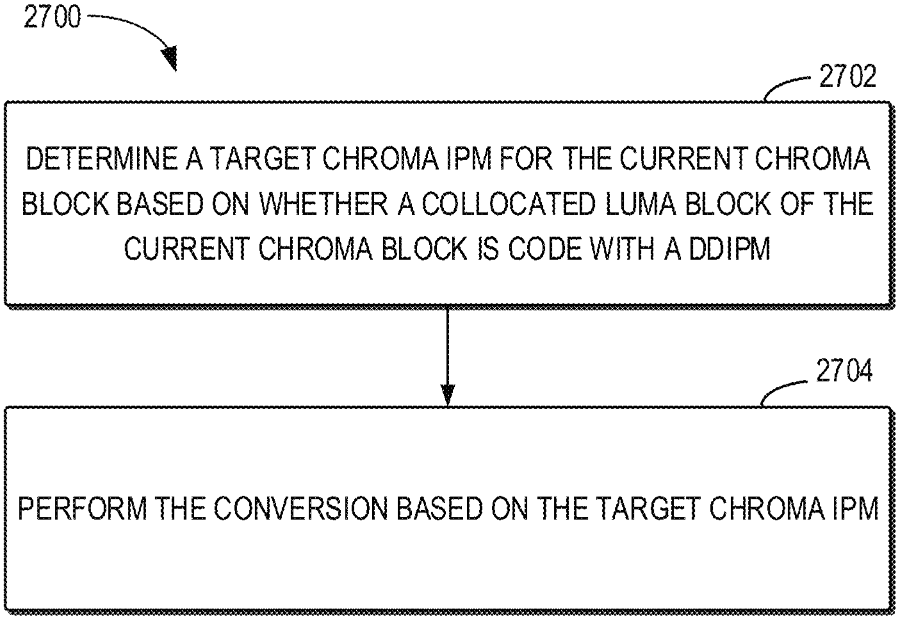
FIG. 27 illustrates a flowchart of another method for video processing in accordance with some embodiments of the present disclosure.

FIG. 27 illustrates a flowchart of a method 2700 for video processing in accordance with some embodiments of the present disclosure. The method 2700 may be implemented during a conversion between a current chroma block of a video and a bitstream of the video. As shown in FIG. 27, the method 2700 starts at 2702 where a target chroma intra prediction mode (IPM) for the current chroma block is determined based on whether a collocated luma block of the current chroma block is code with a decoder-side derivation of intra prediction mode (DDIPM). In some embodiments, in the DDIPM, an intra prediction mode is derived for a block of the video based on coded samples of the video and a syntax element indicating an index of the intra prediction mode in the IPM candidate list is omitted from the bitstream. Examples of DDIPM include, but are not limited to, DIMD or TIMD. By way of example, if the collocated luma block is coded with the DDIPM, the target chroma IPM may be determined based on a chroma derived mode (DM). It should be understood that the above illustrations are described merely for purpose of description. The scope of the present disclosure is not limited in this respect.

At 2704, the conversion is performed based on the target chroma IPM. In some embodiments, the conversion may include encoding the current chroma block into the bitstream. Alternatively or additionally, the conversion may include decoding the current chroma block from the bitstream.

According to the method 2700, the determination of an IPM for a chroma block is dependent on a collocated luma block of the chroma block. Thereby, the proposed method can advantageously improve coding efficiency and the coding quality.

In some embodiments, at 2702, the target chroma IPM may be determined based on a chroma derived mode (DM), if the collocated luma block is coded with the DDIPM. In such case, an indication of a color space conversion may be absent from the bitstream. Additionally or alternatively, an indication of a CCLM may be absent from the bitstream. In some additional or alternative examples, an indication of a MMLM may be absent from the bitstream. Additionally or alternatively, an indication of a planar mode or a DC mode may be absent from the bitstream. In some additional or alternative examples, an indication of a horizontal mode or a vertical mode may be absent from the bitstream. Additionally or alternatively, an indication of a vertical diagonal mode may be absent from the bitstream.

In some embodiments, if the collocated luma block is coded with the DDIPM, the target chroma IPM may be determined by using a color space conversion, a CCLM, a MMLM, a chroma DM, and/or the like. In one example, an indication of a planar mode or a DC mode may be absent from the bitstream. Additionally or alternatively, an indication of a horizontal mode or a vertical mode may be absent from the bitstream. In some additional or alternative examples, an indication of a vertical diagonal mode may be absent from the bitstream.

In some embodiments, a mode index of a target luma IPM for the collocated luma block may be adapted to a predetermined IPM mode range. The target luma IPM may be determined based on the DDIPM and a mode range of the target luma IPM is a range of extended angular modes. In some example embodiments, the predetermined IPM mode range may be the IPM mode range in VVC. By way of example, with reference to FIG. 24, the mode index of the target luma IPM may be 120 in the mode range [0, 130], and the mode index 120 may be mapped to the convention range of IPM in VVC, i.e., [0, 66]. It should be understood that the above illustrations and/or examples are described merely for purpose of description. The scope of the present disclosure is not limited in this respect. In some other embodiments, the mode index of the target luma IPM may be not adapted to the predetermined IPM mode range.

In some embodiments, at 2702, the target chroma IPM may be determined based on a target luma IPM for the collocated luma block, if the collocated luma block is coded with the DDIPM and a chroma DM is applied to the current chroma block. The target luma IPM may be determined based on the DDIPM. In one example, the target luma IPM may be determined as the target chroma IPM.

In some embodiments, the target chroma IPM may be obtained by adapting a mode index of the target luma IPM to a predetermined IPM mode range, if a mode range of the target luma IPM is different from the predetermined IPM mode range. In some example embodiments, the predetermined IPM mode range may be the IPM mode range in VVC. By way of example, with reference to FIG. 24, the mode index of the target luma IPM may be 127 in the mode range [0, 130], and the mode index 127 may be mapped to the conventional range of IPM in VVC, i.e., [0, 66]. It should be understood that the above illustrations and/or examples are described merely for purpose of description. The scope of the present disclosure is not limited in this respect.

In some embodiments, if the mode index of the target luma IPM is greater than or equal to a first predetermined value, the mode index may be shifted at least one bit to the right. The shifted mode index may be increased by a second predetermined value to obtain an adapted mode index of the target luma IPM. For example, if the mode index of the target luma IPM is greater than or equal to 2, than the mode index may be shifted one bit to the right, and the shifted mode index may be increased by 1 to obtain the adapted mode index of the target luma IPM. It should be understood that the above illustrations and/or examples are described merely for purpose of description. The scope of the present disclosure is not limited in this respect.

In some embodiments, at 2707, a chroma IPM candidate list for the current chroma block may be updated based on the target luma IPM and the target chroma IPM may be determined from the chroma IPM candidate list. In one example, the target luma IPM may be added into the chroma IPM candidate list to update the chroma IPM candidate list.

Alternatively, a chroma IPM in the chroma IPM candidate list may be replaced with the target luma IPM to update the chroma IPM candidate list.

In some embodiments, the DDIPM may comprise a template-based intra mode derivation (TIMD) with fusion. The method 2700 may further comprise: determining whether to code the collocated luma block by using the TIMD with fusion based on a cost factor dependent on coding information of the collocated luma block. In one example, the coding information may comprise a quantization parameter, a slice type, a block size, and/or the like.

In some embodiments, the collocated luma block may be coded by using the TIMD with fusion. The method 2700 may further comprise: determining a final prediction for the collocated luma block by weighting a first set of candidate predictions for the collocated luma block. The first set of candidate predictions may be generated based on a second set of IPMs for the collocated luma block and a sum of weights used for the weighting may be equal to a third predetermined value. In one example, the sum of weights used for the weighting may be equal to 1. Thereby, the proposed method can advantageously avoid division operation and is more hardware-friendly. It should be understood that the above illustrations and/or examples are described merely for purpose of description. The scope of the present disclosure is not limited in this respect.

In some embodiments, the collocated luma block may be coded by using the TIMD with fusion. The method 2700 may further comprise: determining a weighted sum by weighting a first set of candidate predictions for the collocated luma block. The first set of candidate predictions may be generated based on a second set of IPMs for the collocated luma block and a sum of weights used for the weighting may be larger than a third predetermined value. The method 2700 may further comprise: obtaining a final prediction for the collocated luma block by performing a shift operation on the weighted sum. In one example, the sum of weights used for the weighting may be equal to 1. Thereby, the proposed method can advantageously avoid division operation and is more hardware-friendly. It should be understood that the above illustrations and/or examples are described merely for purpose of description. The scope of the present disclosure is not limited in this respect.

In some embodiments, the weights used for the weighting may be dependent on sample positions. Alternatively, the weights may be dependent on at least one of the second set of IPMs. In some other embodiments, the weights may be dependent on at least one cost for the second set of IPMs.

In some embodiments, the weights may be determined based on a look-up table or a set of equations. In one example, the method 2700 may further comprise: modifying costs of the second set of IPMs; and determining the weights based on the look-up table after the costs of the second set of IPMs may be modified. For example, the costs of the second set of IPMs may be modified by performing a shift operation with an offset. Alternatively, the costs of the second set of IPMs may be modified by performing a shift operation without an offset. Thereby, the proposed method can advantageously avoid division operation and is more hardware-friendly.

In some embodiments, the weights may be determined in a same way as determining linear parameters in CCLM or MMLM. One example illustrating the determination of the weights is described above in the Embodiment 1. In some embodiments, the method describe above may be applied to the DDIPM.

In some embodiments, whether to and/or how to apply the method according to some embodiments of the present disclosure may be indicated at one of: a sequence level, a group of pictures level, a picture level, a slice level, or a tile group level.

In some embodiments, whether to and/or how to apply the method according to some embodiments of the present disclosure may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header. Additionally or alternatively, how to apply the method according to some embodiments of the present disclosure may be indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, whether to and/or how to apply the method according to some embodiments of the present disclosure may be indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel. Additionally or alternatively, how to apply the method according to some embodiments of the present disclosure may be indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel In some embodiments, the method according to some embodiments of the present disclosure may further comprise: determining, based on coded information of the current video unit, whether to and/or how to apply the method according to some embodiments of the present disclosure. The coded information may comprise at least one of: a block size, a color format, a single dual tree partitioning, a dual tree partitioning, a color component, a slice type, a picture type, or the like. It should be understood that the above illustrations and/or examples are described merely for purpose of description. The scope of the present disclosure is not limited in this respect.

In some embodiments, the method according to some embodiments of the present disclosure may be used in other coding tools requiring an intra prediction signal to determine intra prediction.

In some embodiments, a bitstream of a video may be stored in a non-transitory computer-readable recording medium. The bitstream of the video can be generated by a method performed by a video processing apparatus. According to the method, a target chroma intra prediction mode (IPM) for a current chroma block of the video may be determined based on whether a collocated luma block of the current chroma block is code with a decoder-side derivation of intra prediction mode (DDIPM). Moreover, the bitstream may be generated based on the target chroma IPM.

In some embodiments, a target chroma intra prediction mode (IPM) for a current chroma block of the video may be determined based on whether a collocated luma block of the current chroma block is code with a decoder-side derivation of intra prediction mode (DDIPM). Moreover, the bitstream may be generated based on the target chroma IPM. The bitstream may be stored in a non-transitory computer-readable recording medium.

Implementations of the present disclosure can be described in view of the following clauses, the features of which can be combined in any reasonable manner.

Clause 1. A method for video processing, comprising: determining, during a conversion between a current chroma block of a video and a bitstream of the video, a set of candidate intra prediction modes (IPMs) for the current chroma block based on a decoder-side derivation of intra prediction mode (DDIPM); constructing an IPM candidate list for the current chroma block based on the set of candidate IPMs; and performing the conversion based on the IPM candidate list.

Clause 2. The method of clause 1, wherein constructing the IPM candidate list comprises: updating the IPM candidate list by adding a first candidate IPM of the set of candidate IPMs into the IPM candidate list.

Clause 3. The method of clause 2, wherein the first candidate IPM is added at the first position or the last position of the IPM candidate list.

Clause 4. The method of clause 2, wherein the first candidate IPM is added before or after a target IPM in the IPM candidate list.

Clause 5. The method of clause 4, wherein the target IPM is one of the following: a cross-component linear model (CCLM) mode, a multi-model linear model (MMLM) mode, a chroma derived mode (DM), or a pre-defined IPM.

Clause 6. The method of clause 1, wherein constructing the IPM candidate list comprises: updating the IPM candidate list by replacing a target IPM in the IPM candidate list with a first candidate IPM of the set of candidate IPMs.

Clause 7. The method of clause 6, wherein the target IPM is a chroma DM.

Clause 8. The method of clause 6, wherein the target IPM is one of pre-defined IPMs.

Clause 9. The method of clause 6, wherein the target IPM is one of the following: a planar mode, a DC mode, a horizontal mode, a vertical mode, a diagonal mode, or a vertical diagonal mode.

Clause 10. The method of clause 6, wherein the target IPM is one of the following: a cross-component linear model (CCLM) mode, or a multi-model linear model (MMLM) mode.

Clause 11. The method of any of clauses 1-10, wherein the set of candidate IPMs comprise a plurality of candidate IPMs.

Clause 12. The method of any of clauses 1-11, wherein IPM candidate lists are constructed in different manners for chroma components of the current chroma block.

Clause 13. The method of any of clauses 8-12, wherein a position of an IPM in the updated IPM candidate list is different from a position of the IPM in the IPM candidate list, or positions of all of IPMs excluding the set of candidate IPMs in the updated IPM candidate list are the same as positions of the IPMs in the IPM candidate list.

Clause 14. The method of any of clauses 1-13, wherein whether a target chroma block of the video is coded with the DDIPM is determined on-the-fly.

Clause 15. The method of clause 14, wherein the target chroma block is determined to be coded with the DDIPM, if the target chroma block is not coded with a linear model mode.

Clause 16. The method of any of clauses 1-13, wherein whether a target chroma block of the video is coded with the DDIPM is determined based on at least one of: whether DDIPM is allowed for a collocated luma block of the target chroma block, block dimensions, a block size, a block depth, a slice type, a picture type, a partition tree type, a block location, or a color component.

Clause 17. The method of any of clauses 1-13 and 15-16, wherein a first set of syntax elements are indicated in the bitstream, the first set of syntax elements indicating whether a target chroma block of the video is coded with the DDIPM.

Clause 18. The method of clause 17, wherein whether chroma components of the target chroma block are coded with the DDIPM is indicated in the bitstream by one syntax element of the first set of syntax elements, or whether the chroma components of the target chroma block are coded with the DDIPM is indicated in the bitstream by a plurality of syntax elements of the first set of syntax elements.

Clause 19. The method of clause 18, wherein whether the chroma components are coded with the DDIPM is dependent on the one syntax element, or whether the chroma components are coded with the DDIPM is dependent on the plurality of syntax elements respectively.

Clause 20. The method of any of clauses 17-19, wherein the first set of syntax elements are coded as a flag, or the first set of syntax elements are binarized with one of the following: fixed length coding, truncated unary coding, unary coding, or exponential Golomb (EG) coding.

Clause 21. The method of any of clauses 17-19, wherein the first set of syntax elements are bypass coded or context coded.

Clause 22. The method of clause 21, wherein a context for context coding of the first set of syntax elements is dependent on coded information of the video.

Clause 23. The method of clause 22, wherein the coded information comprises at least one of: block dimensions, a block size, a slice type, a picture type, information of neighboring blocks of the target chroma block, information of other coding tools used for the target chroma block, or information of temporal layer.

Clause 24. The method of any of clauses 17-23, wherein the first set of syntax elements are indicated in the bitstream before or after one of: an indication of color space conversion, an indication of CCLM, an indication of MMLM, an indication of a planar mode, an indication of a DC mode, an indication of a horizontal mode, an indication of a vertical mode, an indication of a vertical diagonal mode, or an indication of chroma DM.

Clause 25. The method of any of clauses 17-24, wherein a target syntax element of current syntax elements for the current chroma block is replaced with the first set of syntax elements.

Clause 26. The method of clause 25, wherein the target syntax element indicates one of: a planar mode, a DC mode, a horizontal mode, a vertical mode, or a vertical diagonal mode.

Clause 27. The method of clause 25, wherein the target syntax element indicates one of: a planar mode, a horizontal mode, a vertical mode, a DC mode, or a chroma DM.

Clause 28. The method of clause 25, wherein the target syntax element indicates one of: a CCLM mode, or a MMLM mode.

Clause 29. The method of any of clauses 17-28, wherein whether the target chroma block is allowed to be coded with the DDIPM is dependent on a second set of syntax elements.

Clause 30. The method of clause 29, wherein the second set of syntax elements are indicated in the bitstream as general constraints information.

Clause 31. The method of clause 30, wherein the target chroma block is not allowed to be coded with the DDIPM, if a syntax element of the second set of syntax elements indicates general constrain on DDIPM for chroma is equal to a predetermined value.

Clause 32. The method of clause 30, wherein the target chroma block is not allowed to be coded with the DDIPM, if a syntax element of the second set of syntax elements indicates general constrain on DDIPM for luma is equal to a predetermined value.

Clause 33. The method of any of clauses 29-32, wherein the second set of syntax elements are included in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 34. A method for video processing, comprising: determining, during a conversion between a current chroma block of a video and a bitstream of the video, a target chroma intra prediction mode (IPM) for the current chroma block based on whether a collocated luma block of the current chroma block is code with a decoder-side derivation of intra prediction mode (DDIPM); and performing the conversion based on the target chroma IPM.

Clause 35. The method of clause 34, wherein determining the target chroma IPM comprises: if the collocated luma block is coded with the DDIPM, determining the target chroma IPM based on a chroma derived mode (DM).

Clause 36. The method of clause 35, wherein at least one of the following is absent from the bitstream: an indication of a color space conversion, an indication of a CCLM, an indication of a MMLM, an indication of a planar mode, an indication of a DC mode, an indication of a horizontal mode, an indication of a vertical mode, or an indication of a vertical diagonal mode.

Clause 37. The method of clause 34, wherein if the collocated luma block is coded with the DDIPM, the target chroma IPM is determined by using at least one of the following: a color space conversion, a CCLM, a MMLM, or a chroma DM.

Clause 38. The method of clause 37, wherein an indication of one of the following is absent from the bitstream: a planar mode, a DC mode, a horizontal mode, a vertical mode, or a vertical diagonal mode.

Clause 39. The method of clause 35, wherein a mode index of a target luma IPM for the collocated luma block is adapted to a predetermined IPM mode range, the target luma IPM being determined based on the DDIPM and a mode range of the target luma IPM being a range of extended angular modes, or the mode index of the target luma IPM is not adapted to the predetermined IPM mode range.

Clause 40. The method of clause 34, wherein determining the target chroma IPM comprises: if the collocated luma block is coded with the DDIPM and a chroma DM is applied to the current chroma block, determining the target chroma IPM based on a target luma IPM for the collocated luma block, the target luma IPM being determined based on the DDIPM.

Clause 41. The method of clause 40, wherein the target luma IPM is determined as the target chroma IPM.

Clause 42. The method of clause 40, wherein determining the target chroma IPM based on a target luma IPM comprises: obtaining the target chroma IPM by adapting a mode index of the target luma IPM to a predetermined IPM mode range, if a mode range of the target luma IPM is different from the predetermined IPM mode range.

Clause 43. The method of clause 42, wherein obtaining the target chroma IPM comprises: if the mode index is greater than or equal to a first predetermined value, shifting the mode index at least one bit to the right; and increasing the shifted mode index by a second predetermined value to obtain an adapted mode index of the target luma IPM.

Clause 44. The method of clause 40, wherein determining the target chroma IPM comprises: updating a chroma IPM candidate list for the current chroma block based on the target luma IPM; and determining the target chroma IPM from the chroma IPM candidate list.

Clause 45. The method of clause 44, wherein updating the chroma IPM candidate list comprises: adding the target luma IPM into the chroma IPM candidate list to update the chroma IPM candidate list, or replacing a chroma IPM in the chroma IPM candidate list with the target luma IPM to update the chroma IPM candidate list.

Clause 46. The method of any of clauses 34-45, wherein the DDIPM comprises a template-based intra mode derivation (TIMD) with fusion, and the method further comprises: determining whether to code the collocated luma block by using the TIMD with fusion based on a cost factor dependent on coding information of the collocated luma block.

Clause 47. The method of clause 36, wherein the coding information comprises at least one of: a quantization parameter, a slice type, or a block size.

Clause 48. The method of any of clauses 46-47, wherein the collocated luma block is coded by using the TIMD with fusion, and the method further comprises: determining a final prediction for the collocated luma block by weighting a first set of candidate predictions for the collocated luma block, the first set of candidate predictions being generated based on a second set of IPMs for the collocated luma block and a sum of weights used for the weighting being equal to a third predetermined value.

Clause 49. The method of any of clauses 46-47, wherein the collocated luma block is coded by using the TIMD with fusion, and the method further comprises: determining a weighted sum by weighting a first set of candidate predictions for the collocated luma block, the first set of candidate predictions being generated based on a second set of IPMs for the collocated luma block and a sum of weights used for the weighting being larger than a third predetermined value; and obtaining a final prediction for the collocated luma block by performing a shift operation on the weighted sum.

Clause 50. The method of any of clauses 48-49, wherein the weights are dependent on sample positions.

Clause 51. The method of any of clauses 48-49, wherein the weights are dependent on at least one of the second set of IPMs.

Clause 52. The method of any of clauses 48-49, wherein the weights are dependent on at least one cost for the second set of IPMs.

Clause 53. The method of any of clauses 48-49, wherein the weights are determined based on a look-up table or a set of equations.

Clause 54. The method of clause 53, further comprising: modifying costs of the second set of IPMs; and determining the weights based on the look-up table after the costs of the second set of IPMs are modified.

Clause 55. The method of clause 54, wherein the costs of the second set of IPMs are modified by performing a shift operation with an offset, or the costs of the second set of IPMs are modified by performing a shift operation without an offset.

Clause 56. The method of clause 53, wherein the weights are determined in a same way as determining linear parameters in CCLM.

Clause 57. The method of clause 53, wherein the weights are determined in a same way as determining linear parameters in MMLM.

Clause 58. The method of any of clauses 46-57, wherein the method is applied to the DDIPM.

Clause 59. The method of any of clauses 1-58, wherein whether to and/or how to apply the method is indicated at one of: a sequence level, a group of pictures level, a picture level, a slice level, or a tile group level.

Clause 60. The method of any of clauses 1-58, wherein whether to and/or how to apply the method is indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 61. The method of any of clauses 1-58, wherein whether to and/or how to apply the method is indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 62. The method of any of clauses 1-58, further comprising: determining, based on coded information of the current video unit, whether to and/or how to apply the method, the coded information comprising at least one of: a block size, a color format, a single dual tree partitioning, a dual tree partitioning, a color component, a slice type, or a picture type.

Clause 63. The method of any of clauses 1-58, wherein the method is used in other coding tools requiring an intra prediction signal.

Clause 64. The method of any of clauses 1-63, wherein in the DDIPM, an intra prediction mode is derived for a block of the video based on coded samples of the video and a syntax element indicating an index of the intra prediction mode in the IPM candidate list is omitted from the bitstream.

Clause 65. The method of any of clauses 1-64, wherein the conversion includes encoding the current chroma block into the bitstream.

Clause 66. The method of any of clauses 1-64, wherein the conversion includes decoding the current chroma block from the bitstream.

Clause 67. An apparatus for processing video data comprising a processor and a non-transitory memory with instructions thereon, wherein the instructions upon execution by the processor, cause the processor to perform a method in accordance with any of Clauses 1-66.

Clause 68. A non-transitory computer-readable storage medium storing instructions that cause a processor to perform a method in accordance with any of Clauses 1-66.

Clause 69. A non-transitory computer-readable recording medium storing a bitstream of a video which is generated by a method performed by a video processing apparatus, wherein the method comprises: determining a set of candidate intra prediction modes (IPMs) for a current chroma block of the video based on a decoder-side derivation of intra prediction mode (DDIPM); constructing an IPM candidate list for the current chroma block based on the set of candidate IPMs; and generating the bitstream based on the IPM candidate list.

Clause 70. A method for storing a bitstream of a video, comprising: determining a set of candidate intra prediction modes (IPMs) for a current chroma block of the video based on a decoder-side derivation of intra prediction mode (DDIPM); constructing an IPM candidate list for the current chroma block based on the set of candidate IPMs; generating the bitstream based on the IPM candidate list; and storing the bitstream in a non-transitory computer-readable recording medium.

Clause 71. A non-transitory computer-readable recording medium storing a bitstream of a video which is generated by a method performed by a video processing apparatus, wherein the method comprises: determining a target chroma intra prediction mode (IPM) for a current chroma block of the video based on whether a collocated luma block of the current chroma block is code with a decoder-side derivation of intra prediction mode (DDIPM); and generating the bitstream based on the target chroma IPM.

Clause 72. A method for storing a bitstream of a video, comprising: determining a target chroma intra prediction mode (IPM) for a current chroma block of the video based on whether a collocated luma block of the current chroma block is code with a decoder-side derivation of intra prediction mode (DDIPM); generating the bitstream based on the target chroma IPM; and storing the bitstream in a non-transitory computer-readable recording medium.

Example Device

Figure 28:
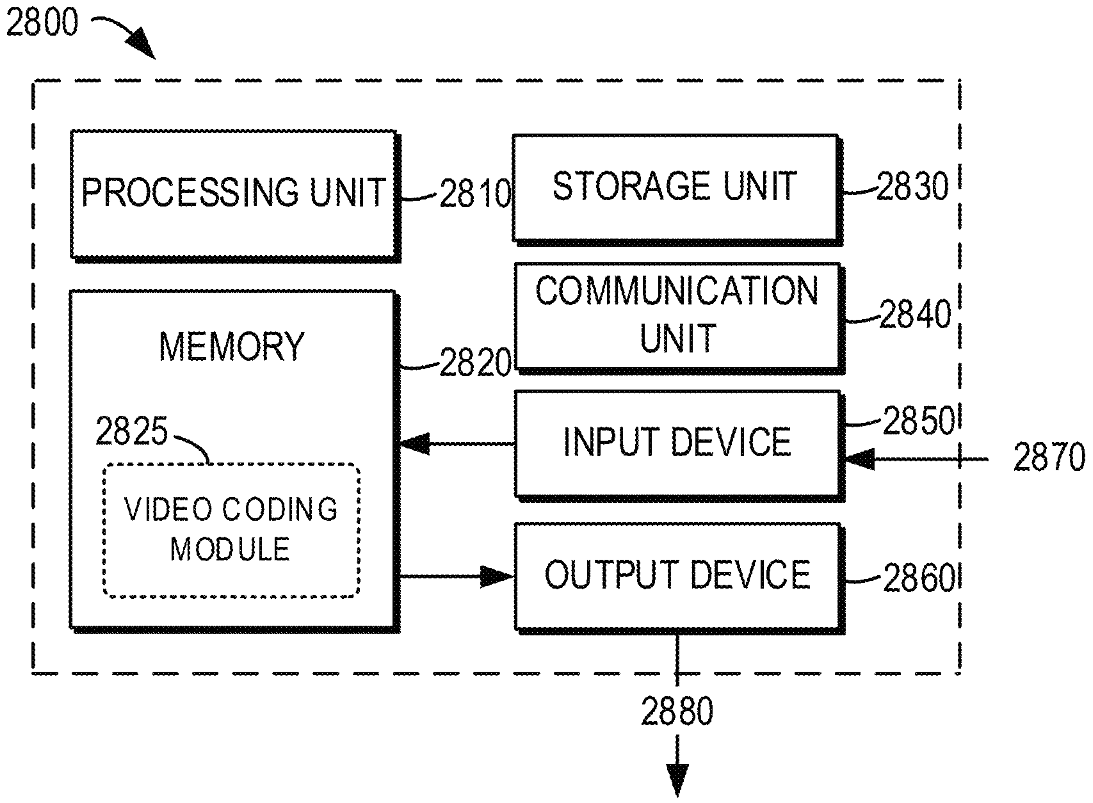
FIG. 28 illustrates a block diagram of a computing device in which various embodiments of the present disclosure can be implemented.

FIG. 28 illustrates a block diagram of a computing device 2800 in which various embodiments of the present disclosure can be implemented. The computing device 2800 may be implemented as or included in the source device 110 (or the video encoder 114 or 200) or the destination device 120 (or the video decoder 124 or 300).

It would be appreciated that the computing device 2800 shown in FIG. 28 is merely for purpose of illustration, without suggesting any limitation to the functions and scopes of the embodiments of the present disclosure in any manner.

As shown in FIG. 28, the computing device 2800 includes a general-purpose computing device 2800. The computing device 2800 may at least comprise one or more processors or processing units 2810, a memory 2820, a storage unit 2830, one or more communication units 2840, one or more input devices 2850, and one or more output devices 2860.

In some embodiments, the computing device 2800 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 2800 can support any type of interface to a user (such as "wearable" circuitry and the like).

The processing unit 2810 may be a physical or virtual processor and can implement various processes based on programs stored in the memory 2820. In a multi-processor system, multiple processing units execute computer executable instructions in parallel so as to improve the parallel processing capability of the computing device 2800. The processing unit 2810 may also be referred to as a central processing unit (CPU), a microprocessor, a controller or a microcontroller.

The computing device 2800 typically includes various computer storage medium. Such medium can be any medium accessible by the computing device 2800, including, but not limited to, volatile and non-volatile medium, or detachable and non-detachable medium. The memory 2820 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 2830 may be any detachable or non-detachable medium and may include a machine-readable medium such as a memory, flash memory drive, magnetic disk or another other media, which can be used for storing information and/or data and can be accessed in the computing device 2800.

The computing device 2800 may further include additional detachable/non-detachable, volatile/non-volatile memory medium. Although not shown in FIG. 28, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 2840 communicates with a further computing device via the communication medium. In addition, the functions of the components in the computing device 2800 can be implemented by a single computing cluster or multiple computing machines that can communicate via communication connections. Therefore, the computing device 2800 can operate in a networked environment using a logical connection with one or more other servers, networked personal computers (PCs) or further general network nodes.

The input device 2850 may be one or more of a variety of input devices, such as a mouse, keyboard, tracking ball, voice-input device, and the like. The output device 2860 may be one or more of a variety of output devices, such as a display, loudspeaker, printer, and the like. By means of the communication unit 2840, the computing device 2800 can further communicate with one or more external devices (not shown) such as the storage devices and display device, with one or more devices enabling the user to interact with the computing device 2800, or any devices (such as a network card, a modem and the like) enabling the computing device 2800 to communicate with one or more other computing devices, if required. Such communication can be performed via input/output (I/O) interfaces (not shown).

In some embodiments, instead of being integrated in a single device, some or all components of the computing device 2800 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 2800 may be used to implement video encoding/decoding in embodiments of the present disclosure. The memory 2820 may include one or more video coding modules 2825 having one or more program instructions. These modules are accessible and executable by the processing unit 2810 to perform the functionalities of the various embodiments described herein.

In the example embodiments of performing video encoding, the input device 2850 may receive video data as an input 2870 to be encoded. The video data may be processed, for example, by the video coding module 2825, to generate an encoded bitstream. The encoded bitstream may be provided via the output device 2860 as an output 2880.

In the example embodiments of performing video decoding, the input device 2850 may receive an encoded bitstream as the input 2870. The encoded bitstream may be processed, for example, by the video coding module 2825, to generate decoded video data. The decoded video data may be provided via the output device 2860 as the output 2880.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a current chroma block of a video and a bitstream of the video, a chroma intra prediction mode (IPM) for the current chroma block based on a luma IPM for a collocated luma block of the current chroma block, the luma IPM being determined based on a decoder-side derivation of intra prediction mode (DDIPM) and a chroma derived mode (DM) is applied on the current chroma block; and performing the conversion based on the chroma IPM, wherein determining the chroma IPM based on the luma IPM comprises: obtaining the chroma IPM by adapting a mode index of the luma IPM to a predetermined IPM mode range corresponding to a chroma component, if a mode range of the luma IPM is different from the predetermined IPM mode range, wherein obtaining the chroma IPM comprises:

if the mode index is greater than or equal to a first predetermined value, shifting the mode index at least one bit to the right; and increasing the shifted mode index by a second predetermined value to obtain an adapted mode index of the luma IPM.

2. The method of claim 1, wherein if a DDIPM is applied on the current chroma block, the method further comprises:

determining a set of candidate intra prediction modes (IPMs) for the current chroma block;

constructing an IPM candidate list for the current chroma block based on the set of candidate IPMs, wherein constructing the IPM candidate list comprises: updating the IPM candidate list by adding a first candidate IPM of the set of candidate IPMs into the IPM candidate list.

3. The method of claim 2, wherein the first candidate IPM is added before or after a target IPM in the IPM candidate list, and the target IPM is one of the following:

a cross-component linear model (CCLM) mode, a multi-model linear model (MMLM) mode, a chroma derived mode (DM), or a pre-defined IPM.

4. The method of claim 1, wherein whether a target chroma block of the video is coded with the DDIPM is determined based on at least one of:

whether DDIPM is allowed for a collocated luma block of the target chroma block, block dimensions, a block size, a block depth, a slice type, a picture type, a partition tree type, a block location, or a color component, or wherein a first set of syntax elements are indicated in the bitstream, the first set of syntax elements indicating whether a target chroma block of the video is coded with the DDIPM.

5. The method of claim 4, wherein whether chroma components of the target chroma block are coded with the DDIPM is indicated in the bitstream by one syntax element of the first set of syntax elements, or whether the chroma components of the target chroma block are coded with the DDIPM is indicated in the bitstream by a plurality of syntax elements of the first set of syntax elements, or wherein the first set of syntax elements are coded as a flag, or the first set of syntax elements are binarized with one of the following:

fixed length coding, truncated unary coding, unary coding, or exponential Golomb (EG) coding, or wherein the first set of syntax elements are bypass coded or context coded, or wherein the first set of syntax elements are indicated in the bitstream before or after one of:

an indication of color space conversion, an indication of CCLM, an indication of MMLM, an indication of a planar mode, an indication of a DC mode, an indication of a horizontal mode, an indication of a vertical mode, an indication of a vertical diagonal mode, or an indication of chroma DM, or wherein whether the target chroma block is allowed to be coded with the DDIPM is dependent on a second set of syntax elements.

6. The method of claim 5, wherein whether the chroma components are coded with the DDIPM is dependent on the one syntax element, or whether the chroma components are coded with the DDIPM is dependent on the plurality of syntax elements respectively.

7. The method of claim 1, wherein the DDIPM comprises a template-based intra mode derivation (TIMD) with fusion, and the method further comprises: determining whether to code the collocated luma block by using the TIMD with fusion based on a cost factor dependent on coding information of the collocated luma block.

8. The method of claim 7, wherein the collocated luma block is coded by using the TIMD with fusion, and the method further comprises:

determining a final prediction for the collocated luma block by weighting a first set of candidate predictions for the collocated luma block, the first set of candidate predictions being generated based on a second set of IPMs for the collocated luma block and a sum of weights used for the weighting being equal to a third predetermined value.

9. The method of claim 8, wherein the weights are determined based on a look-up table or a set of equations.

10. The method of claim 9, wherein the method further comprises:

modifying costs of the second set of IPMs; and determining the weights based on the look-up table after the costs of the second set of IPMs are modified, or wherein the weights are determined in a same way as determining linear parameters in CCLM, or wherein the weights are determined in a same way as determining linear parameters in MMLM.

11. The method of claim 10, wherein the costs of the second set of IPMs are modified by performing a shift operation with an offset, or the costs of the second set of IPMs are modified by performing a shift operation without an offset.

12. The method of claim 7, wherein the method is applied to the DDIPM.

13. The method of claim 1, wherein in the DDIPM, an intra prediction mode is derived for a block of the video based on coded samples of the video and a syntax element indicating an index of the intra prediction mode in the IPM candidate list is omitted from the bitstream.

14. The method of claim 1, wherein the conversion includes encoding the current chroma block into the bitstream, or the conversion includes decoding the current chroma block from the bitstream.

15. An apparatus for processing video data comprising a processor and a non-transitory memory with instructions thereon, wherein the instructions upon execution by the processor, cause the processor to perform acts comprising:

determining, during a conversion between a current chroma block of a video and a bitstream of the video, a chroma intra prediction mode (IPM) for the current chroma block based on a luma IPM for a collocated luma block of the current chroma block, the luma IPM being determined based on a decoder-side derivation of intra prediction mode (DDIPM) and a chroma derived mode (DM) is applied on the current chroma block; and performing the conversion based on the chroma IPM, wherein determining the chroma IPM based on the luma IPM comprises: obtaining the chroma IPM by adapting a mode index of the luma IPM to a predetermined IPM mode range corresponding to a chroma component, if a mode range of the luma IPM is different from the predetermined IPM mode range, wherein obtaining the chroma IPM comprises:

if the mode index is greater than or equal to a first predetermined value, shifting the mode index at least one bit to the right; and increasing the shifted mode index by a second predetermined value to obtain an adapted mode index of the luma IPM.

16. A non-transitory computer-readable storage medium storing instructions that cause a processor to perform acts comprising:

determining, during a conversion between a current chroma block of a video and a bitstream of the video, a chroma intra prediction mode (IPM) for the current chroma block based on a luma IPM for a collocated luma block of the current chroma block, the luma IPM being determined based on a decoder-side derivation of intra prediction mode (DDIPM) and a chroma derived mode (DM) is applied on the current chroma block; and performing the conversion based on the chroma IPM, wherein determining the chroma IPM based on the luma IPM comprises: obtaining the chroma IPM by adapting a mode index of the luma IPM to a predetermined IPM mode range corresponding to a chroma component, if a mode range of the luma IPM is different from the predetermined IPM mode range, wherein obtaining the chroma IPM comprises:

if the mode index is greater than or equal to a first predetermined value, shifting the mode index at least one bit to the right; and increasing the shifted mode index by a second predetermined value to obtain an adapted mode index of the luma IPM.

17. A non-transitory computer-readable recording medium storing a bitstream of a video which is generated by a method performed by a video processing apparatus, wherein the method comprises:

determining a chroma intra prediction mode (IPM) for a current chroma block of the video based on a luma IPM for a collocated luma block of the current chroma block, the luma IPM being determined based on a decoder-side derivation of intra prediction mode (DDIPM) and a chroma derived mode (DM) is applied on the current chroma block; and generating the bitstream based on the chroma IPM, wherein determining the chroma IPM based on the luma IPM comprises: obtaining the chroma IPM by adapting a mode index of the luma IPM to a predetermined IPM mode range corresponding to a chroma component, if a mode range of the luma IPM is different from the predetermined IPM mode range, wherein obtaining the chroma IPM comprises:

if the mode index is greater than or equal to a first predetermined value, shifting the mode index at least one bit to the right; and increasing the shifted mode index by a second predetermined value to obtain an adapted mode index of the luma IPM.

* * * * *